(12) United States Patent
Bar-Zeev et al.

(10) Patent No.: US 11,137,967 B2
(45) Date of Patent: Oct. 5, 2021

(54) GAZE-BASED USER INTERACTIONS

(71) Applicant: Apple Inc., Cupertino, CA (US)

(72) Inventors: Avi Bar-Zeev, Oakland, CA (US);
Ryan S. Burgoyne, Sunnyvale, CA (US); Devin W. Chalmers, Oakland, CA (US); Luis R. Deliz Centeno, Fremont, CA (US); Rahul Nair, Daly City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/828,857

(22) Filed: Mar. 24, 2020

(65) Prior Publication Data

US 2020/0225747 A1 Jul. 16, 2020

Related U.S. Application Data

(63) Continuation of application No. PCT/US2018/053427, filed on Sep. 28, 2018.
(Continued)

(51) Int. Cl.
*G06F 3/14* (2006.01)
*G06K 9/00* (2006.01)
(Continued)

(52) U.S. Cl.
CPC ....... *G06F 3/1423* (2013.01); *G02B 27/0093* (2013.01); *G02B 27/017* (2013.01);
(Continued)

(58) Field of Classification Search
CPC ............... G06F 3/1423; G06F 3/04842; G06F 3/04815; G06F 3/013; G06F 3/017;
(Continued)

(56) References Cited

U.S. PATENT DOCUMENTS

| 8,408,706 B2 | 4/2013 | Yahav |
| 10,248,399 B2 | 4/2019 | Yoon |

(Continued)

FOREIGN PATENT DOCUMENTS

| EP | 2940556 A1 | 11/2015 |
| EP | 3118722 A1 | 1/2017 |

(Continued)

OTHER PUBLICATIONS

Non-Final Office Action received for U.S. Appl. No. 16/802,188, dated Dec. 16, 2020, 15 pages.
(Continued)

*Primary Examiner* — Muhammad N Edun
(74) *Attorney, Agent, or Firm* — Dentons US LLP

(57) ABSTRACT

In an exemplary process for interacting with user interface objects using an eye gaze, an affordance associated with a first object is displayed. A gaze direction or a gaze depth is determined. While the gaze direction or the gaze depth is determined to correspond to a gaze at the affordance, a first input representing user instruction to take action on the affordance is received, and the affordance is selected responsive to receiving the first input.

23 Claims, 51 Drawing Sheets

Related U.S. Application Data

(60) Provisional application No. 62/734,678, filed on Sep. 21, 2018, provisional application No. 62/566,206, filed on Sep. 29, 2017, provisional application No. 62/566,073, filed on Sep. 29, 2017, provisional application No. 62/566,080, filed on Sep. 29, 2017.

(51) Int. Cl.
| | |
|---|---|
| *G06T 19/00* | (2011.01) |
| *H04B 5/00* | (2006.01) |
| *G06T 7/73* | (2017.01) |
| *G06F 3/01* | (2006.01) |
| *G06F 3/0346* | (2013.01) |
| *G02B 27/00* | (2006.01) |
| *G02B 27/01* | (2006.01) |
| *G06F 3/0481* | (2013.01) |
| *G06F 3/0484* | (2013.01) |

(52) U.S. Cl.
CPC .............. *G06F 3/013* (2013.01); *G06F 3/017* (2013.01); *G06F 3/0346* (2013.01); *G06F 3/04815* (2013.01); *G06F 3/04842* (2013.01); *G06K 9/00335* (2013.01); *G06K 9/00671* (2013.01); *G06T 7/74* (2017.01); *G06T 19/006* (2013.01); *H04B 5/0025* (2013.01); *G02B 2027/0187* (2013.01)

(58) Field of Classification Search
CPC ...... G06F 3/0346; G06F 3/011; G06F 3/0484; G02B 27/0093; G02B 27/017; G02B 2027/0187; G06K 9/00335; G06K 9/00671; G06T 19/006; G06T 7/74; H04B 5/0025
See application file for complete search history.

(56) References Cited

U.S. PATENT DOCUMENTS

| | | |
|---|---|---|
| 10,353,532 B1 | 7/2019 | Holz et al. |
| 2007/0162872 A1 | 7/2007 | Hong et al. |
| 2008/0181452 A1 | 7/2008 | Kwon et al. |
| 2008/0307360 A1 | 12/2008 | Chaudhri et al. |
| 2013/0042296 A1 | 2/2013 | Hastings et al. |
| 2013/0050258 A1 | 2/2013 | Liu et al. |
| 2013/0241805 A1 | 9/2013 | Gomez |
| 2013/0283208 A1 | 10/2013 | Bychkov et al. |
| 2013/0328762 A1 | 12/2013 | McCulloch et al. |
| 2014/0160001 A1 | 6/2014 | Kinnebrew et al. |
| 2014/0184550 A1 | 7/2014 | Hennessey et al. |
| 2014/0204002 A1 | 7/2014 | Bennet et al. |
| 2015/0100803 A1 | 4/2015 | Chen et al. |
| 2015/0130716 A1 | 5/2015 | Sridharan et al. |
| 2015/0317518 A1 | 11/2015 | Fujimaki et al. |
| 2016/0018654 A1 | 1/2016 | Haddick et al. |
| 2016/0026253 A1 | 1/2016 | Bradski et al. |
| 2016/0116980 A1 | 4/2016 | George-Svahn et al. |
| 2016/0182877 A1* | 6/2016 | Deluca ................. H04N 13/332 348/53 |
| 2016/0295038 A1 | 10/2016 | Rao et al. |
| 2017/0060230 A1 | 3/2017 | Faaborg et al. |
| 2017/0099481 A1* | 4/2017 | Held .................... G02B 27/017 |
| 2017/0134553 A1 | 5/2017 | Jeon et al. |
| 2017/0153701 A1 | 6/2017 | Mahon et al. |
| 2017/0185276 A1 | 6/2017 | Lee et al. |
| 2017/0221276 A1 | 8/2017 | Osborn et al. |
| 2017/0237974 A1 | 8/2017 | Samec et al. |
| 2017/0318019 A1* | 11/2017 | Gordon ................... G06F 3/013 |
| 2018/0004283 A1 | 1/2018 | Mathey-Owens et al. |
| 2018/0054487 A1 | 2/2018 | Hebsur et al. |
| 2018/0081171 A1 | 3/2018 | Park et al. |
| 2018/0204385 A1 | 7/2018 | Sarangdhar et al. |
| 2018/0217429 A1† | 8/2018 | Busch |
| 2019/0122420 A1* | 4/2019 | Terahata ................. G06T 7/70 |
| 2019/0244416 A1* | 8/2019 | Tamaoki ............... A63F 13/211 |
| 2020/0192622 A1 | 6/2020 | Stoyles et al. |
| 2020/0201444 A1 | 6/2020 | Stoyles et al. |
| 2020/0225746 A1 | 7/2020 | Bar-Zeev et al. |
| 2020/0301553 A1 | 9/2020 | Taylor et al. |

FOREIGN PATENT DOCUMENTS

| | | |
|---|---|---|
| WO | 2015/110852 A1 | 7/2015 |
| WO | 2017/031089 A1 | 2/2017 |

OTHER PUBLICATIONS

Non-Final Office Action received for U.S. Appl. No. 16/802,320, dated Dec. 24, 2020, 19 pages.
International Preliminary Report on Patentability received for PCT Patent Application No. PCT/US2018/053415, dated Apr. 9, 2020, 10 pages.
International Preliminary Report on Patentability received for PCT Patent Application No. PCT/US2018/053422, dated Apr. 9, 2020, 10 pages.
International Preliminary Report on Patentability received for PCT Patent Application No. PCT/US2018/053427, dated Apr. 9, 2020, 14 pages.
International Preliminary Report on Patentability received for PCT Patent Application No. PCT/US2018/053428, dated Apr. 9, 2020, 8 pages.
International Search Report and Written Opinion received for PCT Patent Application No. PCT/US2018/053415, dated Dec. 13, 2018, 14 pages.
International Search Report and Written Opinion received for PCT Patent Application No. PCT/US2018/053422, dated Dec. 19, 2018, 13 pages.
International Search Report and Written Opinion received for PCT Patent Application No. PCT/US2018/053427, dated Mar. 25, 2019, 18 pages.
International Search Report and Written Opinion received for PCT Patent Application No. PCT/US2018/053428, dated Jan. 25, 2019, 9 pages.
International Search Report and Written Opinion received for PCT Patent Application No. PCT/US2019/028980, dated Aug. 16, 2019, 14 pages.
Invitation to Pay Additional Fees received for PCT Patent Application No. PCT/US2018/053427, dated Feb. 1, 2019, 13 pages.
International Preliminary Report on Patentability received for PCT Patent Application No. PCT/US2019/028980, dated Nov. 19, 2020, 10 pages.
Non-Final Office Action received for U.S. Appl. No. 16/828,852, dated Nov. 9, 2020, 14 pages.
Applicant-Initiated Interview Summary received for U.S. Appl. No. 16/802,188, dated Mar. 23, 2021, 2 pages.
Final Office Action received for U.S. Appl. No. 16/828,852, dated Mar. 9, 2021, 16 pages.
Final Office Action received for U.S. Appl. No. 16/802,188, dated May 14, 2021, 18 pages.
Notice of Allowance received for U.S. Appl. No. 16/802,320, dated Apr. 30, 2021, 9 pages.
Office Action received for European Patent Application No. 18786644.7, dated Apr. 28, 2021, 6 pages.
Applicant-Initiated Interview Summary received for U.S. Appl. No. 16/828,852, dated Jun. 8, 2021, 2 pages.
Applicant-Initiated Interview Summary received for U.S. Appl. No. 16/802,320, dated Apr. 9, 2021, 2 pages.
Office Action received for Japanese Patent Application No. 2020-512573, dated Apr. 12, 2021, 7 pages (4 pages of English Translation and 3 pages of Official Copy).
Stellmach, et al., "Look & Touch: Gaze-supported Target Acquisition", CHI'12: Proceedings of the SIGGHI Conference on Human Factors in Computing Systems, Available online at: https://dl.acm.org/doi/10.1145/2207676.2208709, May 5-10, 2012, pp. 2981-2990.

(56) References Cited

OTHER PUBLICATIONS

Stellmach, et al., "Still Looking: Investigating Seamless Gaze-supported Selection, Positioning, and Manipulation of Distant Targets", CHI'13: Proceedings of the SIGCHI Conference on Human Factors in Computing Systems, Available online at: https://dl.acm.org/doi/10.1145/2470654.2470695, Apr. 2013, pp. 285-294.
Applicant-Initiated Interview Summary received for U.S. Appl. No. 16/828,852, dated Jan. 27, 2021, 4 pages.
Decision to Grant received for Japanese Patent Application No. 2020-512573, dated Aug. 2, 2021, 3 pages (1 page of English Translation and 2 pages of Official Copy).

\* cited by examiner
† cited by third party

GAZE-BASED USER INTERACTIONS

CROSS-REFERENCE TO RELATED APPLICATIONS

This application is a continuation of International Application No. PCT/US2018/053427, entitled "Gaze-Based User Interactions," filed Sep. 28, 2018, which claims priority to: U.S. Patent Application Ser. No. 62/566,073, entitled "Accessing Functions of External Devices Using Reality Interfaces," filed Sep. 29, 2017; U.S. Patent Application Ser. No. 62/566,080, entitled "Controlling External Devices Using Reality Interfaces," filed Sep. 29, 2017; U.S. Patent Application Ser. No. 62/566,206, entitled "Gaze-based User Interactions," filed Sep. 29, 2017; and U.S. Patent Application Ser. No. 62/734,678, entitled "Gaze-based User Interactions," filed Sep. 21, 2018, which are hereby incorporated by reference in their entirety for all purposes.

BACKGROUND

1. Field

The present disclosure relates generally to user interfaces for interacting with an electronic device, and more specifically to interacting with an electronic device using an eye gaze.

2. Description of Related Art

Conventional electronic devices use input mechanisms, such as keyboards, buttons, joysticks, and touch-screens, to receive inputs from a user. Some conventional devices also include a screen that displays content responsive to a user's input. Such input mechanisms and displays provide an interface for the user to interact with an electronic device.

BRIEF SUMMARY

The present disclosure describes techniques for interacting with an electronic device using an eye gaze. According to some embodiments, a user uses his or her eyes to interact with user interface objects displayed on the electronic device. The techniques provide a more natural and efficient interface by, in some exemplary embodiments, allowing a user to operate the device using primarily eye gazes and eye gestures (e.g., eye movement, blinks, and stares). Techniques are also described for using eye gaze to quickly designate an initial position (e.g., for selecting or placing an object) and then moving the designated position without using eye gaze, as precisely locating the designated position can be difficult using eye gaze due to uncertainty and instability of the position of a user's eye gaze. The techniques can be applied to conventional user interfaces on devices such as desktop computers, laptops, tablets, and smartphones. The techniques are also advantageous for computer-generated reality (including virtual reality and mixed reality) devices and applications, as described in greater detail below.

According to some embodiments, an affordance associated with a first displayed object is displayed and a gaze direction or a gaze depth is determined. A determination is made whether the gaze direction or the gaze depth corresponds to a gaze at the affordance. A first input representing an instruction to take action on the affordance is received while the gaze direction or the gaze depth is determined to correspond to a gaze at the affordance, and the affordance is selected responsive to receiving the first input.

According to some embodiments, a first affordance and a second affordance are concurrently displayed and a first gaze direction or a first gaze depth of one or more eyes is determined. A determination is made whether the first gaze direction or the first gaze depth corresponds to a gaze at both the first affordance and the second affordance. In response to determining that the first gaze direction or the first gaze depth corresponds to a gaze at both the first affordance and the second affordance, the first affordance and the second affordance are enlarged.

According to some embodiments, an electronic device adapted to display a field of view of a three-dimensional computer generated reality environment and the field of view is rendered from a viewing perspective. A first object is displayed concurrently with a second object, where the first object is presented closer than the second object from the viewing position. A gaze position is determined. In accordance with a determination that the gaze position corresponds to a gaze at the first object, the display of the second object is visually altered. In accordance with a determination that the gaze position corresponds to a gaze at the second object, the display of the first object is visually altered.

According to some embodiments, a first user input is received at a first time. In response to receiving the first user input, a selection point is designated at a first position corresponding to a gaze position at the first time. While maintaining designation of the selection point a second user input is received. In response to receiving the second user input, the selection point is moved to a second position different than the first position, where moving the selection point to the second position is not based on the gaze position. While the selection point is at the second position, a third user input is received. In response to receiving the third user input, the selection point is confirmed at the second position.

According to some embodiments, a first user input is received at a first time. In response to receiving the first user input, a first object of a plurality of objects corresponding to a gaze position at the first time is designated. While maintaining designation of the first object, a second user input is received. In response to receiving the second user input, designation of the first object is ceased and a second object of the plurality of objects is designated, where designating the second object is not based on the gaze position. While maintaining designation of the second object, a third user input is received. In response to receiving the third user input, the second object is selected.

According to some embodiments, an object is selected. While maintaining selection of the object, a first user input is received at a first time. In response to receiving the first user input, a placement point is designated at a first position based on a gaze position at the first time, where the first position corresponds to the gaze position at the first time. While maintaining designation of the placement point, a second user input is received. In response to receiving the second user input, the placement point is moved to a second position different than the first position, where moving the placement point to the second position is not based on the gaze position. A third user input is received, and in response to receiving the third user input, the selected object is placed at the second position.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1A:
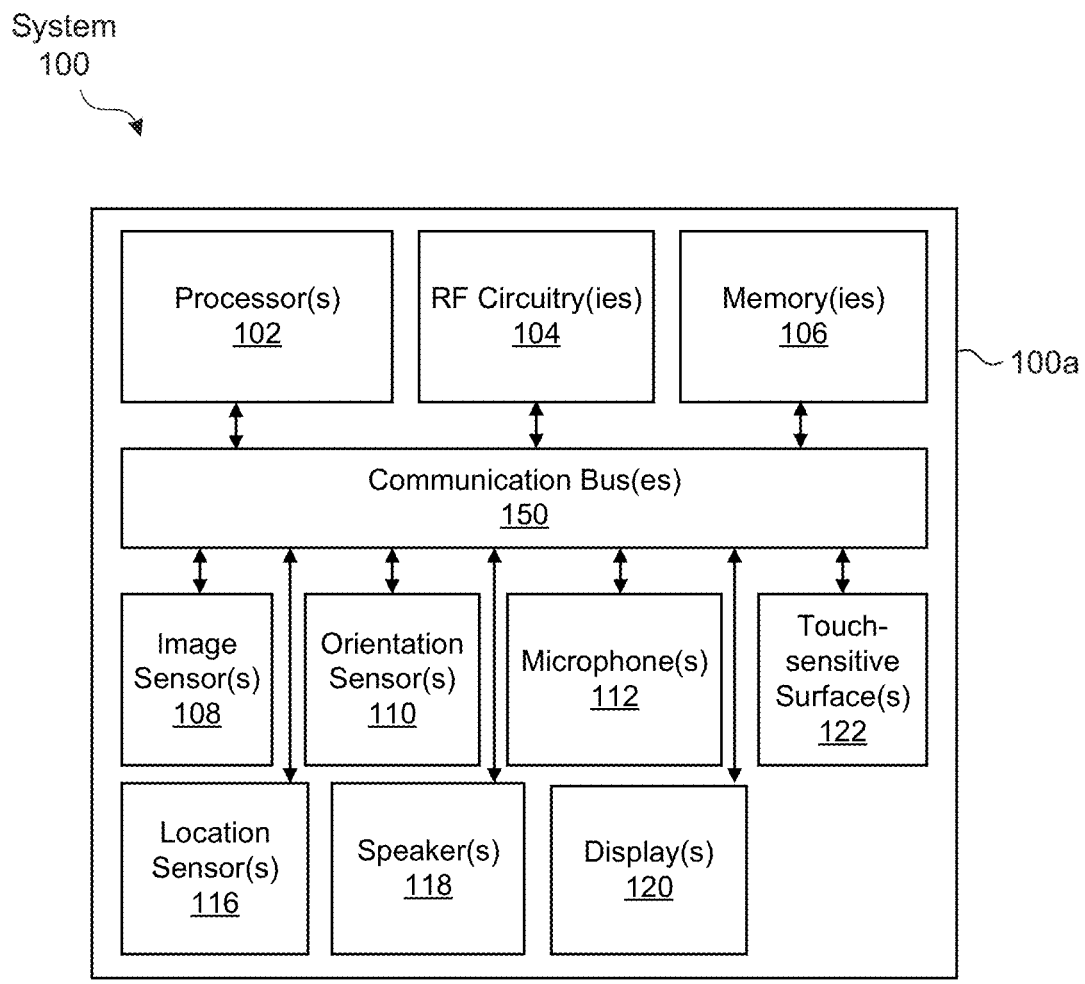
FIGS. 1A and 1B depict exemplary systems for use in various computer-generated reality technologies, including virtual reality and mixed reality.

The following description sets forth exemplary methods, parameters, and the like. It should be recognized, however, that such description is not intended as a limitation on the scope of the present disclosure but is instead provided as a description of exemplary embodiments.

Various embodiments of electronic systems and techniques for using such systems in relation to various computer-generated reality technologies, including virtual reality and mixed reality (which incorporates sensory inputs from a physical environment), are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
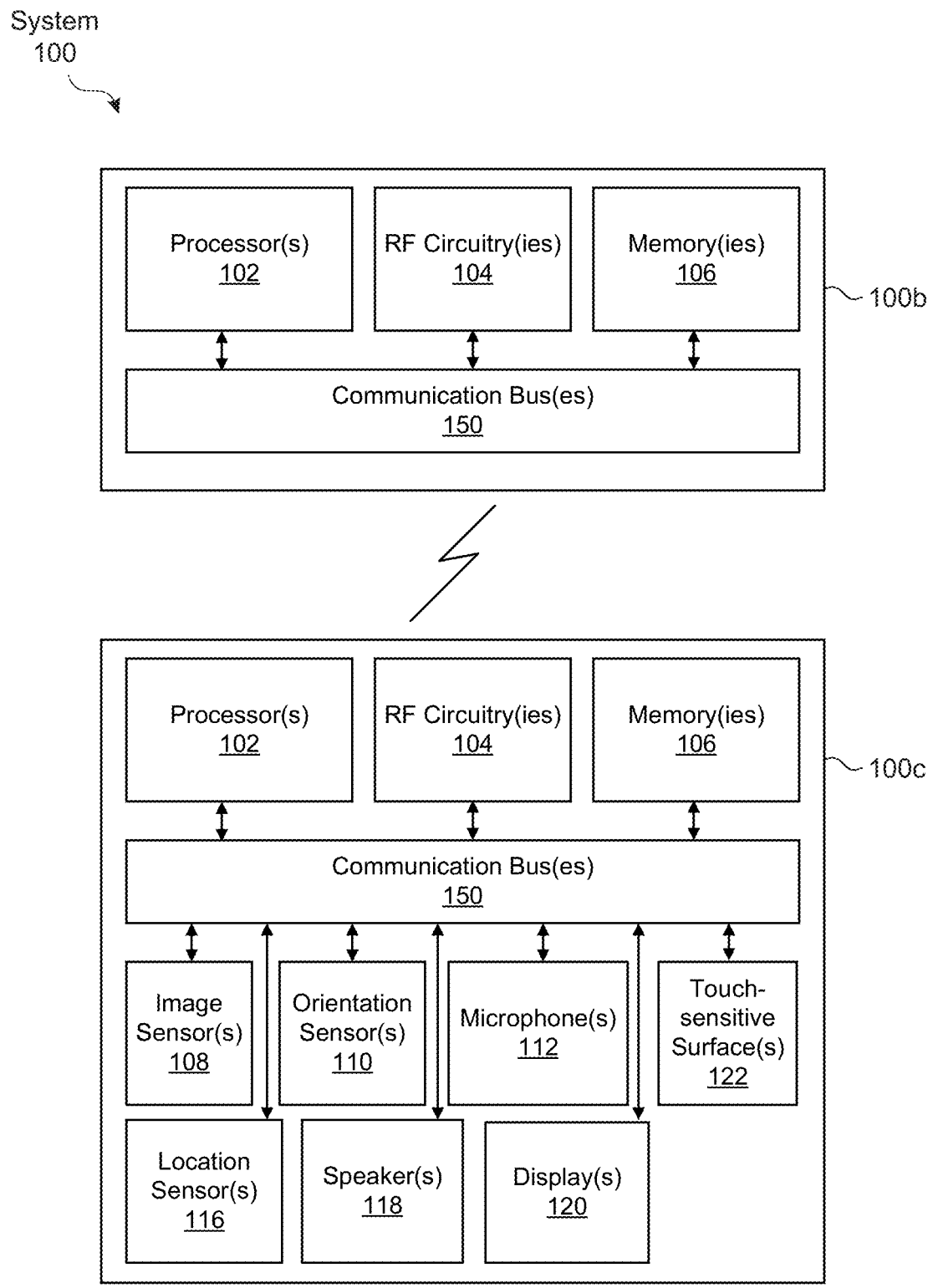

FIGS. 1A and 1B depict exemplary system 100 for use in various computer-generated reality technologies, including virtual reality and mixed reality.

In some embodiments, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some embodiments, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

Figure 1C:
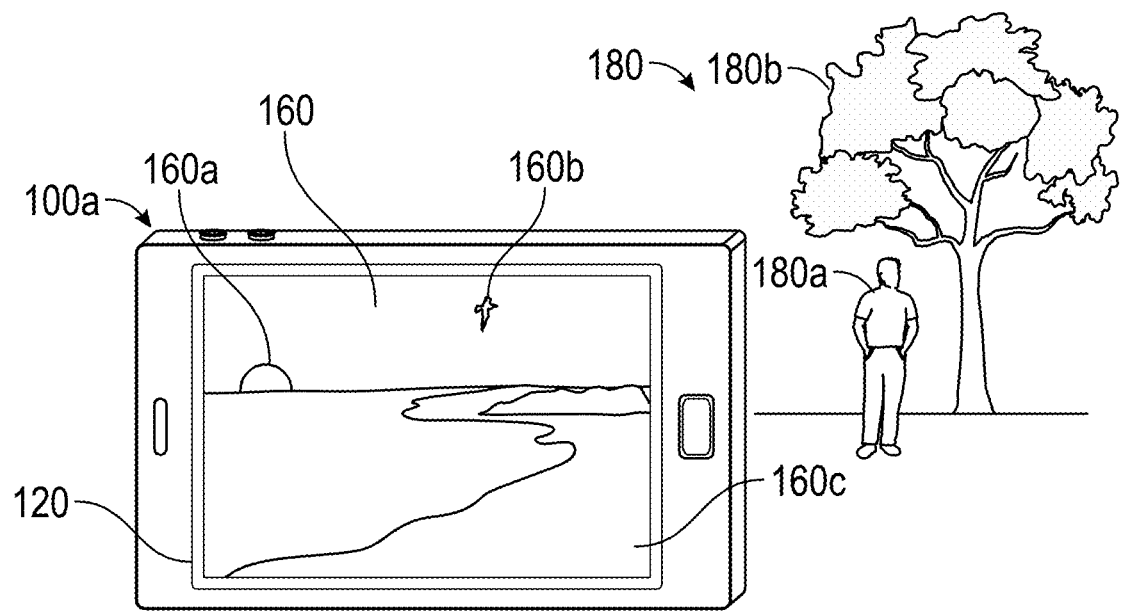
FIGS. 1C-1E illustrate embodiments of the system in the form of mobile devices.
Figure 1D:
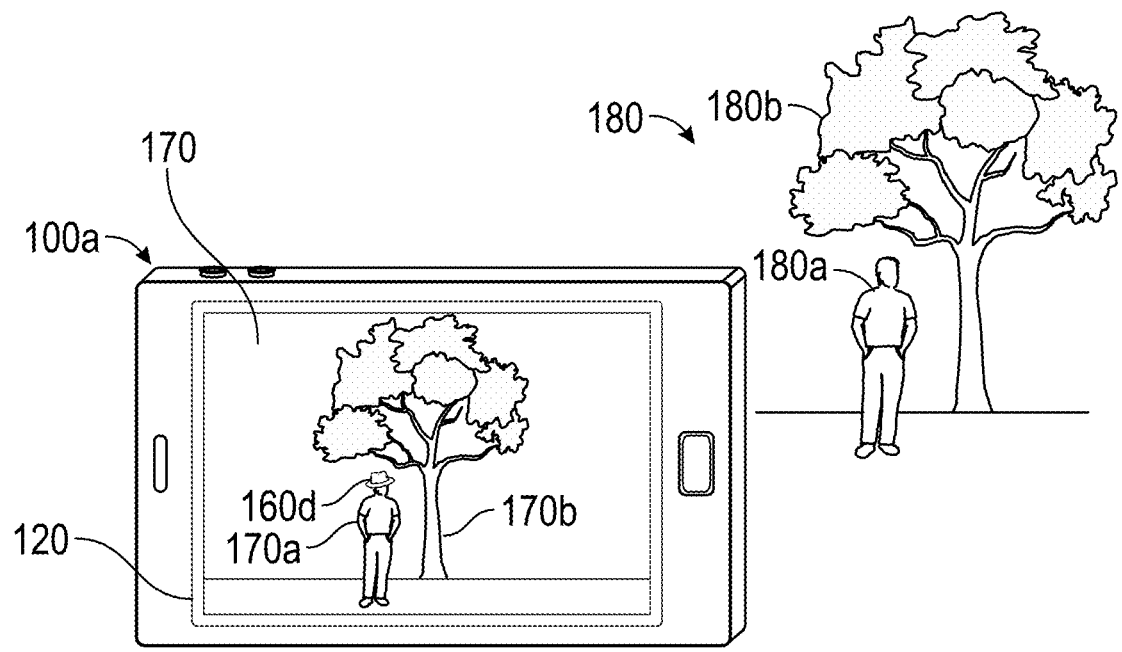
Figure 1E:
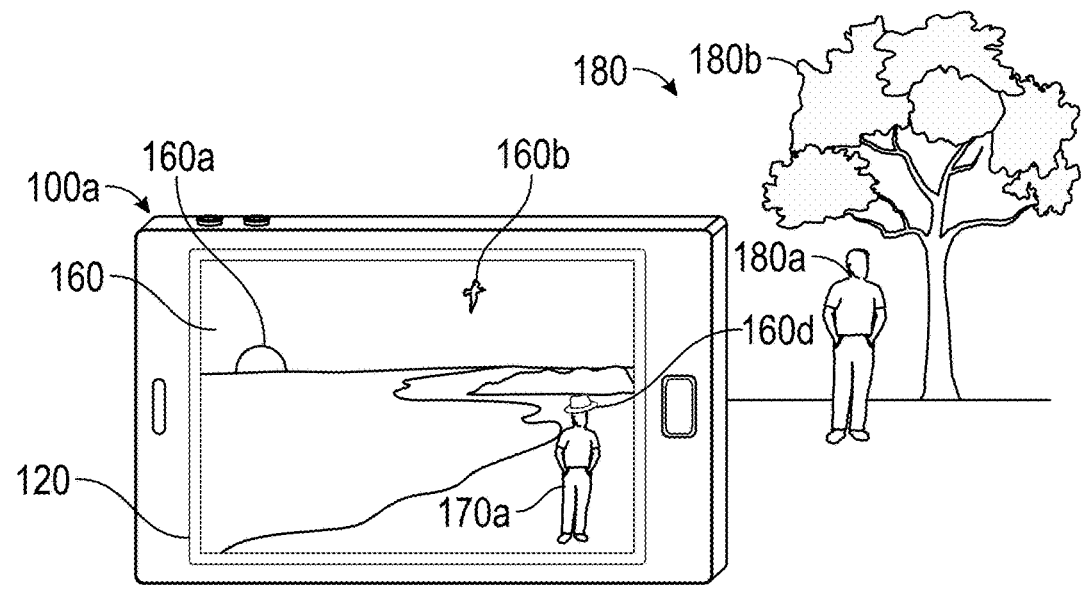

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. 1I.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some embodiments, system 100 uses CCD sensors, event cameras, and depth sensors in combination to detect the physical environment around system 100. In some embodiments, image sensor(s) 108 include a first image sensor and a second image sensor. The first image sensor and the second image sensor are optionally configured to capture images of physical objects in the real environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some embodiments, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate embodiments of system 100 in the form of device 100a. In FIGS. 1C-1E, device 100a is a mobile device, such as a cellular phone. FIG. 1C illustrates device 100a carrying out a virtual reality technique. Device 100a is displaying, on display 120, a virtual environment 160 that includes virtual objects, such as sun 160a, birds 160b, and beach 160c. Both the displayed virtual environment 160 and virtual objects (e.g., 160a, 160b, 160c) of the virtual environment 160 are computer-generated imagery. Note that the virtual reality environment depicted in FIG. 1C does not include representations of physical objects from the real environment 180, such as physical person 180a and physical tree 180b, even though these elements of real environment 180 are within the field of view of image sensor(s) 108 of device 100a.

FIG. 1D illustrates device 100a carrying out a mixed reality technique, and in particular an augmented reality technique, using pass-through video. Device 100a is displaying, on display 120, a representation 170 of the real environment 180 with virtual objects. The representation 170 of the real environment 180 includes representation 170a of person 180a and representation 170b of tree 180b. For example, the device uses image sensor(s) 108 to capture images of the real environment 180 that are passed through for display on display 120. Device 100a overlays hat 160d, which is a virtual object generated by device 100a, on the head of the representation 170a of person 180a. Device 100a tracks the location and/or orientation of physical objects with respect to the position and/or orientation of device 100a to enable virtual objects to interact with physical objects from the real environment in the augmented reality environment. In this embodiment, device 100a accounts for movements of device 100a and person 180a to display hat 160d as being on the head of the representation 170a of person 180a, even as device 100a and person 180a move relative to one another.

FIG. 1E illustrates device 100a carrying out a mixed reality technique, and in particular an augmented virtuality technique. Device 100a is displaying, on display 120, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a in real environment 180. Device 100a places representation 170a of person 180a in virtual environment 160 for display on display 120. Device 100a optionally tracks the location and/or orientation of physical objects with respect to the position and/or orientation of device 100a to enable virtual objects to interact with physical objects from real environment 180. In this embodiment, device 100a accounts for movements of device 100a and person 180a to display hat 160d as being on the head of representation 170a of person 180a. Notably, in this embodiment, device 100a does not display a representation of tree 180b even though tree 180b is also within the field of view of the image sensor(s) of device 100a, in carrying out the mixed reality technique.

Figure 1F:
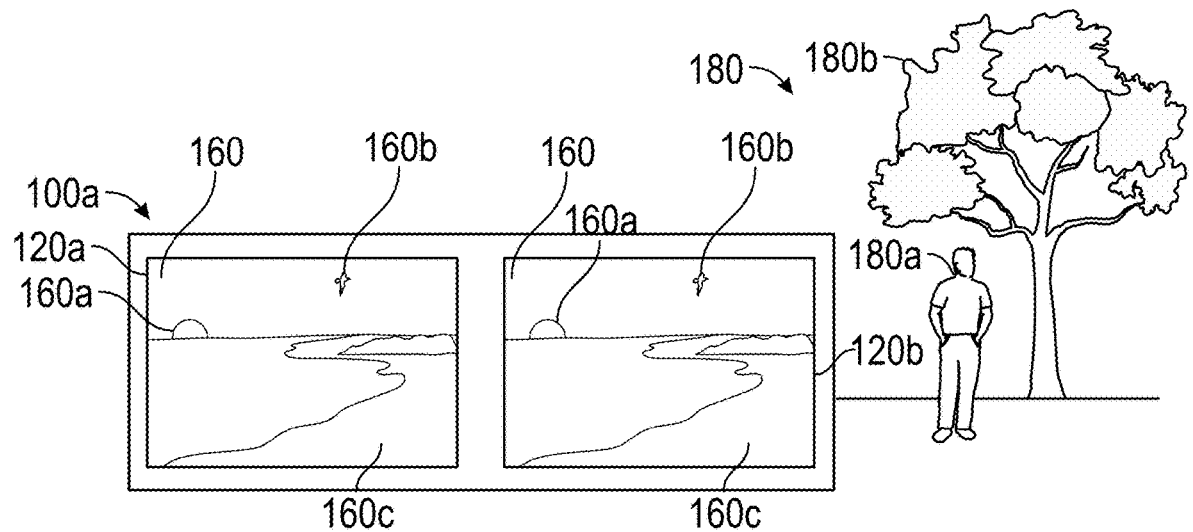
FIGS. 1F-1H illustrate embodiments of the system in the form of head mounted display (HMD) devices.
Figure 1G:
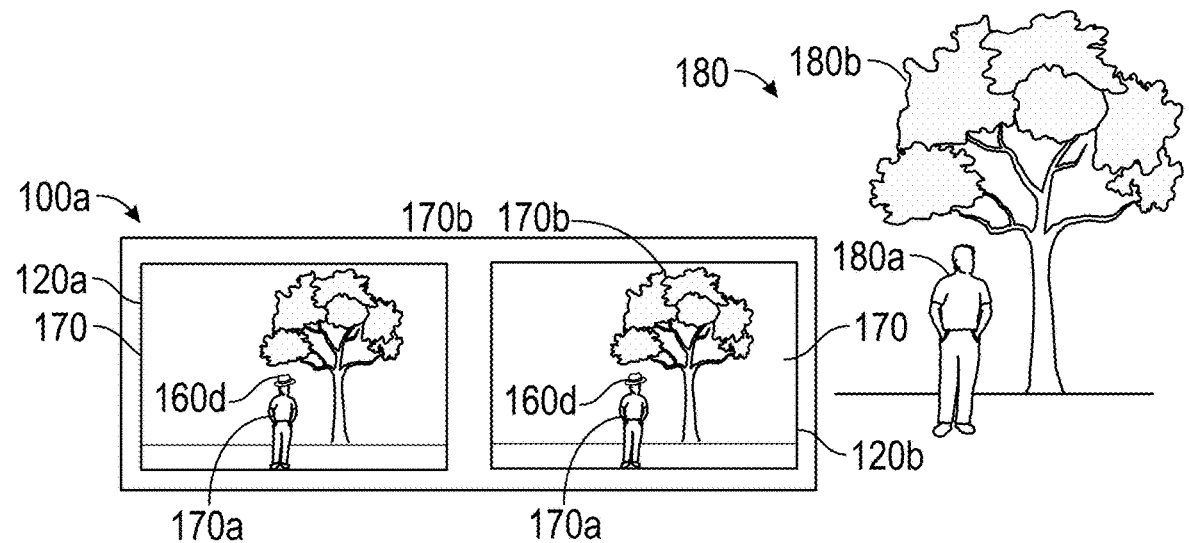
Figure 1H:
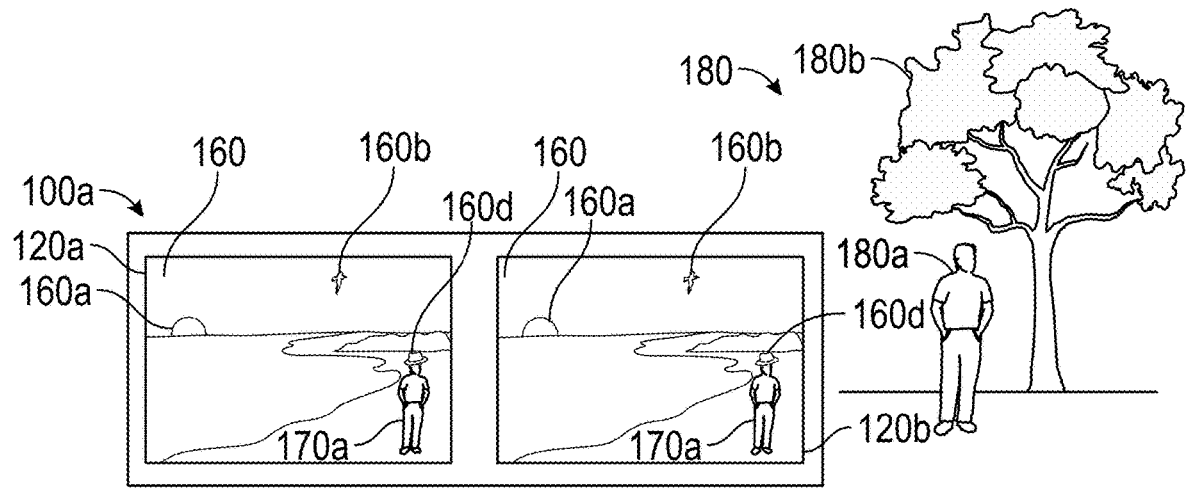

FIGS. 1F-1H illustrate embodiments of system 100 in the form of device 100a. In FIGS. 1F-1H, device 100a is a HMD device configured to be worn on the head of a user, with each eye of the user viewing a respective display 120a and 120b. FIG. 1F illustrates device 100a carrying out a virtual reality technique. Device 100a is displaying, on displays 120a and 120b, a virtual environment 160 that includes virtual objects, such as sun 160a, birds 160b, and beach 160c. The displayed virtual environment 160 and virtual objects (e.g., 160a, 160b, 160c) are computer-generated imagery. In this embodiment, device 100a simultaneously displays corresponding images on display 120a and display 120b. The corresponding images include the same virtual environment 160 and virtual objects (e.g., 160a, 160b, 160c) from different viewpoints, resulting in a parallax effect that provides a user with the illusion of depth of the objects on the displays. Note that the virtual reality environment depicted in FIG. 1F does not include representations of physical objects from the real environment, such as person 180a and tree 180b even though person 180a and tree 180b are within the field of view of the image sensor(s) of device 100a, in carrying out the virtual reality technique.

FIG. 1G illustrates device 100a carrying out an augmented reality technique using pass-through video. Device 100a is displaying, on displays 120a and 120b, a representation 170 of real environment 180 with virtual objects. The representation 170 of real environment 180 includes representation 170a of person 180a and representation 170b of tree 180b. For example, device 100a uses image sensor(s) 108 to capture images of the real environment 180 that are passed through for display on displays 120a and 120b. Device 100a is overlaying a computer-generated hat 160d (a virtual object) on the head of representation 170a of person 180a for display on each of displays 120a and 120b. Device 100a tracks the location and/or orientation of physical objects with respect to the position and/or orientation of device 100a to enable virtual objects to interact with physical objects from real environment 180. In this embodiment, device 100a accounts for movements of device 100a and person 180a to display hat 160d as being on the head of representation 170a of person 180a.

FIG. 1H illustrates device 100a carrying out a mixed reality technique, and in particular an augmented virtuality technique, using pass-through video. Device 100a is displaying, on displays 120a and 120b, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a. Device 100a places the representation 170a of the person 180a in the virtual environment for display on displays 120a and 120b. Device 100a optionally tracks the location and/or orientation of physical objects with respect to the position and/or orientation of device 100a to enable virtual objects to interact with physical objects from real environment 180. In this embodiment, device 100a accounts for movements of device 100a and person 180a to display hat 160d as being on the head of the representation 170a of person 180a. Notably, in this embodiment, device 100a does not display a representation of tree 180b even though tree 180b is also within the field of view of the image sensor(s) 108 of device 100a, in carrying out the mixed reality technique.

Figure 1I:
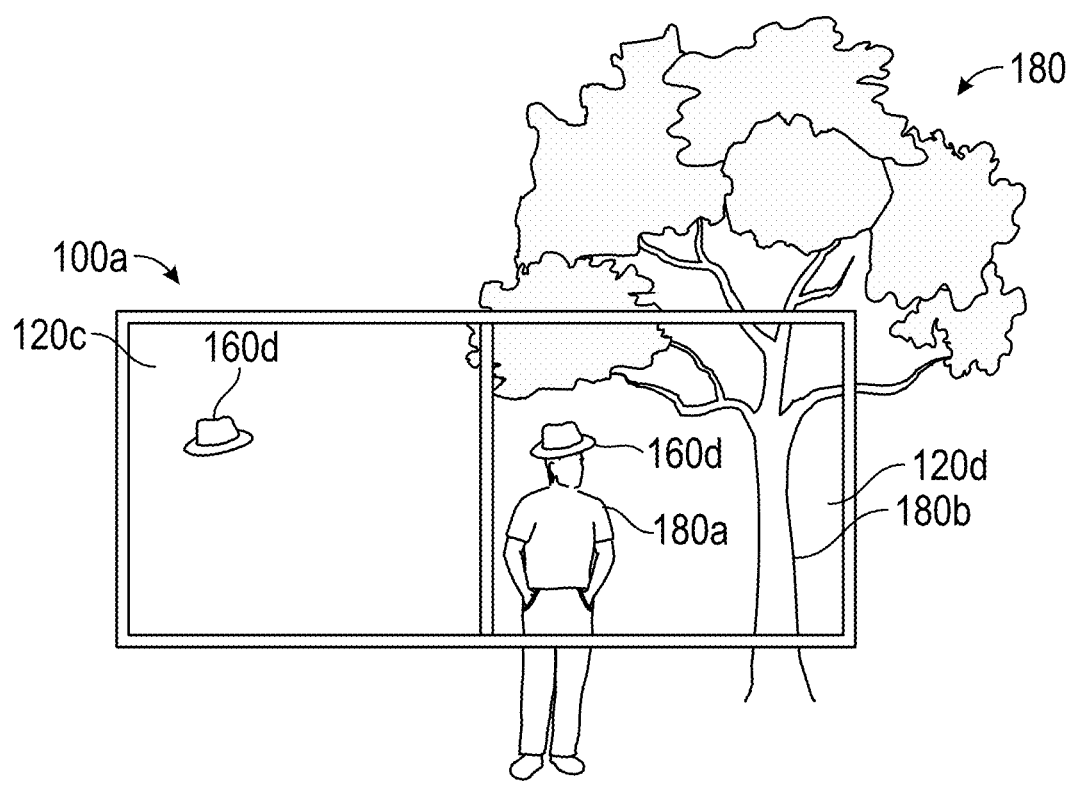
FIG. 1I illustrates an embodiment of the system in the form of a head-up display (HUD) device.

FIG. 1I illustrates an embodiment of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this embodiment, device 100a accounts for movements of device 100a, movements of the user's eyes with respect to device 100a, and movements of person 180a to display hat 160d at locations on displays 120c and 120d such that it appears to the user that the hat 160d is on the head of person 180a.

With reference now to FIGS. 2-15, exemplary techniques for interacting with an electronic device using an eye gaze are described.

Figure 2:
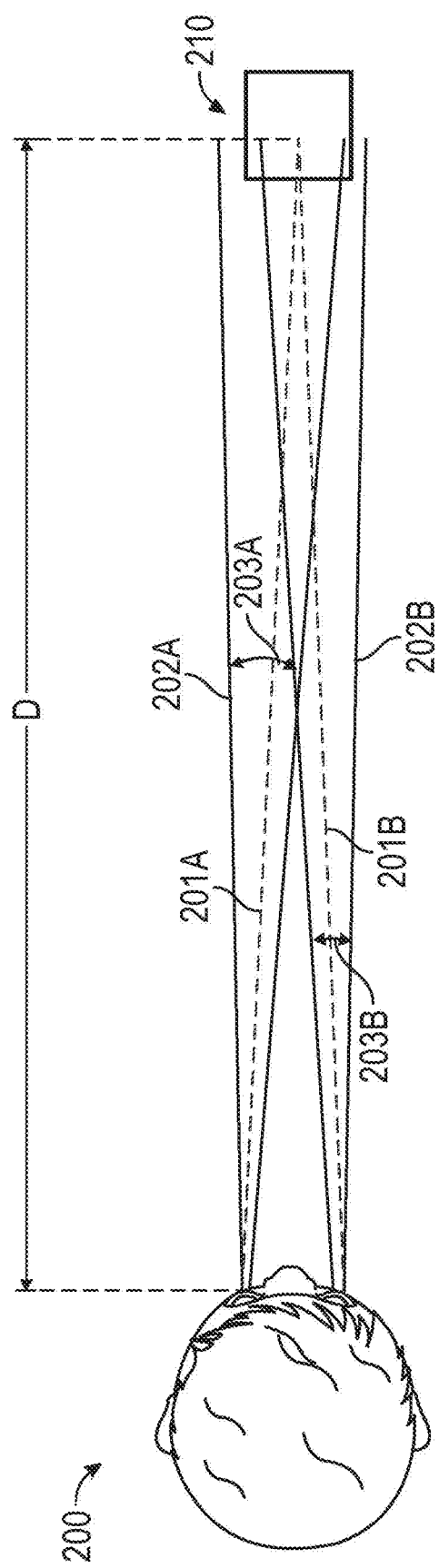
FIG. 2 illustrates a user viewing an object, according to various embodiments.

FIG. 2 depicts a top view of user 200 whose gaze is focused on object 210. The user's gaze is defined by the visual axes of each of the user's eyes. The direction of the visual axes define the user's gaze direction, and the distance at which the axes converge defines the gaze depth. The gaze direction can also be referred to as the gaze vector or line-of-sight. In FIG. 2, the gaze direction is in the direction of object 210 and the gaze depth is the distance D relative to the user.

In some embodiments, the center of the user's cornea, the center of the user's pupil, and/or the center of rotation of the user's eyeball are determined to determine the position of the visual axis of the user's eye, and can therefore be used to determine the user's gaze direction and/or gaze depth. In some embodiments, gaze depth is determined based on a point of convergence of the visual axes of the user's eyes (or a location of minimum distance between the visual axes of the user's eyes) or some other measurement of the focus of a user's eye(s). Optionally, the gaze depth is used to estimate the distance at which the user's eyes are focused.

In FIG. 2, rays 201A and 201B are cast along the visual axes of the left and right eyes of user 200, respectively, and are optionally used to determine the user's gaze direction and/or gaze depth in what is referred to as ray casting. FIG. 2 also depicts cones 202A and 202B having angular extents 203A and 203B, respectively. Cones 202A and 202B are also cast along the visual axes of the left and right eyes of user 200, respectively, and are optionally used to determine the user's gaze direction and/or gaze depth in what is referred to as cone casting. Gaze direction and gaze depth often cannot be determined with absolute accuracy or precision due to factors such as eye motion, sensor motion, sampling frequency, sensor latency, sensor resolution, sensor misalignment, etc. Accordingly, in some embodiments, an angular resolution or (estimated) angular error is associated with gaze direction. In some embodiments, a depth resolution is associated with gaze depth. Optionally, the angular extent of the cone(s) (e.g., angular extents 203A and 203B of cones 202A and 202B, respectively) represents the angular resolution of the user's gaze direction.

Figure 3:
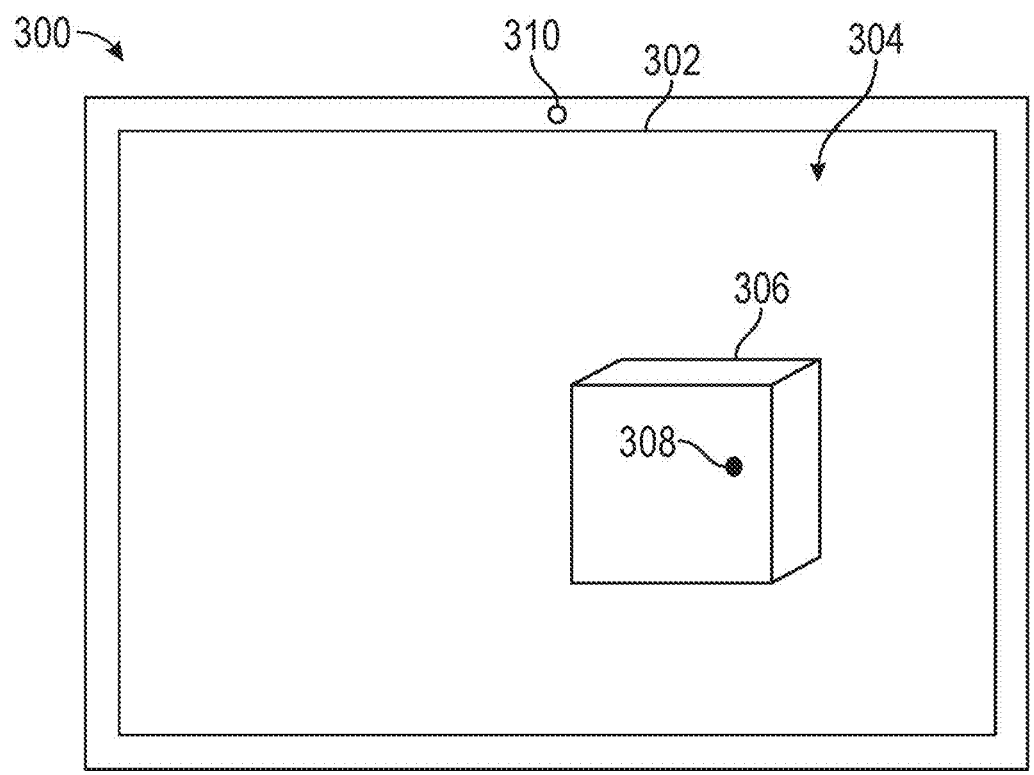
FIG. 3 illustrates a user interface for interacting with an electronic device using an eye gaze, according to various embodiments.
Figure 3:
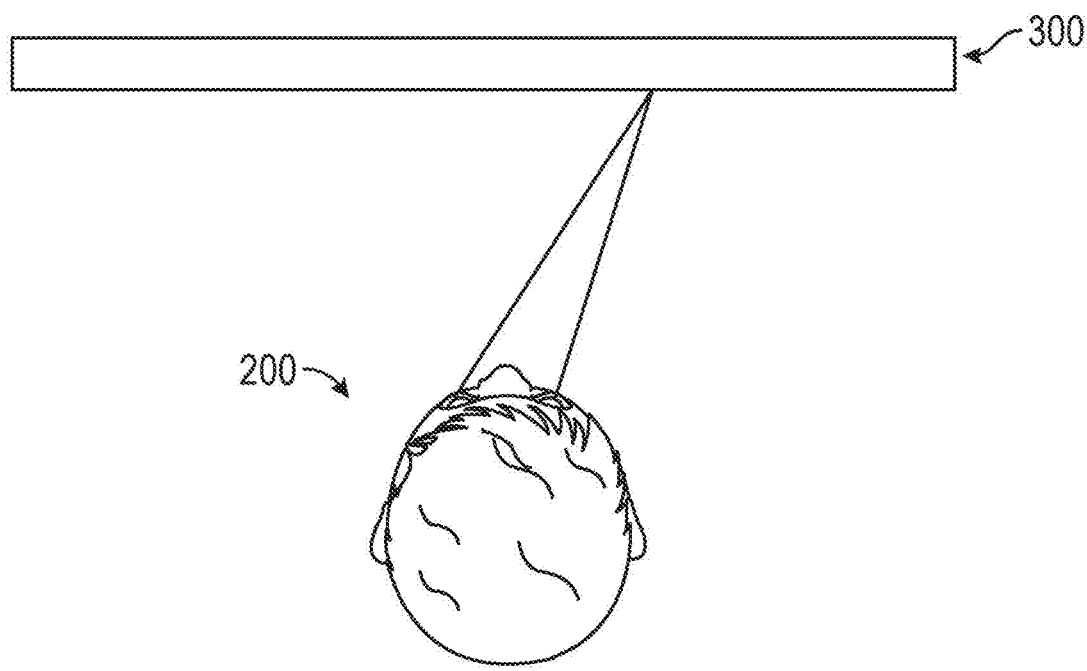

FIG. 3 depicts electronic device 300 with display 302. Electronic device 300 displays virtual environment 304, which includes virtual object 306. In some embodiments, environment 304 is a CGR environment (e.g., a VR or MR environment). In the illustrated embodiment, object 306 is an affordance with which user 200 can interact using a gaze. In some embodiments, affordance 306 is associated with a physical object (e.g., an appliance or other device that can be controlled via interaction with affordance 306). FIG. 3 also depicts a view from above user 200 that shows the gaze direction of user 200. The visual axes of each of the user's eyes are extrapolated onto a plane of the displayed representation of virtual environment 304, which corresponds to the plane of display 302 of device 300. Spot 308 represents the gaze direction of user 200 on display 302.

As shown in FIG. 3, the gaze direction of user 200 corresponds to the direction of affordance 306. The term "affordance" refers to a graphical user interface object with which a user can interact. Examples of affordances include user-interactive images (e.g., icons), buttons, and text (e.g., hyperlinks). Electronic device 300 is configured to determine the gaze direction of user 200. Device 300 captures data from a sensor directed toward the user and determines the gaze direction based on the data captured from the sensor. In some embodiments in which a three-dimensional representation of a scene is presented, such as the embodiment described below with respect to FIGS. 9-12, device 300 also (or alternatively) determines a gaze depth and whether the gaze depth corresponds to affordance 306. Optionally, determining whether the gaze depth corresponds to the depth of the affordance is based at least in part on the depth resolution of the gaze depth.

In the illustrated embodiment, device 300 includes image sensor 310, which is directed toward user 200 and captures image data of the eyes of user 200. In some embodiments, device 300 includes an event camera that detects event data from a user (e.g., the user's eyes) based on changes in detected light intensity over time and uses the event data to determine gaze direction and/or gaze depth. Optionally, device 300 uses both image data and event data (e.g., from an image sensor and a separate event camera or a sensor configured to capture image data and event data) to determine gaze direction and/or gaze depth. Optionally, device 300 uses ray casting and/or cone casting to determine the gaze direction and/or gaze depth.

Based on the gaze direction, device 300 determines that the gaze direction corresponds to affordance 306, since the gaze direction is in the same direction as affordance 306 (e.g., rays or cones cast from the eyes of user 200 at least partially intersect affordance 306 or are within a margin of error of affordance 306). Optionally, determining that the gaze direction corresponds to affordance 306 is based at least in part on an angular resolution of the gaze direction. In some embodiments in which a three-dimensional representation of a scene is presented, device 300 also (or alternatively) determines whether the gaze depth corresponds to a depth of affordance 306. Optionally, determining whether the gaze depth corresponds to the depth of the affordance is based at least in part on a depth resolution of the gaze depth. Optionally, affordance 306 is also located at the gaze depth (or within a depth range that is based on the depth resolution of the gaze depth).

In some embodiments, a gaze direction and/or gaze depth is determined to continue to correspond to a gaze at an affordance even after the gaze direction and/or gaze depth no longer overlaps with the affordance (e.g., once the gaze direction and/or gaze depth is initially determined to correspond to a gaze at the affordance, the gaze direction and/or gaze depth is considered to correspond to a gaze at the affordance for at least a predetermined amount of time or for a predetermined amount of time after the user looks away from the affordance).

While the gaze direction is determined to correspond to a gaze at affordance 306, device 300 receives an input (referred to as a "confirming action") that represents an instruction to take action on the affordance corresponding to the first object. For example, the confirming action is received while user 200 is determined to be looking at affordance 306.

In response to receiving the confirming action, device 300 selects affordance 306. That is, affordance 306 is selected in response to the combination of the user looking at affordance 306 and providing a confirming action. The confirming action is beneficial for preventing false positives (e.g., incorrect determinations by device 300 that user 200 desires to select or act upon affordance 306). Non-limiting examples of a confirming action include an eye gesture, a body gesture, a voice input, a controller input, or a combination thereof.

Examples of an eye gesture include a single blink, multiple blinks, a predetermined number of blinks, a predetermined number of blinks within a predetermined amount of time, a blink of a predetermined duration (e.g., eyes closed for one second), a blink pattern (e.g., one slow blink followed by two rapid blinks), a wink, a wink with a particular eye, a wink pattern (e.g., left, right, left, each with a specified duration), an predetermined eye motion (e.g., a quick look up), a "long" look or dwell (e.g., continuously maintaining the gaze direction in the direction of affordance 306 (or in a direction corresponding to affordance 306) for a predetermined amount of time), or an eye motion that meets some other predetermined criteria.

Examples of a hand gesture include placement of a hand at a location corresponding to the location of affordance 306 (e.g., between the user and the display of affordance 306), a wave, a pointing motion (e.g., at affordance 306), or a gesture with a predefined motion pattern. In some embodiments, the hand gesture confirming action depends on the location of the hand gesture (e.g., the hand gesture must be at a particular location). In some embodiments, the hand gesture confirming action does not depend on the location of the hand gesture (e.g., the hand gesture is location-independent).

Example of a voice input include a voice command (e.g., "pick that up" or "turn on the light"). In some embodiments, the voice input explicitly identifies the object associated with affordance 306 (e.g., "select the box"). In some embodiments, the voice input does not explicitly identify the object associated with the affordance and instead refers to the object using a pronoun that is otherwise ambiguous (e.g., "grab that").

With respect to a controller input, in some embodiments, device 300 is in communication with a controller that is configured to receive inputs via, for example, a button, trigger, joystick, scroll wheel, knob, keyboard, or touch-sensitive surface (e.g., a touchpad or touch-sensitive display). In some embodiments, the controller and device 300 are connected wirelessly or via a wired connection. Examples of a controller input include a press of a button, a pull of a trigger, a movement of a joystick, a rotation of a scroll wheel, a rotation of a knob, a press of a button on a keyboard, or a contact or gesture (e.g., tap or swipe) on a touch-sensitive surface.

In some embodiments, selecting affordance 306 includes applying focus on affordance 306. Optionally, device 300 provides an indication that affordance 306 has been selected. In some embodiments, the indication includes an audio output (e.g., a beep), a visual indication (e.g., outlining or highlighting the selected affordance), or haptic output. Optionally, affordance 306 remains selected for a predetermined amount of time (e.g., focus is maintained on affordance 306 for the predetermined amount of time). Optionally, affordance 306 remains selected until a deselection input is received. In some embodiments, the deselection input is the same input as the confirming action. In some embodiments, the deselection input is a different input than the confirming action. In some embodiments, the deselection input includes an eye gesture, a body gesture, a voice input, a controller input, or a combination or portion thereof, such as the exemplary inputs described above.

Figure 4:
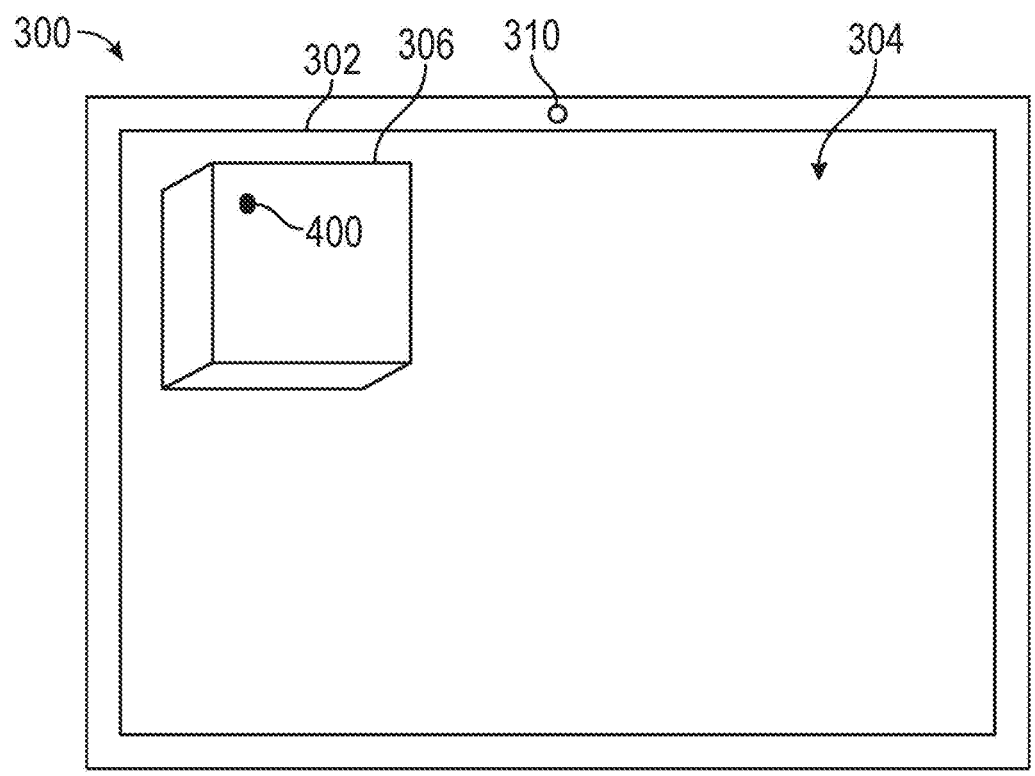
FIG. 4 illustrates a user interface for interacting with an electronic device using an eye gaze, according to various embodiments.
Figure 4:
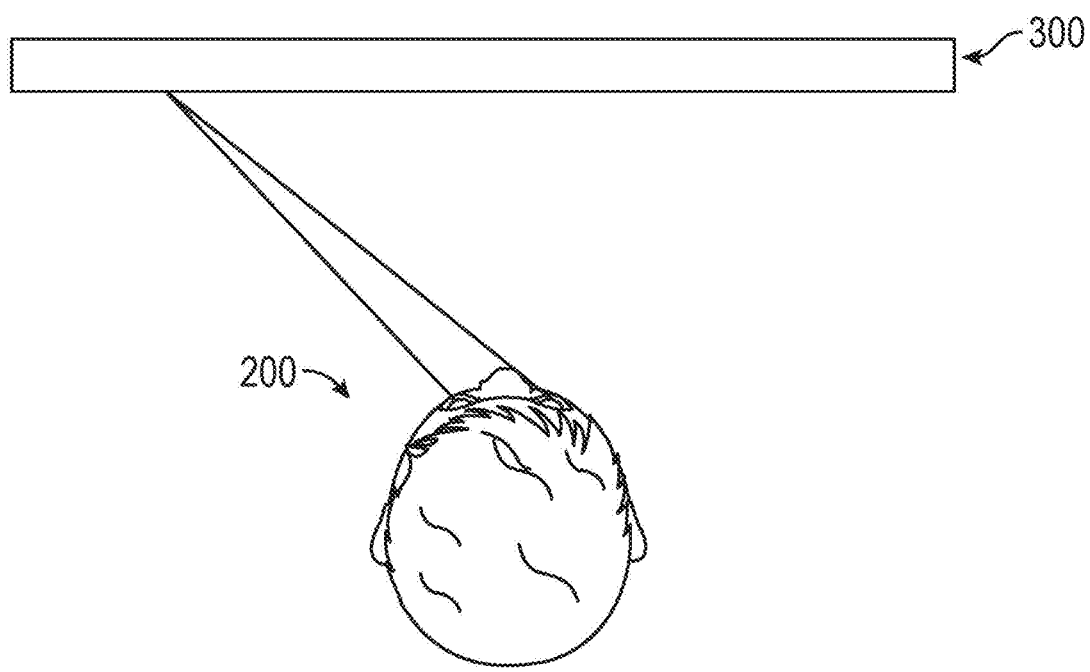

In some embodiments, affordance 306 remains selected until an action associated with affordance 306 (or the object with which it is associated) is performed. FIG. 4 illustrates an exemplary action performed on affordance 306. While affordance 306 is selected, device 300 receives an input (e.g., an eye gesture, a body gesture, a voice input, a controller input, or a combination or portion thereof, such as the exemplary inputs described above). In the illustrated example, the input includes user 200 changing the position of his eyes such that his gaze direction moves on display 302 from location 308 to location 400 shown in FIG. 4. In response to receiving the input, device 300 performs an action associated with affordance 306 in accordance with the input. In some embodiments, an action associated with affordance 306 is performed in response to the input that causes device 300 to select affordance 306 (e.g., selecting affordance 306 includes performing the action associated with affordance 306). In the example illustrated in FIG. 4, device 300 moves affordance 306 in accordance with the change in the gaze direction of user 200, translating affordance 306 upward and to the left on display 302 from the location of affordance 306 shown in FIG. 3 to the location shown in FIG. 4.

In addition to moving an affordance, exemplary actions include transforming the affordance or a representation of an object associated with the affordance (e.g., rotating, twisting, stretching, compressing, enlarging, and/or shrinking affordance 306) and changing the state of a device associated with the affordance (e.g., turning a lamp on or off). For example, in some embodiments, the affordance is a virtual dial associated with a thermostat. A user can select the virtual dial and then adjust the temperature of the thermostat. In some embodiments, some aspect of the position of an affordance (or object associated therewith) is automatically determined when an object is moved. For example, if a virtual picture frame that is initially lying flat on a horizontal surface is moved to a wall, the frame is automatically rotated to a vertical orientation to lay flat against the wall.

Figure 5:
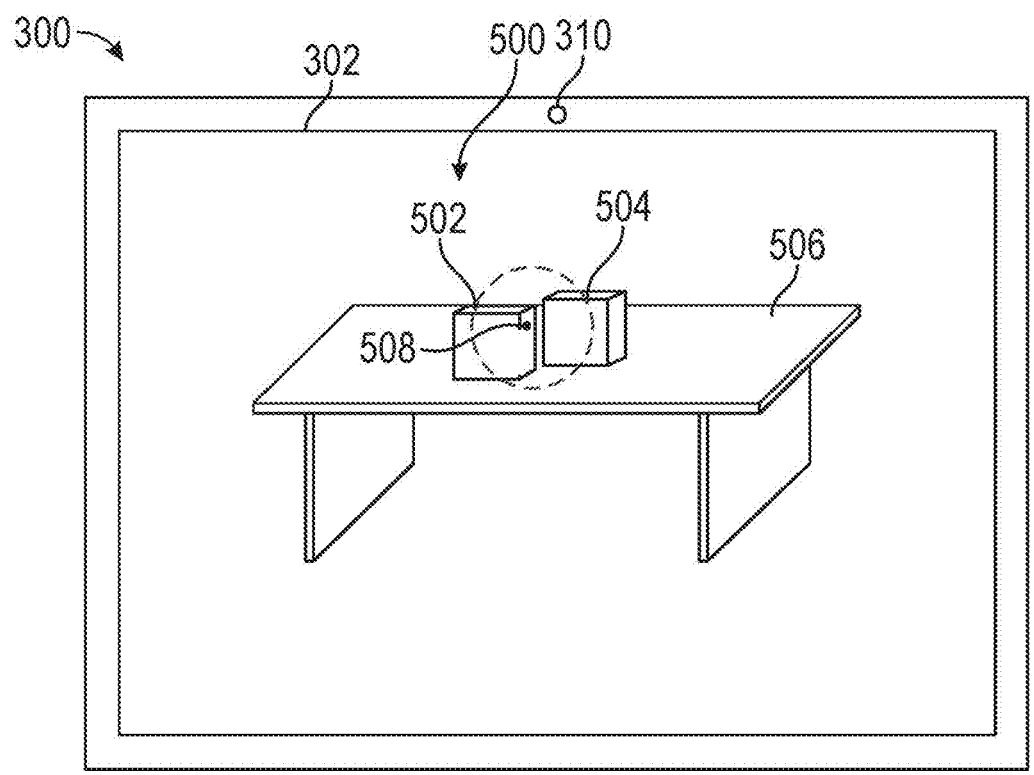
FIG. 5 illustrates a user interface for interacting with an electronic device using an eye gaze, according to various embodiments.
Figure 5:
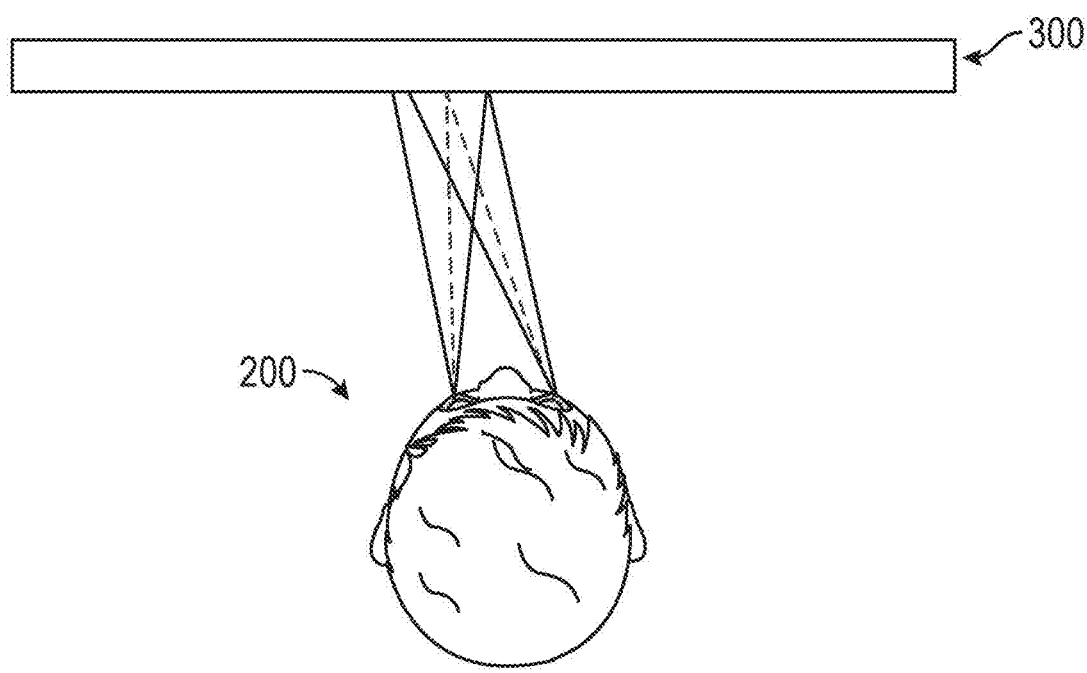

Turning now to FIG. 5, techniques related to resolving and selecting closely spaced objects are described. FIG. 5 depicts virtual environment 500 displayed on device 300. In some embodiments, environment 500 is a CGR environment (e.g., a VR or MR environment). Virtual environment 500 includes affordance 502 and affordance 504, each associated with a respective box on top of virtual table 506 and displayed concurrently on display 302. The dashed circle represents gaze direction 508 of user 200 determined by device 300. The radius of the circle represents the angular uncertainty of gaze direction 508. As illustrated in FIG. 5, gaze direction 508 overlaps both affordance 502 and affordance 504, indicating that user 200 is interested in one of the affordances. Although gaze direction 508 is directed slightly more toward affordance 502, the angular uncertainty of gaze direction 508 is greater than the angular separation between affordance 502 and affordance 504, which prevents device 300 from determining with a sufficiently high level of confidence that gaze direction 508 corresponds to a specific one of affordance 502 and affordance 504. In other words, device 300 cannot resolve with sufficient confidence which affordance user 200 desires to select. Instead, device 300 determines that gaze direction 508 corresponds to both affordance 502 and affordance 504. In some embodiments in which a three-dimensional representation of a scene is presented, a depth separation between the affordances may be less than the angular resolution or depth resolution of the gaze position.

Figure 6:
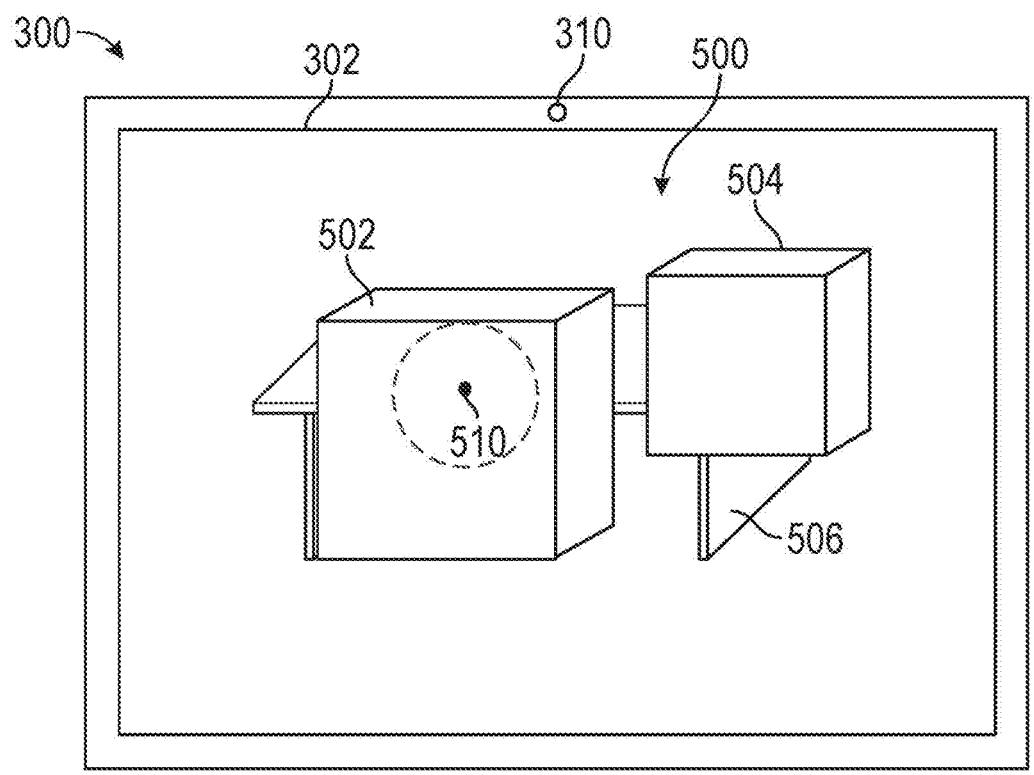
FIG. 6 illustrates a user interface for interacting with an electronic device using an eye gaze, according to various embodiments.
Figure 6:
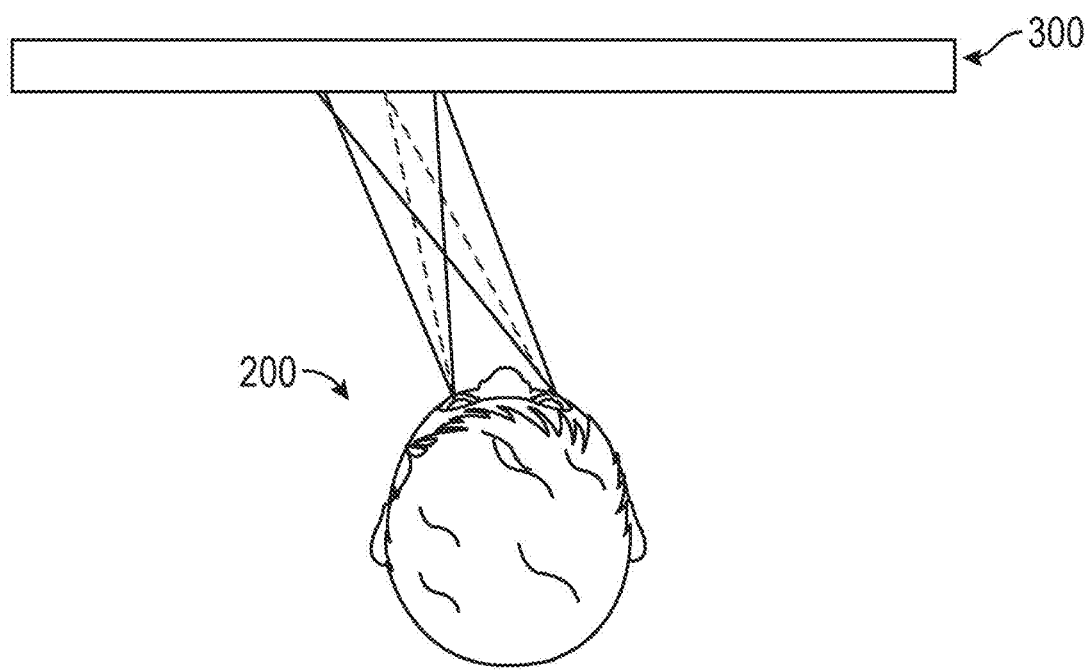

In response to determining that gaze direction 508 corresponds to both affordance 502 and affordance 504, device 300 enlarges affordance 502 and affordance 504. FIG. 6 illustrates affordance 502 and affordance 504 after being enlarged (e.g., zoomed in). Affordance 502 and affordance 504 appear as though they have been moved from the top of table 506 and positioned closer to user 200. In FIG. 6, affordance 502 and affordance 504 are enlarged by the same amount such that their relative size and position remain the same (e.g., affordance 502 continues to appear to be in front of affordance 504). Zooming in affordance 502 and affordance 504 increases the angular extent of affordance 502 and affordance 504 and increases the angular separation between affordance 502 and affordance 504. Optionally, the amount of zooming is based on the size of the affordances and/or the resolution of the gaze direction (e.g., affordance 502 and affordance 504 are enlarged such that affordance 504 is a predetermined minimum size). In some embodiments, affordance 502 and affordance 504 are zoomed so that device 300 can resolve (with a predetermined level of confidence) which affordance user 200 is attempting to focus on.

In some embodiments, affordance 502 and affordance 504 are enlarged in accordance with a determination that the gaze of user 200 meets predefined criteria (e.g., gaze direction 508 corresponds to both affordance 502 and affordance 504 continuously for a predetermined amount of time or for a predetermined amount of time within a predefined window of time (e.g., 3 seconds during a 4 second window)). In some embodiments, affordance 502 and affordance 504 are enlarged in response to device 300 receiving an input (e.g., an eye gesture, a hand gesture, a voice input, or a controller input as described above) while gaze direction 508 corresponds to both affordance 502 and affordance 504. In this way, user 200 can have improved control over when device zooms content. Also, in this way, device 300 can reduce or limit the instances in which it invokes zooming functionality to resolve gaze ambiguities to instances where resolution is necessary, thereby reducing strain on the user and improving the user's experience. Optionally, the affordances corresponding to the gaze direction are enlarged in accordance with the input (e.g., a long and/or hard button press results in more enlarging that a short and/or soft button press). In some embodiments, the affordances are enlarged in accordance with a voice command (e.g., "zoom in 40%"). This allows user 200 to have increased control over the zooming.

Enlarging affordance 502 and affordance 504 provides user 200 with an improved view of the affordances and allows user 200 to more easily and confidently select one of the affordances. For example, as shown in FIG. 6, after affordance 502 and affordance 504 are enlarged, user 200 decides that he wants to select affordance 502 and moves his line of sight to gaze direction 510 on affordance 502. Notably, gaze direction 510 no longer overlaps with affordance 504. Accordingly, device 300 determines (e.g., with a relatively high degree of confidence) that gaze direction 510 corresponds to the direction of affordance 502 (and does not correspond to the direction of affordance 504). While gaze direction 510 is determined to correspond to the direction of enlarged affordance 502, user 200 selects affordance 502 with a confirming action, such as one of the confirming actions discussed above. Optionally, device 300 performs an action associated with affordance 502 responsive to, and in accordance with, the confirming input by user 200 for selecting enlarged affordance 502 and/or in response to a further input while affordance 502 is selected. In response to the confirming input by user 200 for selecting enlarged affordance 502, device 300 optionally reduces (e.g., zooms out) affordance 502 and affordance 504 back to a previous state (e.g., the sizes and positions prior to being enlarge, depicted in FIG. 5). In some embodiments, affordance 502 remains selected after being reduced to the previous state.

Figure 7:
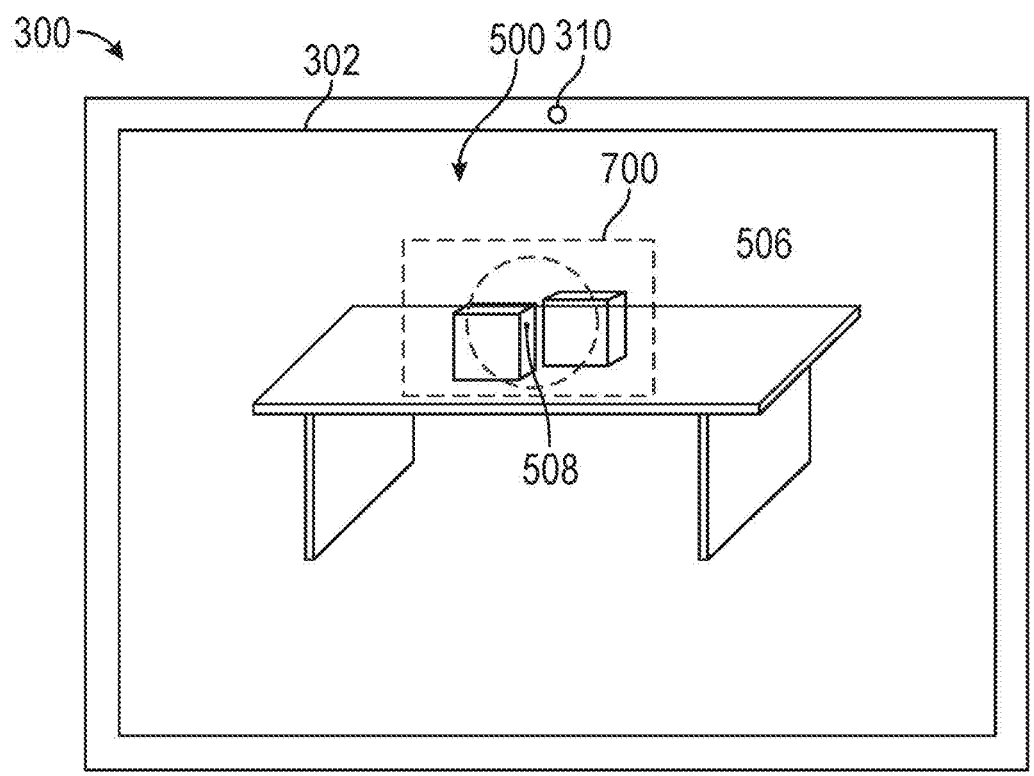
FIG. 7 illustrates a user interface for interacting with an electronic device using an eye gaze, according to various embodiments.
Figure 7:
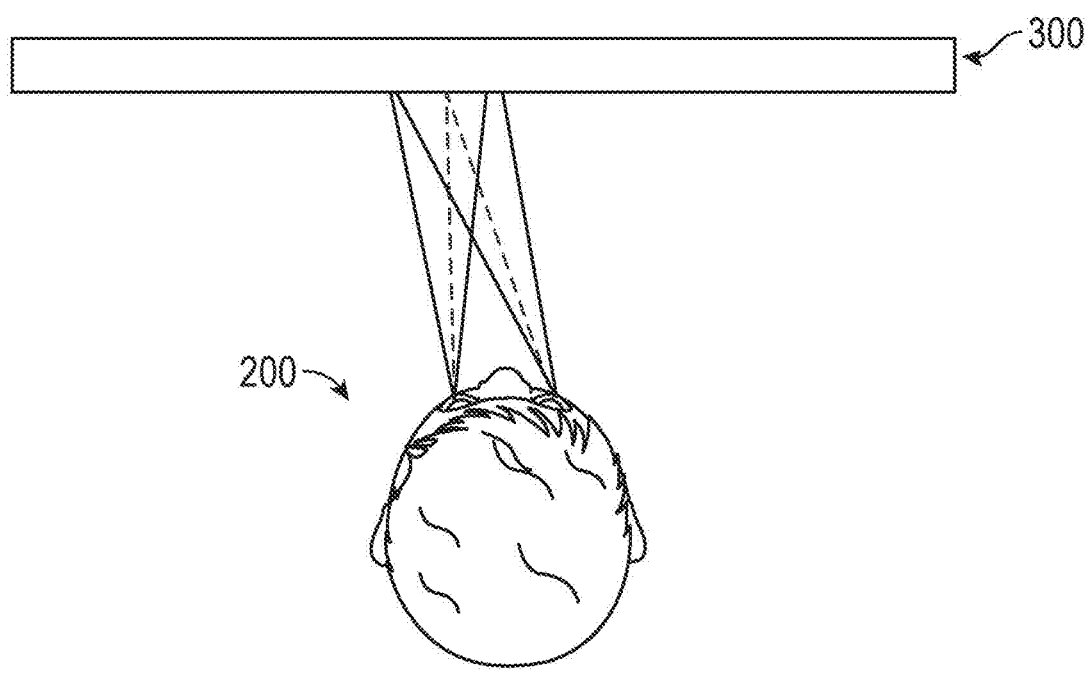
Figure 8:
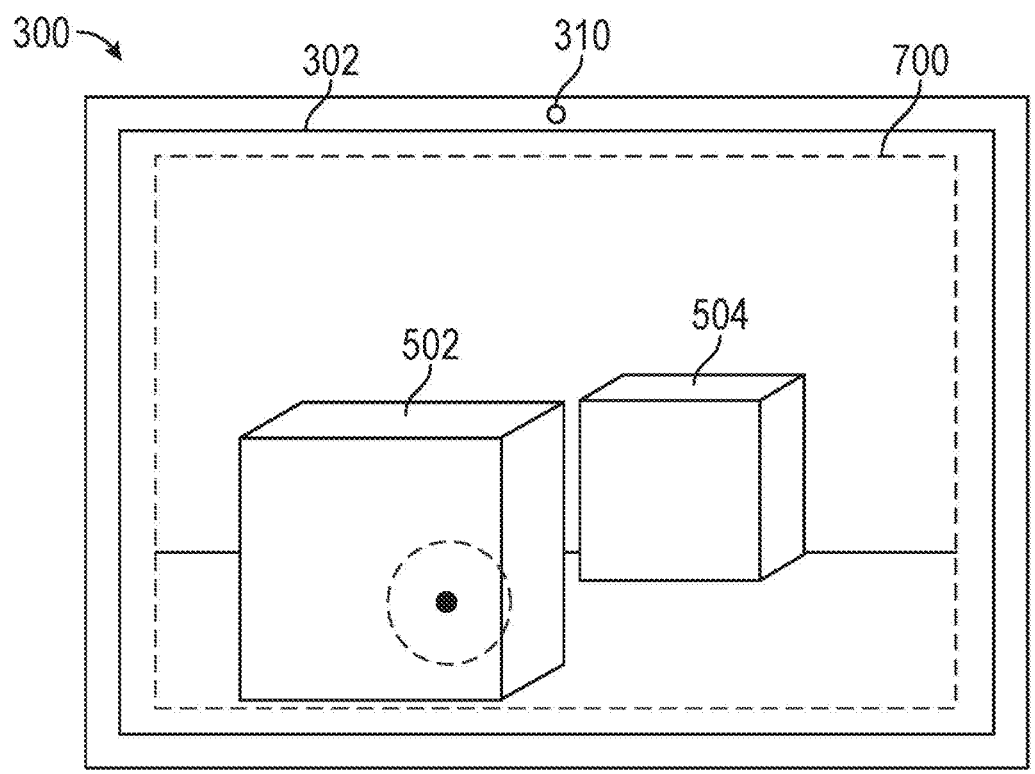
FIG. 8 illustrates a user interface for interacting with an electronic device using an eye gaze, according to various embodiments.
Figure 8:
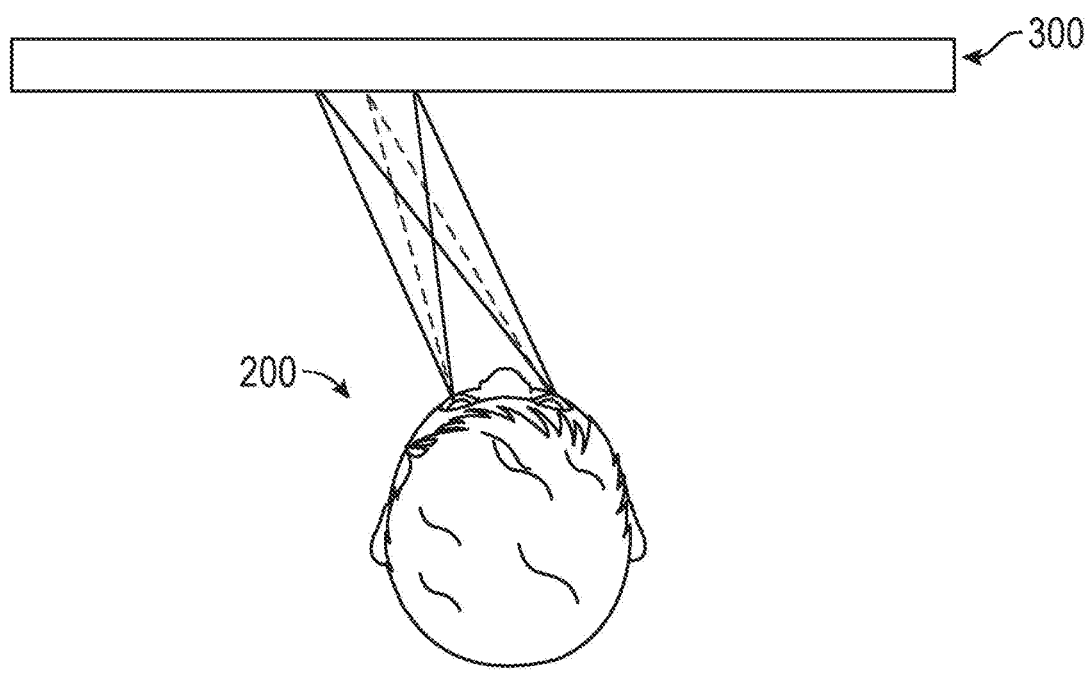

In the embodiment described above with respect to FIGS. 5-6, device 300 enlarges only affordances 502 and 504. In some embodiments, device 300 displays an enlarged view of at least a portion of an environment that surrounds affordance 502 and affordance 504 in addition to enlarging affordance 502 and affordance 504. FIG. 7 depicts an exemplary embodiment in which device 300 determines a portion of virtual environment 500 that surrounds and includes the affordances corresponding to gaze direction 508. The portion is designated by rectangle 700 and includes, for example, a portion of table 506 in addition to affordances 502 and 504. As shown in FIG. 8, in response to determining that gaze direction 508 corresponds to both affordance 502 and affordance 504, device 300 enlarges the portion of virtual environment 500 designated by rectangle 700, including affordance 502 and affordance 504. Although a portion of virtual environment 500 is enlarged along with in affordances 502 and 504, the affordances can still be selected and acted upon as described above with respect to FIGS. 5-6. Furthermore, although the embodiments described above refer to a virtual environment, similar techniques can be applied to other CGR environments, including mixed reality environments. For example, in some embodiments, a device includes a transparent display that displays affordances 502 and 504 overlaid on a user's live view of a physical environment. The device also includes a user sensor for capturing user eye data and a scene sensor for capturing images of the physical environment over which affordances 502 and 504 are displayed. In response to determining that a user's gaze direction corresponds to affordances 502 and 504, the exemplary device captures data of at least the physical environment surrounding affordances 502 and 504 and displays an enlarged representation (e.g., image) of the physical environment surrounding affordances 502 and 504.

Figure 9:
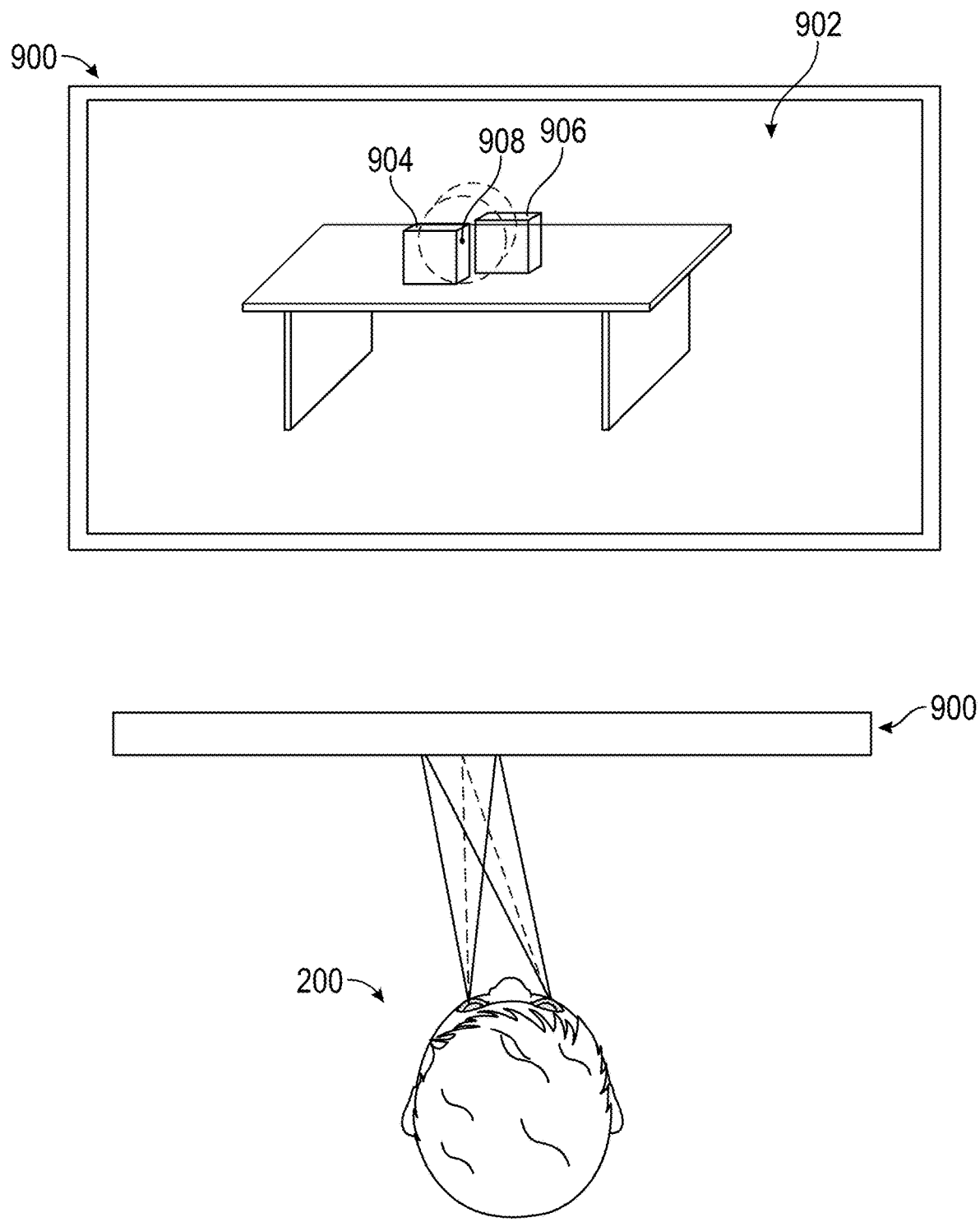
FIG. 9 illustrates a user interface for interacting with an electronic device using an eye gaze, according to various embodiments.
Figure 10:
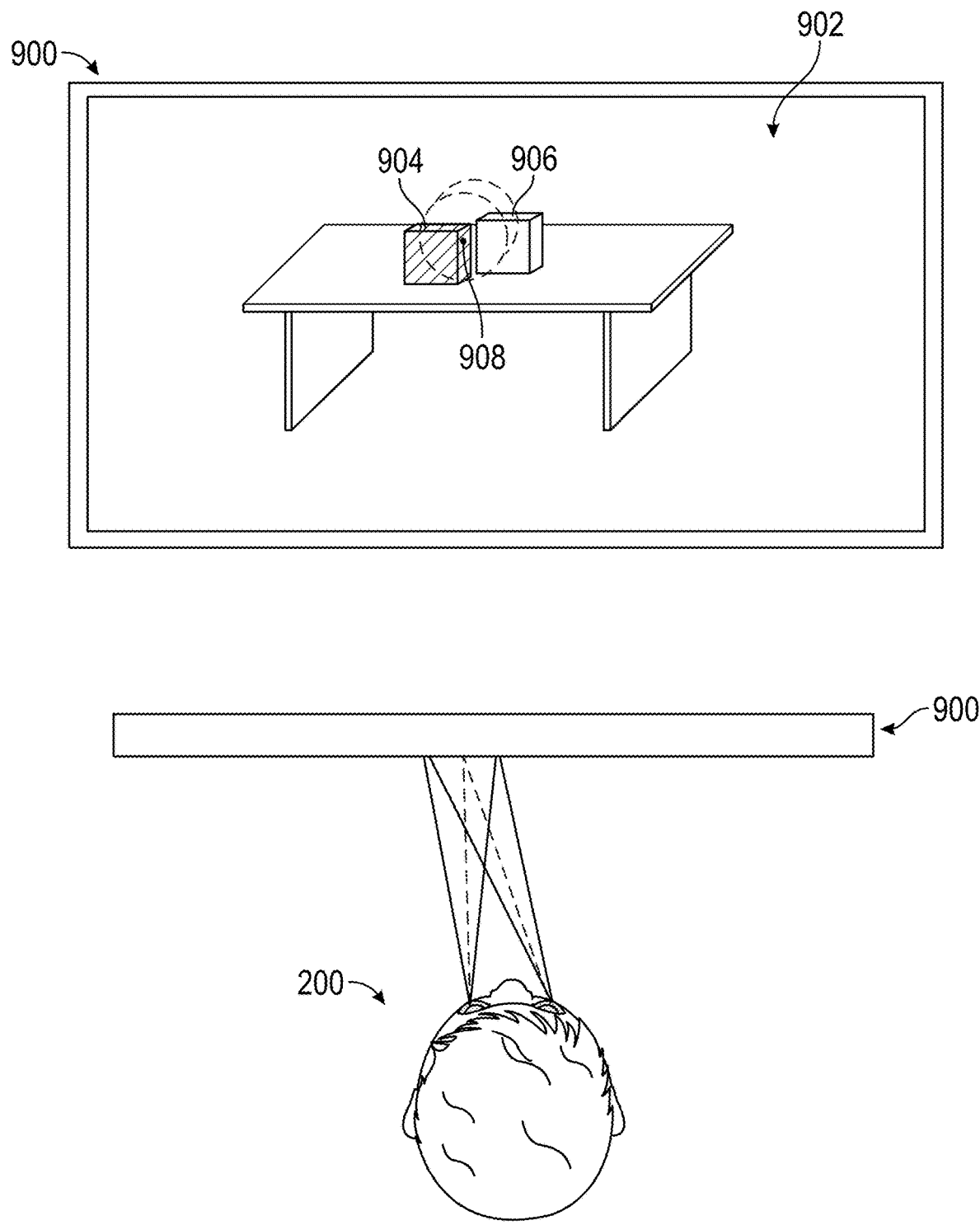
FIG. 10 illustrates a user interface for interacting with an electronic device using an eye gaze, according to various embodiments.

In the embodiments described above, affordances 502 and 504 are displayed in a two-dimensional representation of a virtual environment. In some embodiments, affordances are displayed in a three-dimensional (3D) representation of an environment on, for example, virtual reality HMD 100a depicted in FIGS. 1F-1H. FIG. 9 illustrates a 3D representation of virtual environment 902 displayed on HMD 900. In some embodiments, environment 902 is a CGR environment (e.g., a VR or MR environment). Virtual environment 902 includes affordance 904 and affordance 906. Affordance 904 has a first depth and affordance 906 has a second depth that is greater than the first depth of affordance 904. Since virtual environment 902 is a 3D representation, device 900 determines a gaze position, which in the illustrated embodiment includes a gaze direction and a gaze depth, based on data captured from the eyes of the user. In some embodiments, determining a gaze position includes determining a gaze direction, but not necessarily a gaze depth. In some embodiment, determining a gaze position includes determining a gaze depth, but not necessarily a gaze direction.

In FIG. 9, the radius of the cylinder surrounding gaze position 908 represents the angular resolution of the gaze direction, and the length of the cylinder represents the depth resolution of the gaze depth (e.g., the uncertainty in the gaze depth). Based on the gaze direction, angular resolution, gaze depth, and depth resolution, device 900 determines whether the position of affordance 904 and/or affordance 906 correspond to the gaze position. In some embodiments, device 900 determines whether position of affordance 904 and/or affordance 906 correspond to the gaze position based on the gaze direction (and optionally the angular resolution) regardless of the gaze depth, or based on the gaze depth (and optionally the depth resolution) regardless of the gaze direction.

In some embodiments, device 900 enhances the display of the more distant affordance (e.g., affordance 906) in response to determining that the gaze position corresponds to both affordance 904 and affordance 906. According to the embodiment depicted in FIG. 10, affordance 906 is enhanced by making affordance 906 brighter relative to affordance 904 (e.g., by increasing the brightness of affordance 906, decreasing the brightness of affordance 904, or a combination of both). In some embodiments, enhancing an affordance includes altering the visual appearance of the affordance itself (e.g., by making the affordance brighter or changing the color of the affordance). In some embodiments, enhancing an affordance includes degrading the visual appearance of other aspects of an environment (e.g., by making another affordance or the surrounding environment appear blurry). Similarly, in a 2D representation of a 3D environment, a smaller object or an object that has a greater depth value in the 3D environment is optionally enhanced.

Figure 11:
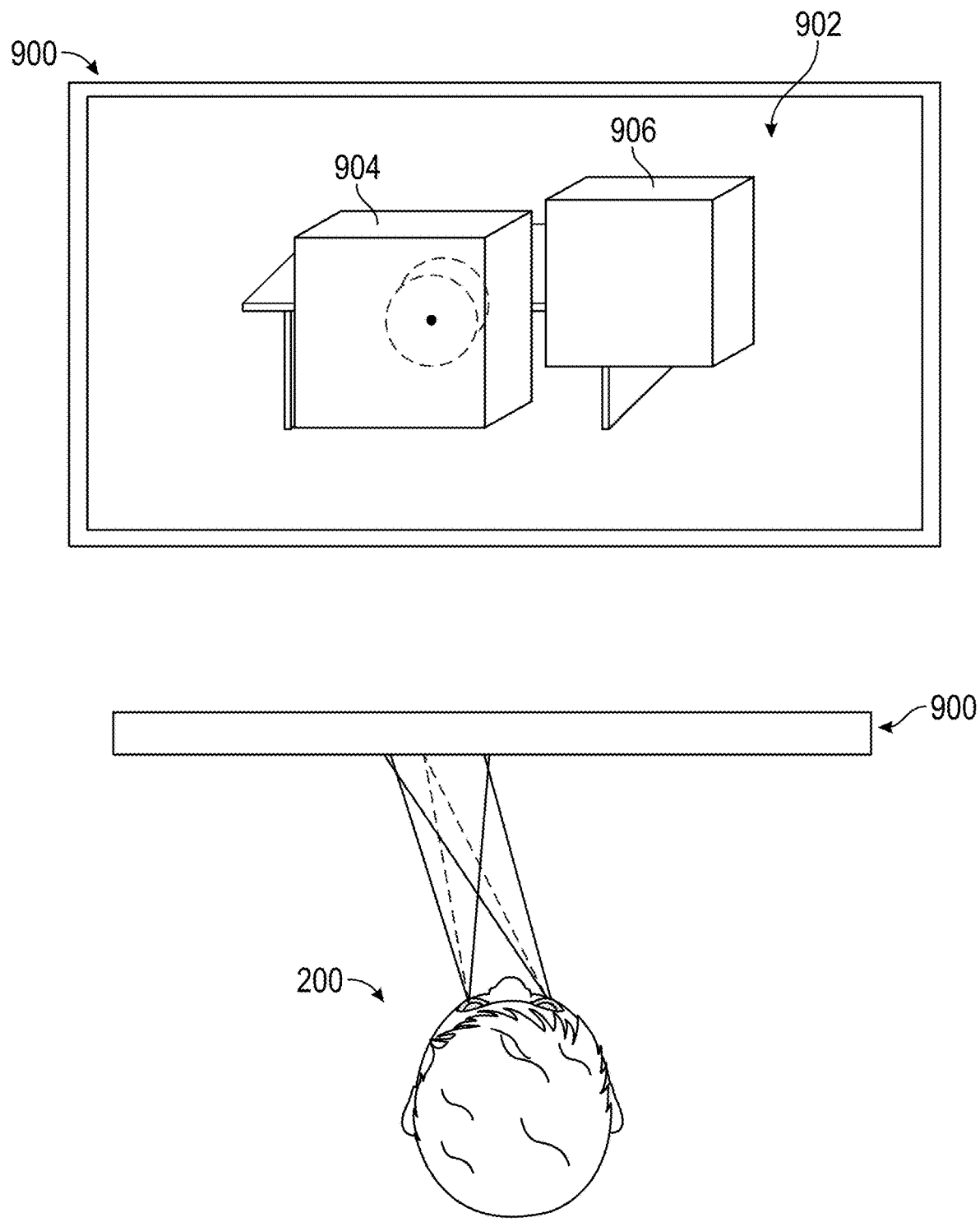
FIG. 11 illustrates a user interface for interacting with an electronic device using an eye gaze, according to various embodiments.
Figure 12:
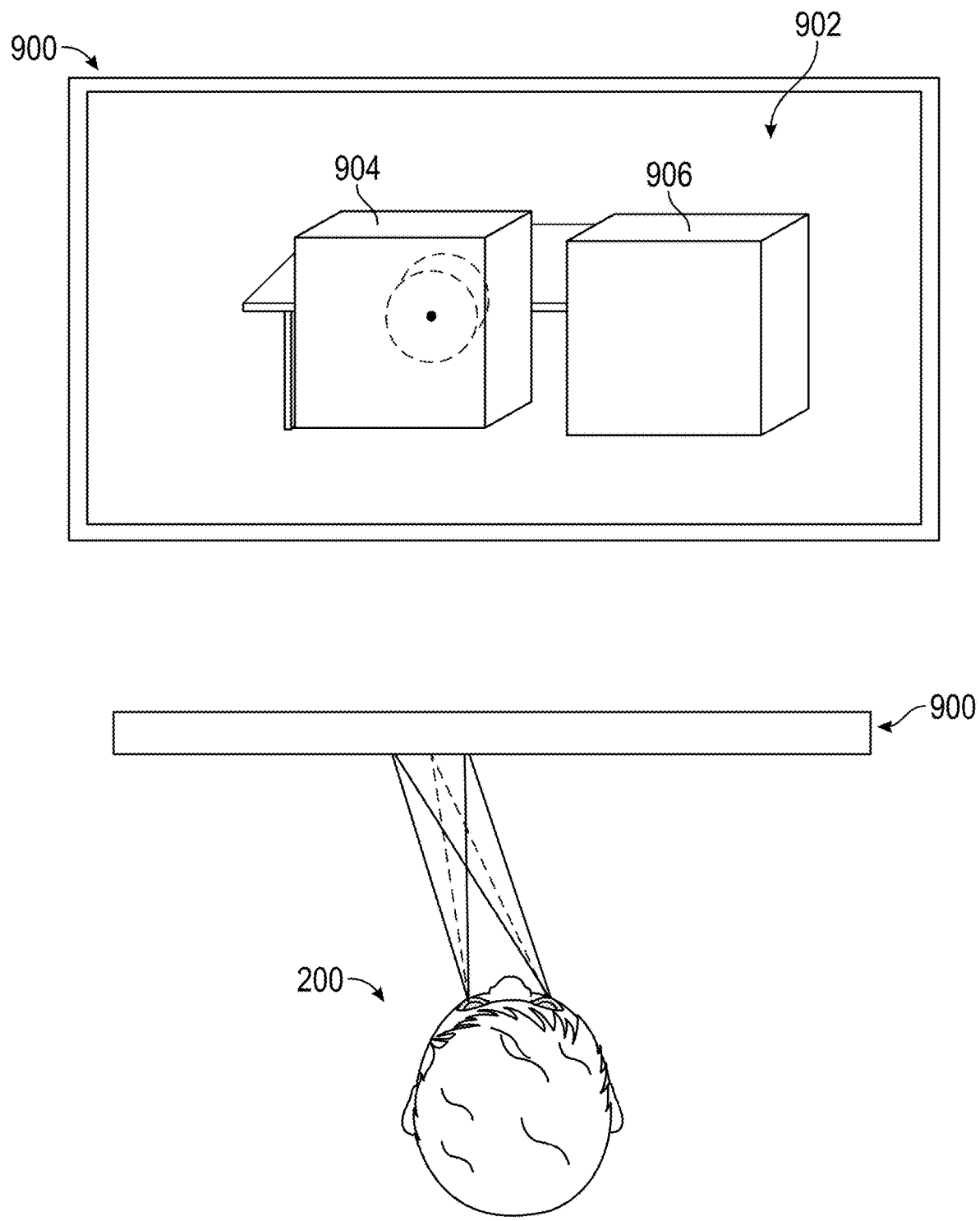
FIG. 12 illustrates a user interface for interacting with an electronic device using an eye gaze, according to various embodiments.

In some embodiments, in response to device 900 determining that gaze position 908 corresponds to both affordance 904 and affordance 906 (e.g., that device 900 cannot resolve which affordance the user is looking at), device 900 enlarges affordance 904 and affordance 906. In some embodiments that provide a 3D representation, an affordance is enlarged from the perspective of the user by moving the affordance toward the user and displaying the affordance at a depth that appears closer to the user. FIG. 11 depicts an embodiment similar to the embodiment depicted in FIG. 6, in which affordance 904 and affordance 906 are enlarged (e.g., moved closer to the user) while maintaining their relative size and position. FIG. 12 depicts an embodiment in which affordance 904 and affordance 906 are enlarged and re-positioned relative to each other such that affordance 904 and affordance 906 are displayed side by side at the same depth. It should be recognized that an analogous technique can also be applied to a 2D representation of an environment. For example, when gaze direction 508 is determined to correspond to a gaze at both affordance 502 and affordance 504 as described above with respect to FIG. 5, affordance 502 and affordance 504 are optionally enlarged by different amounts relative to each other, and/or re-positioned relative to each other such that affordance 502 and affordance 504 are displayed side-by-side. Furthermore, when affordance 904 and affordance 906 are enlarged, device 900 can further determine whether an updated gaze position corresponds to one of the enlarged affordances and select and/or perform an action on an affordance in a manner analogous to the techniques described previously with respect to FIGS. 3-4 and 6-8.

Figure 13:
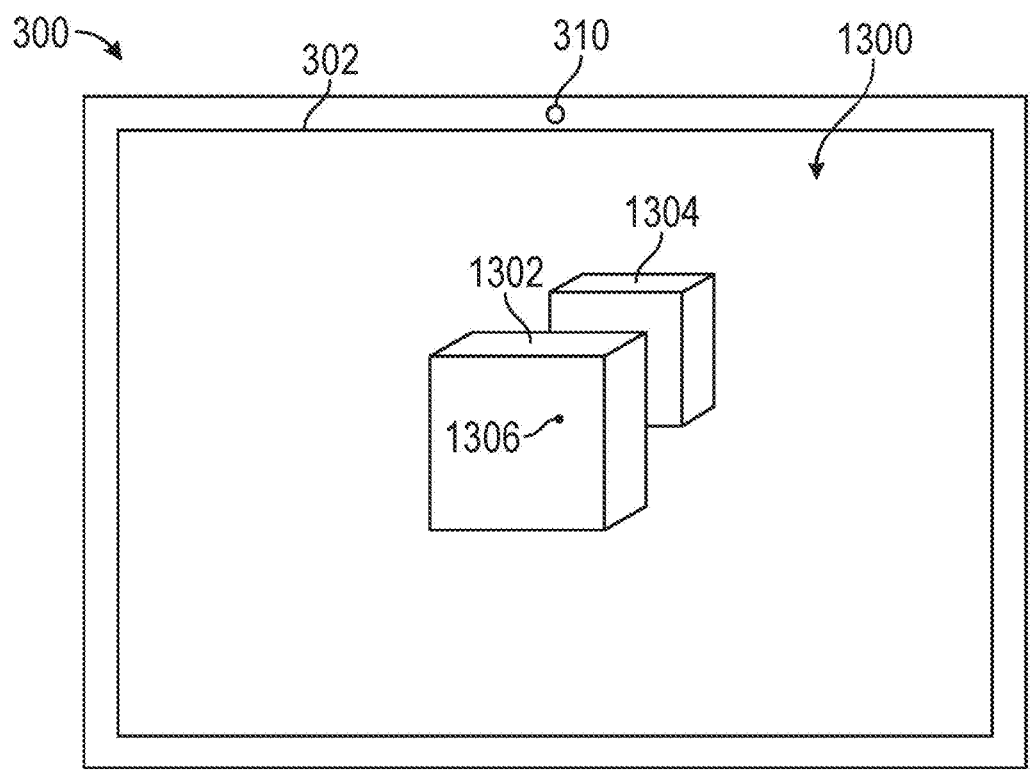
FIG. 13 illustrates a user interface for interacting with an electronic device using an eye gaze, according to various embodiments.
Figure 13:
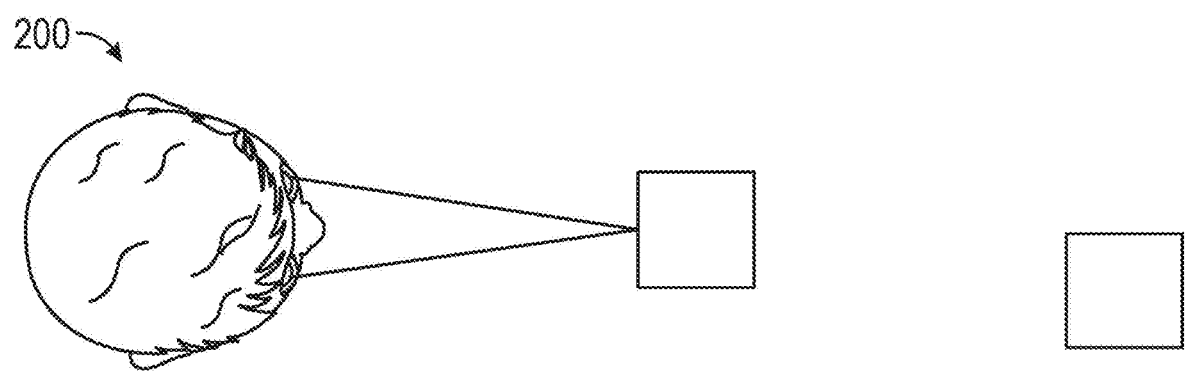

Turning now to FIG. 13, techniques for altering the display of objects based on object depth are described. FIG. 13 again depicts device 300. Device 300 displays environment 1300 (e.g., a CGR environment) with object 1302 and object 1304 concurrently displayed. As depicted in FIG. 13, object 1302 appears closer (e.g., has a smaller depth value) than object 1304. Also, from the perspective displayed in FIG. 13, object 1302 partially obstructs the view of object 1304. Gaze position 1306 is located on object 1302. Gaze position 1306 optionally includes either gaze direction or gaze depth, or both. Device 300 optionally determines whether gaze position corresponds to object 1302 and/or object 1304 based on either gaze direction or gaze depth, or both, according to any of the techniques described above.

Figure 14:
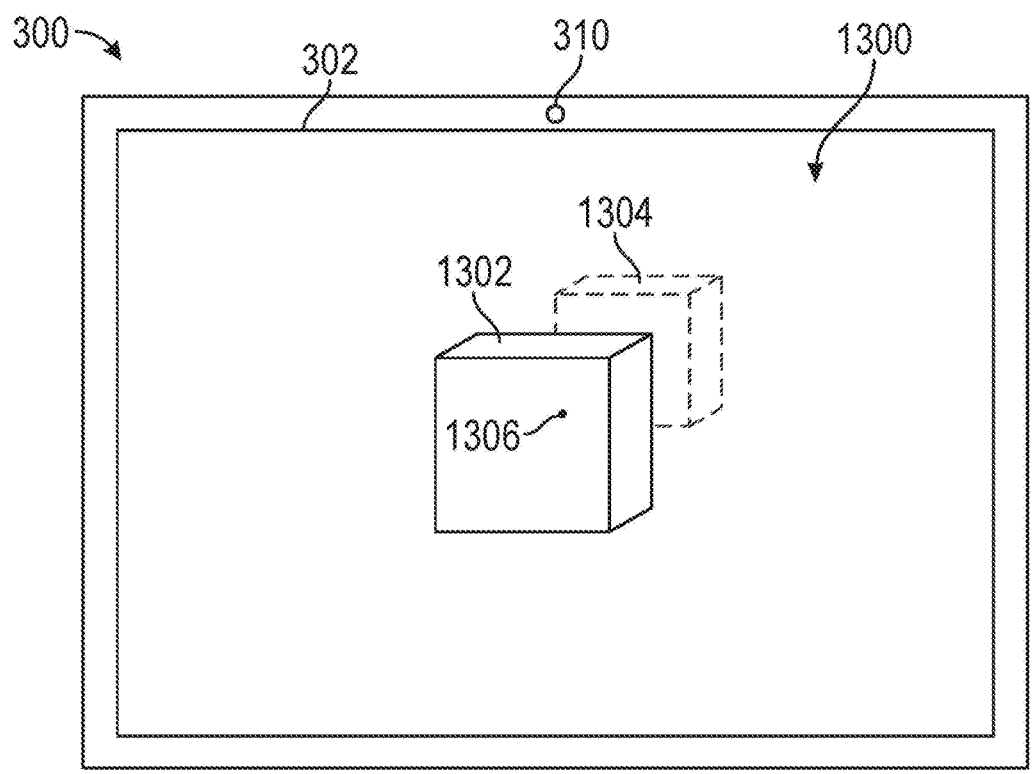
FIG. 14 illustrates a user interface for interacting with an electronic device using an eye gaze, according to various embodiments.
Figure 14:
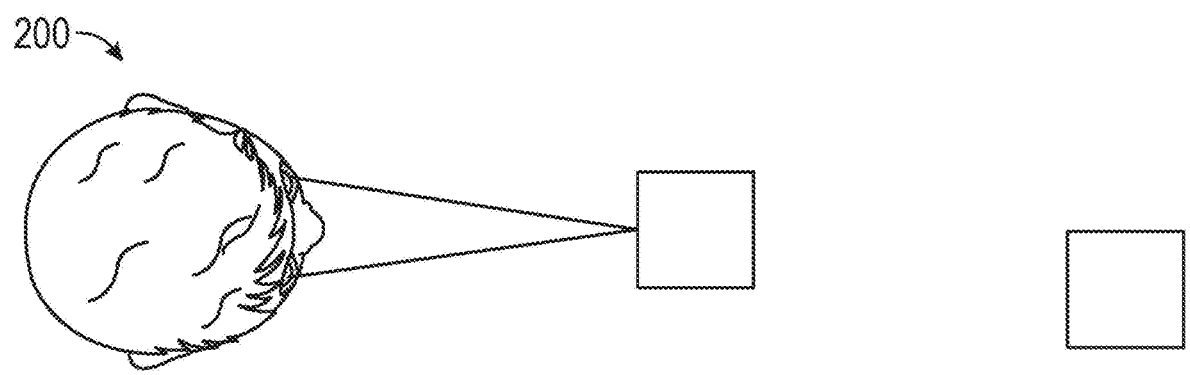

Device 300 visually alters object 1302 and/or object 1304 based on whether gaze position 1306 corresponds to object 1302 or object 1304. Device 300 determines whether gaze position 1306 corresponds to object 1302 or object 1304 according to any of the techniques described above. In some embodiments, in response to determining that gaze position 1306 corresponds to object 1302, device 300 visually alters the display of object 1304; and in response to determining that gaze position 1306 corresponds to object 1304, device 300 visually alters the display of object 1302. For example, if the user's focus, as determined by either direction or depth, or both, is determined to be on one of the objects, the visual appearance of the other object is altered in order to emphasize the object of the user's focus. As depicted in FIG. 14, device 300 determines that gaze position 1306 corresponds to object 1302, and in response, visually alters object 1304 in a way that emphasizes object 1302 and/or de-emphasizes object 1304. Examples of visually altering an object that de-emphasizes the object include making the object appear blurry or fuzzy, decreasing the resolution of the object, decreasing the brightness of the object, decreasing the contrast of the object, increasing the transparency of the object, and ceasing to display the object. In some embodiments, device 300 visually alters object 1302 or object 1304 in response to receiving an input (e.g., an eye gesture, a hand gesture, a voice input, or a controller input) and determining that gaze position 1306 corresponds to object 1302 or object 1304, respectively. Optionally, device 300 alters object 1302 and object 1304 in accordance with a determination that the directions of both objects correspond to the gaze direction, indicating that one of the objects is likely obstructing the other and that distinguishing the objects would be advantageous.

Optionally, device 300 also visually alters the display of the object corresponding to the gaze position (e.g., object 1302) to enhance the appearance of the object. Examples of visually enhancing an object include making the object appear sharper, increasing the resolution of the object, increasing the brightness of the object, increasing the contrast of the object, decreasing the transparency of the object, highlighting the object, and causing the object to appear.

Figure 15:
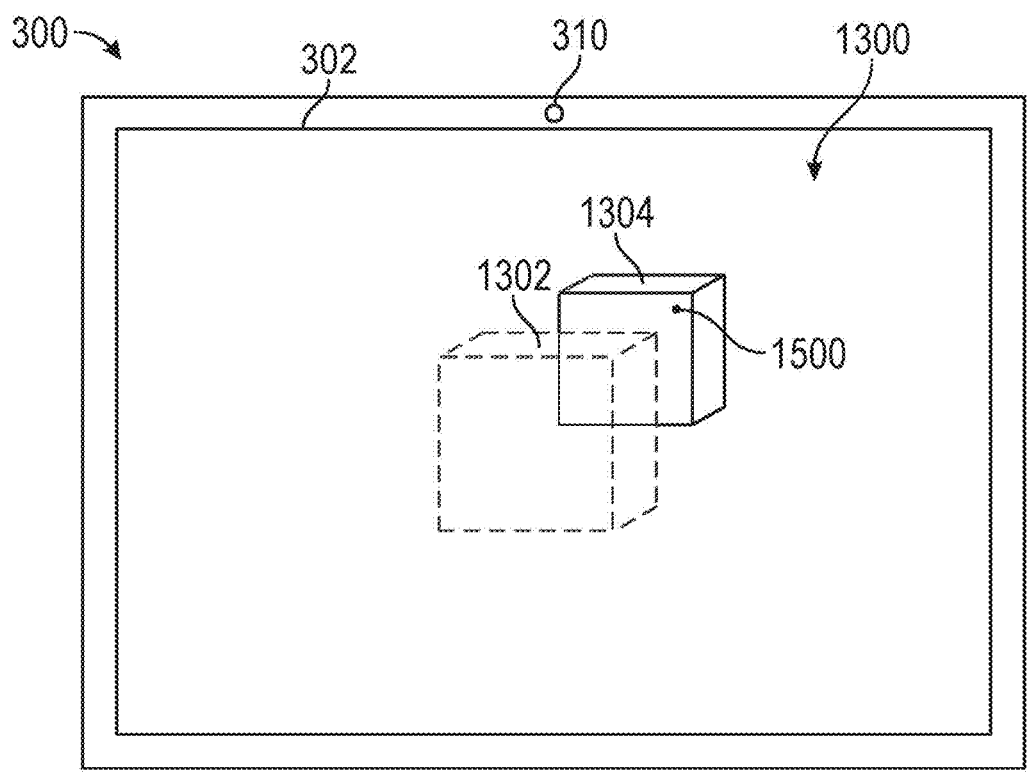
FIG. 15 illustrates a user interface for interacting with an electronic device using an eye gaze, according to various embodiments.
Figure 15:
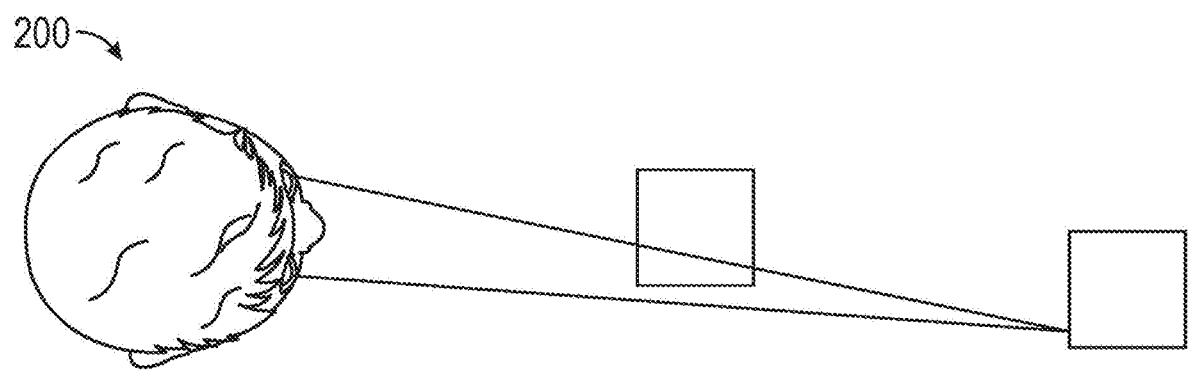

In FIG. 15, the user has moved his gaze position from 1306 to location 1500 corresponding to object 1304. In response, device 300 visually alters object 1302 and returns object 1304 to the appearance initially displayed in FIG. 13. In the embodiment illustrated in FIG. 15, device 300 makes object 1302 semi-transparent so that the user can better see the object on which he is attempting to focus. Optionally, device 300 removes object 1302 to provide an unobstructed view of object 1304.

It should be recognized that the embodiments discussed above with respect to FIGS. 2-15 are exemplary and are not intended to be limiting. For example, although the embodiments in FIGS. 2-12 are described with respect to a virtual environment, the techniques can be applied analogously to other CGR environments, including mixed reality environments.

Figure 16:
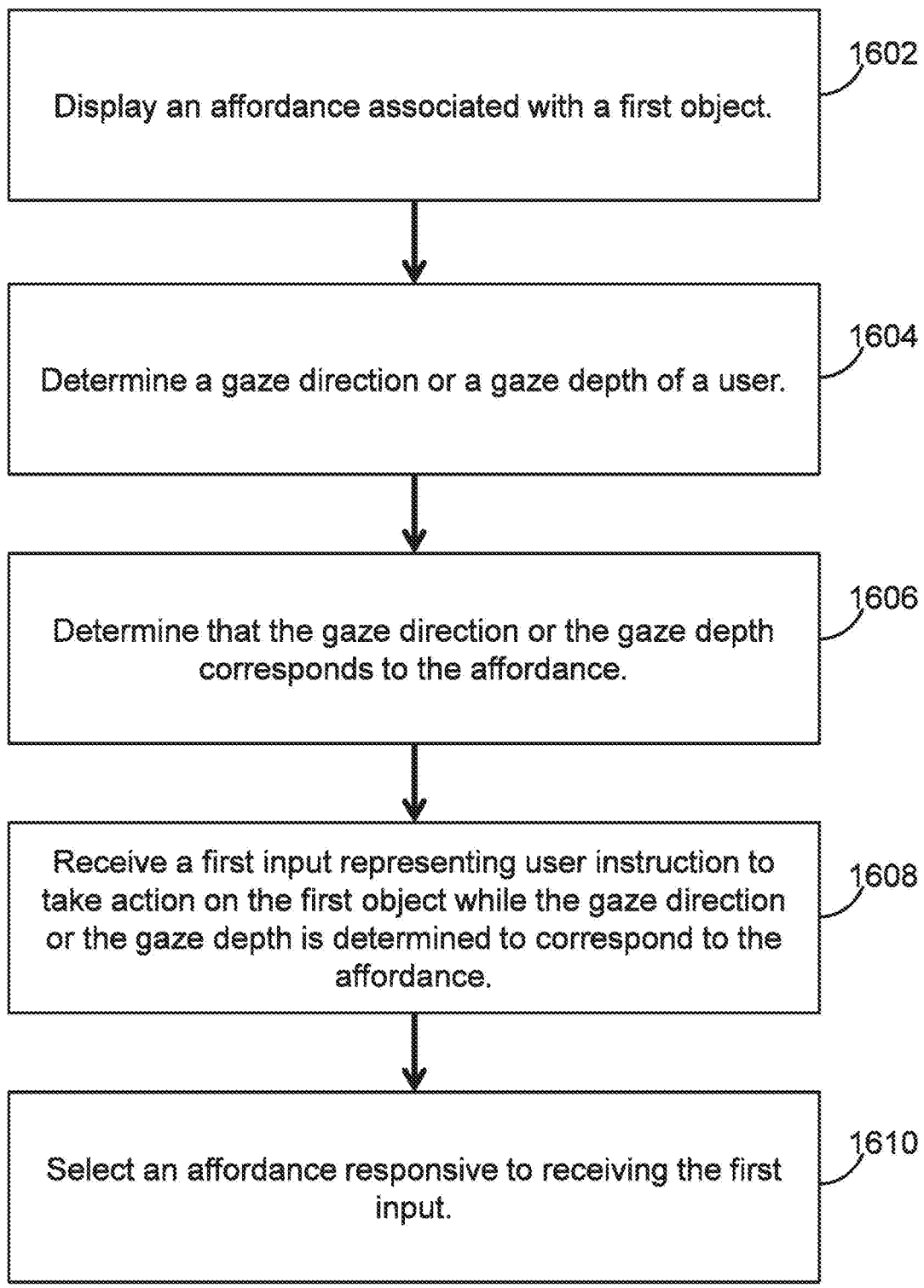
FIG. 16 depicts a flow chart of an exemplary process for interacting with an electronic device using an eye gaze, according to various embodiments.

Turning now to FIG. 16, a flow chart of exemplary process 1600 for interacting with an electronic device using an eye gaze is depicted. Process 1600 can be performed using a user device (e.g., 100a, 300, or 900). The user device is, for example, a handheld mobile device, a head-mounted device, or a head-up device. In some embodiments, process 1600 is performed using two or more electronic devices, such as a user device that is communicatively coupled to another device, such as a base device. In these embodiments, the operations of process 1600 are distributed in any manner between the user device and the other device. Further, the display of the user device can be transparent or opaque. Process 1600 can be applied to CGR environments, including virtual reality and mixed reality environments, and to affordances that correspond to virtual objects or physical objects. Although the blocks of process 1600 are depicted in a particular order in FIG. 16, these blocks can be performed in other orders. Further, one or more blocks of process 1600 can be partially performed, optionally performed, combined with another block(s), and/or additional blocks can be performed.

At block 1602, the device displays an affordance associated with a first object (e.g., a displayed object).

At block 1604, the device determines a gaze direction or a gaze depth (e.g., of one or more eyes). In some embodiments, data is captured from a sensor directed toward the user, and the gaze direction or the gaze depth is determined based on the data captured from the sensor. In some embodiments, determining the gaze direction or the gaze depth includes determining the gaze direction. In some embodiments, determining the gaze direction or the gaze depth includes determining the gaze depth. Optionally, the gaze direction or the gaze depth is determined using ray casting or cone casting. Optionally, an angular extent of a cone used for the cone casting is based on the angular resolution of the gaze direction.

At block 1606, the device determines whether the gaze direction or the gaze depth corresponds to a gaze at the affordance. In some embodiments, determining that the gaze direction or the gaze depth corresponds to the depth of the affordance includes determining that the gaze is directed to the affordance. In some embodiments, determining that the gaze is directed to the affordance is based at least in part on the angular resolution of the gaze direction. In some embodiments, determining that the gaze direction or the gaze depth corresponds to a gaze at the affordance includes determining that the gaze depth corresponds to the depth of the affordance. In some embodiments, determining that the gaze depth corresponds to the depth of the affordance is based at least in part on the depth resolution of the gaze depth.

At block 1608, while the gaze direction or the gaze depth is determined to correspond to a gaze at the affordance, the device receives a first input representing an instruction to take action on the affordance corresponding to the first object. In some embodiments, the first input includes an eye gesture, a hand gesture, a voice input, and/or a controller input.

At block 1610, the device selects the affordance responsive to receiving the first input. Optionally, while the affordance is selected, a second input is received and an action associated with the selected affordance is performed in response to receiving the second input and in accordance with the second input. In some embodiments, second input includes an eye gesture, a hand gesture, a voice input, or an input on a controller.

Figure 17:
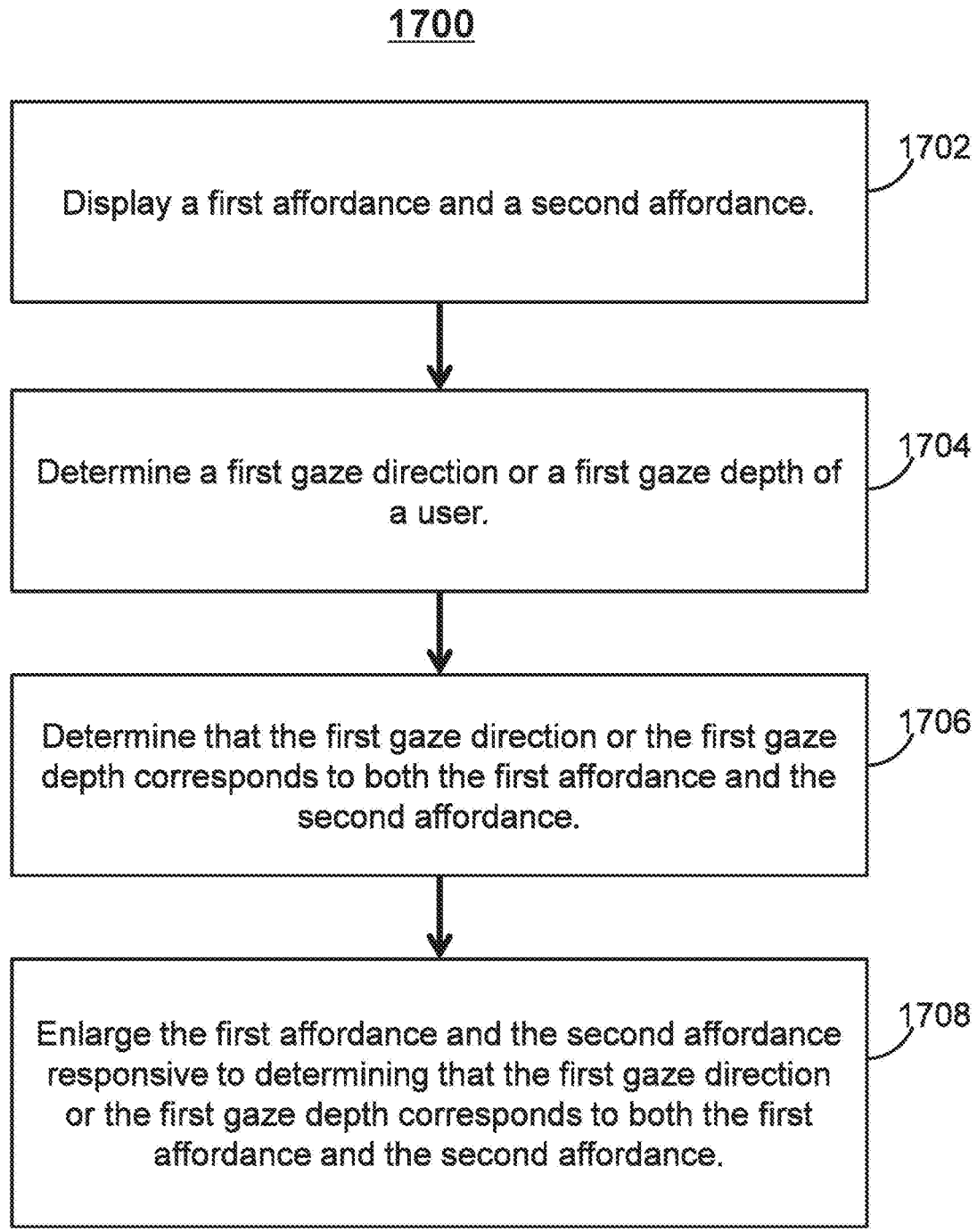
FIG. 17 depicts a flow chart of an exemplary process for interacting with an electronic device using an eye gaze, according to various embodiments.

Turning now to FIG. 17, a flow chart of exemplary process 1700 for interacting with an electronic device using an eye gaze is depicted. Process 1700 can be performed using a user device (e.g., 100*a*, 300, or 900). The user device is, for example, a handheld mobile device, a head-mounted device, or a head-up device. In some embodiments, process 1700 is performed using two or more electronic devices, such as a user device that is communicatively coupled to another device, such as a base device. In these embodiments, the operations of process 1700 are distributed in any manner between the user device and the other device. Further, the display of the user device can be transparent or opaque. Process 1700 can be applied to CGR environments, including virtual reality and mixed reality environments, and to affordances that correspond to virtual objects or physical objects. Although the blocks of process 1700 are depicted in a particular order in FIG. 17, these blocks can be performed in other orders. Further, one or more blocks of process 1700 can be partially performed, optionally performed, combined with another block(s), and/or additional blocks can be performed.

At block 1702, the device displays a first affordance and a second affordance. Optionally, the first affordance and the second affordance are displayed concurrently. In some embodiments, the first affordance and the second affordance are displayed with a two-dimensional representation or a three-dimensional representation of an environment (e.g., a CGR environment) that includes the first affordance and the second affordance. Optionally, the first affordance is displayed at a first depth in a three-dimensional representation of the environment and the second affordance is displayed at a second depth in the three-dimensional representation of the environment, where the first depth is different than the second depth.

At block 1704, the device determines a first gaze direction or a first gaze depth (e.g., of one or more eyes). In some embodiments, data is captured from a sensor directed toward the user, and the gaze direction or the gaze depth is determined based on the data captured from the sensor. Optionally, gaze direction or the gaze depth is determined using ray casting or cone casting. In some embodiments, an angular extent of a cone used for the cone casting is based on an angular resolution of the gaze direction.

At block 1706, the device determines whether the first gaze direction or the first gaze depth corresponds to a gaze at both the first affordance and the second affordance. Optionally, in response to determining that the first gaze direction or the first gaze depth corresponds to both the first affordance and the second affordance, the display of the first affordance is enhanced in accordance with the first depth being greater than the second depth; and the display of the second affordance is enhanced in accordance with the second depth being greater than the first depth. In some embodiments, the gaze direction is determined, and determining that the gaze direction or the gaze depth corresponds to both the first affordance and the second affordance includes determining that the gaze direction corresponds to both the first affordance and the second affordance. Optionally, determining that the gaze direction corresponds to both the first affordance and the second affordance is based at least in part on the angular resolution of the gaze direction. In some embodiments, determining the gaze direction or the gaze depth includes determining the gaze depth, and determining that the gaze direction or the gaze depth corresponds to both the first affordance and the second affordance includes determining that the gaze depth corresponds to both the first affordance and the second affordance. Optionally, determining that the gaze depth corresponds to both the first affordance and the second affordance is based at least in part on the depth resolution of the gaze depth.

At block 1708, the device enlarges the first affordance and the second affordance responsive to determining that the first gaze direction or the first gaze depth corresponds to a gaze at both the first affordance and the second affordance. In some embodiments, the first affordance and the second affordance are enlarged in accordance with a determination that the user's gaze meets predefined criteria. In some embodiments, a third input is received, and the first affordance and the second affordance are enlarged in response to determining that the first gaze direction or the first gaze depth corresponds to both the first affordance and the second affordance and receiving the third input. In some embodiments, the third input includes an eye gesture, a hand gesture, a voice input, or a controller input. In some embodiments, enlarging the first affordance and the second affordance includes displaying an enlarged view of at least a portion of an environment (e.g., a CGR environment) that surrounds the first affordance and the second affordance. In some embodiments, the enlarged view of the at least a portion of the environment that surrounds the first affordance and the second affordance is a representation of a virtual environment. In some embodiments, the enlarged view of the at least a portion of the environment that surrounds the first affordance and the second affordance is a representation of a physical environment. In some embodiments, enlarging the first affordance and the second affordance includes displaying the first affordance at a third depth in a three-dimensional representation of the environment and displaying the second affordance at a fourth depth in the three-dimensional representation of the environment, where the third depth is the same as the fourth depth.

Optionally, after enlarging the first affordance and the second affordance, a second gaze direction or a second gaze depth is determined, and the second gaze direction or the second gaze depth is determined to correspond to a gaze at the first affordance. While the second gaze direction or the second gaze depth is determined to correspond to a gaze at the first affordance, a first input representing user instruction to take action on the first affordance is received, and the first affordance is selected responsive to receiving the first input. Optionally, the first input includes an eye gesture, a hand gesture, a voice input, or a controller input.

In some embodiments, the first affordance or the second affordance is reduced in response to receiving the first input. Optionally, while the first affordance is selected, a second input is received, and an action associated with the first affordance in accordance with the second input is performed in response to receiving the second input. In some embodiments, the second input includes an eye gesture, a hand gesture, a voice input, or a controller input.

Figure 18:
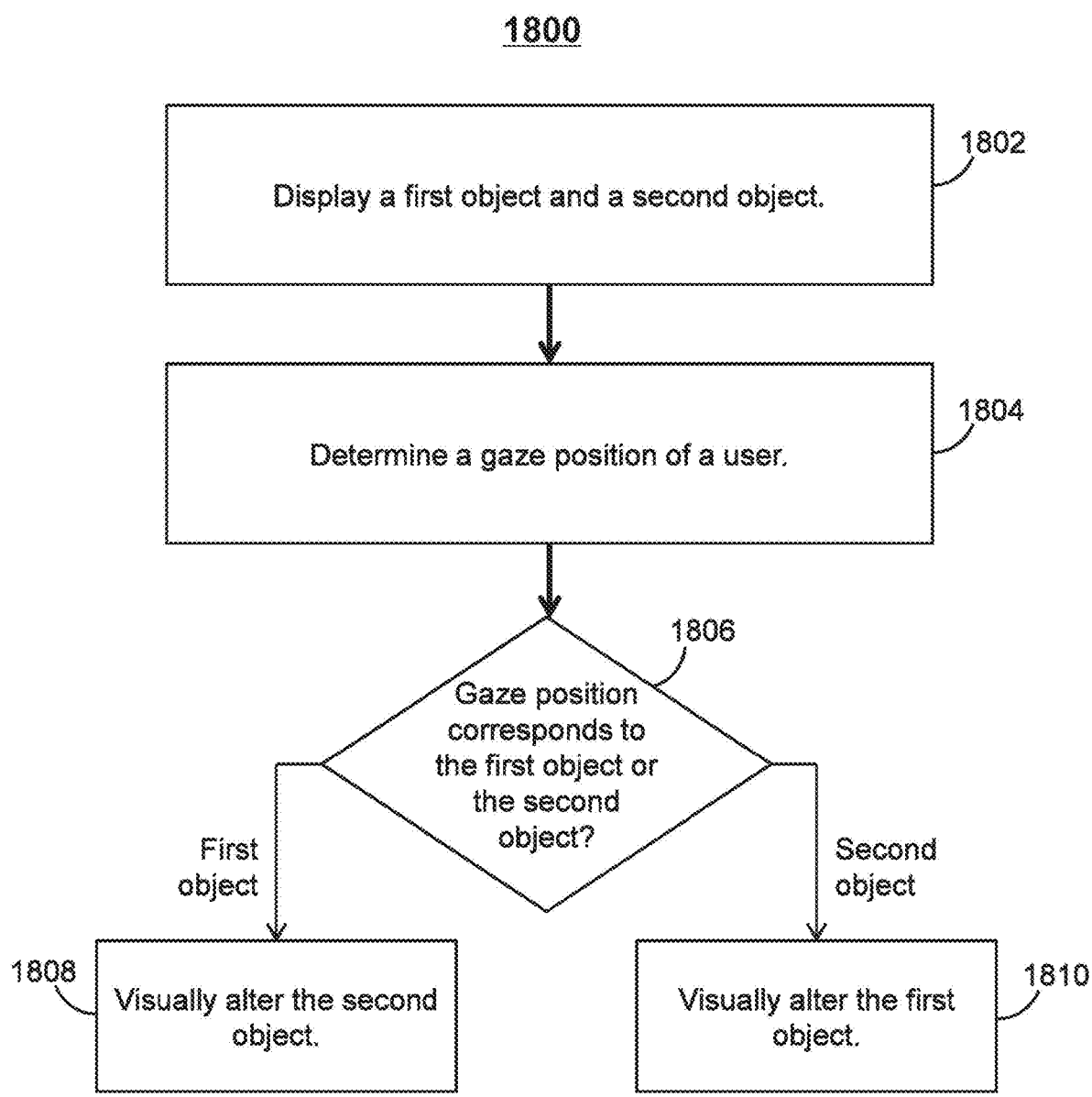
FIG. 18 depicts a flow chart of an exemplary process for interacting with an electronic device using an eye gaze, according to various embodiments.

Turning now to FIG. 18, a flow chart of exemplary process 1800 for interacting with an electronic device using an eye gaze is depicted. Process 1800 can be performed using a user device (e.g., 100*a*, 300, or 900). The user device is, for example, a handheld mobile device, a head-mounted device, or a head-up device. In some embodiments, process 1800 is performed using two or more electronic devices, such as a user device that is communicatively coupled to another device, such as a base device. In these embodiments, the operations of process 1800 are distributed in any manner between the user device and the other device. Further, the display of the user device can be transparent or opaque. Process 1800 can be applied to CGR environments, including virtual reality and mixed reality environments, and to virtual objects, physical objects, and representations thereof. Although the blocks of process 1800 are depicted in a particular order in FIG. 18, these blocks can be performed in other orders. Further, one or more blocks of process 1800 can be partially performed, optionally performed, combined with another block(s), and/or additional blocks can be performed.

The device is adapted to display a field of view of a three-dimensional computer generated reality environment. The field of view is rendered from a viewing perspective. At block 1802, the device displays a first object and a second object. Optionally, the first object and the second object are displayed concurrently. In some embodiments, the first object and the second object are displayed such that the first object appears to be (e.g., is presented as) closer than the second object from the viewing perspective.

At block, 1804, the device determines a gaze position (e.g., of one or more eyes). In some embodiments, data is captured from a sensor directed toward the user, and the gaze position is determined based on the data captured from the sensor. In some embodiments, the gaze position is determined using ray casting or cone casting. Optionally, an angular extent of a cone used for the cone casting is based on the angular resolution of a gaze direction.

At block 1806, the device determines whether the gaze position corresponds to a gaze at the first object or the second object. In some embodiments, the gaze direction is determined, and determining that the gaze position corresponds to a gaze at the first object or the second object includes determining that the gaze is directed at the first object or the second object. Optionally, determining whether the gaze is directed to the first object or the second object is based at least in part on the angular resolution of the gaze direction. In some embodiments, the gaze depth is determined, and determining that the gaze position corresponds to a gaze at the first object or the second object includes determining that the gaze depth corresponds to a depth of the first object or the second object (e.g., as presented in the field of view). Optionally, determining that the gaze depth corresponds to the depth of the first object or the second object is based at least in part on the depth resolution of the gaze depth.

At block 1808, the device visually alters the display of the second object in accordance with a determination that the gaze position corresponds to a gaze at the first object. In some embodiments, the second object is altered in response to determining that the gaze position corresponds to a gaze at the first object and receiving an input. The input optionally includes an eye gesture, a hand gesture, a voice input, or a controller input. Optionally, the device enhances the display (e.g., display resolution) of the first object. Optionally, after visually altering the second object, the device determines a second gaze position of the user, and in accordance with a determination that the second gaze position corresponds to a gaze at the second object, visually alters the display of the first object and displays the second object according to its initial appearance.

At block 1810, the device visually altering the display of the first object in accordance with a determination that the gaze position corresponds to a gaze at the second object. In some embodiments, the first object is altered in response to determining that the gaze position corresponds to a gaze at the second object and receiving an input. The input optionally includes an eye gesture, a hand gesture, a voice input, or a controller input. Optionally, the device enhances the display (e.g., display resolution) of the second object.

Executable instructions for performing the features of methods 1600, 1700, and/or 1800 described above are, optionally, included in a transitory or non-transitory computer-readable storage medium (e.g., memory(ies) 106) or other computer program product configured for execution by one or more processors (e.g., processor(s) 102). Further, some operations in method 1600 (e.g., block 1610) are, optionally, included in method 1700 and/or method 1800, some operations in method 1700 (e.g., block 1708) are, optionally, included in method 1600 and/or method 1800, and some operations in method 1800 (e.g., blocks 1806, 1808, and/or 1810) are, optionally, included in method 1600 and/or method 1700.

Figure 19A:
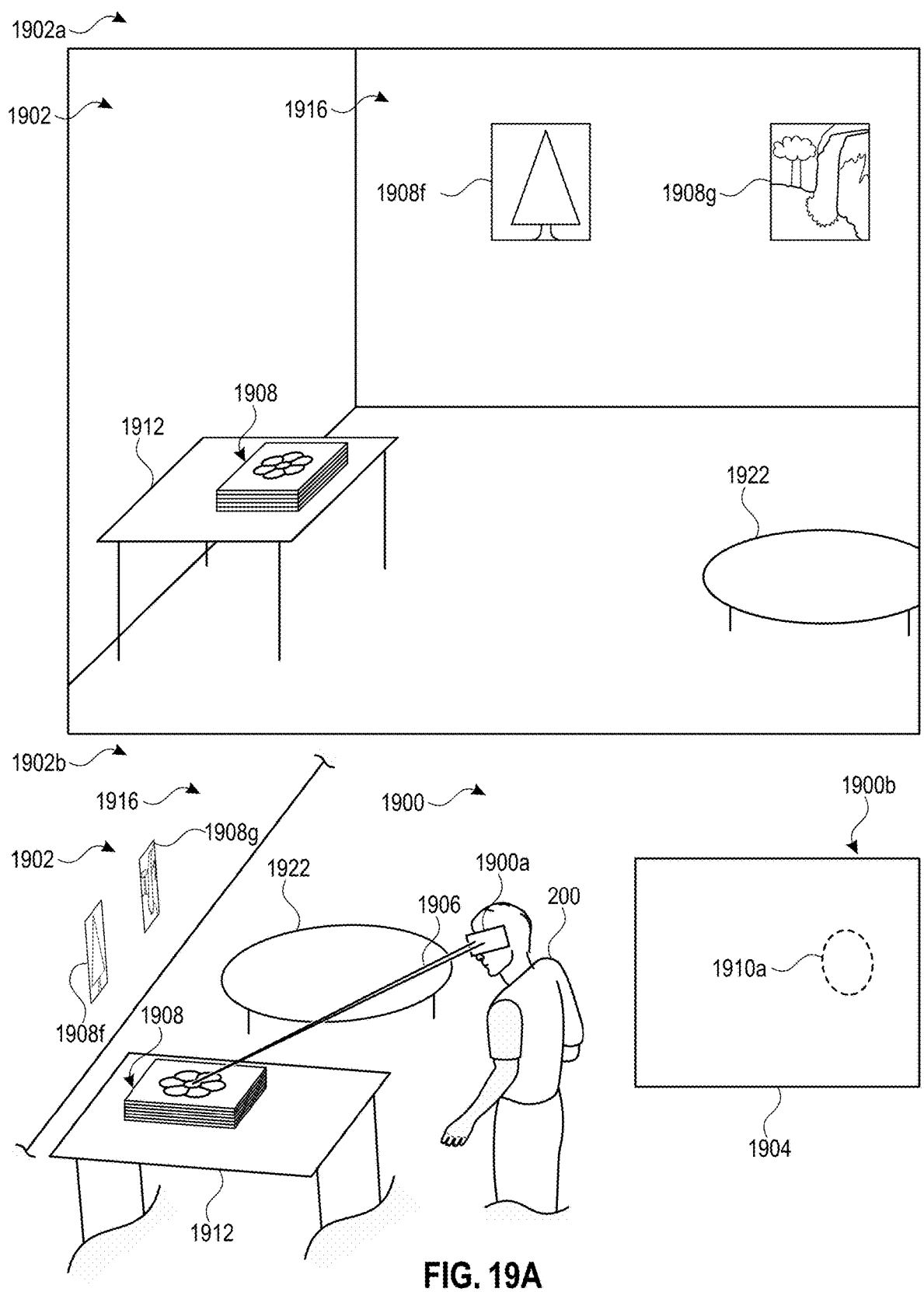
FIGS. 19A-19Y illustrate a user interface for interacting with an electronic device using an eye gaze, according to various embodiments.
Figure 19B:
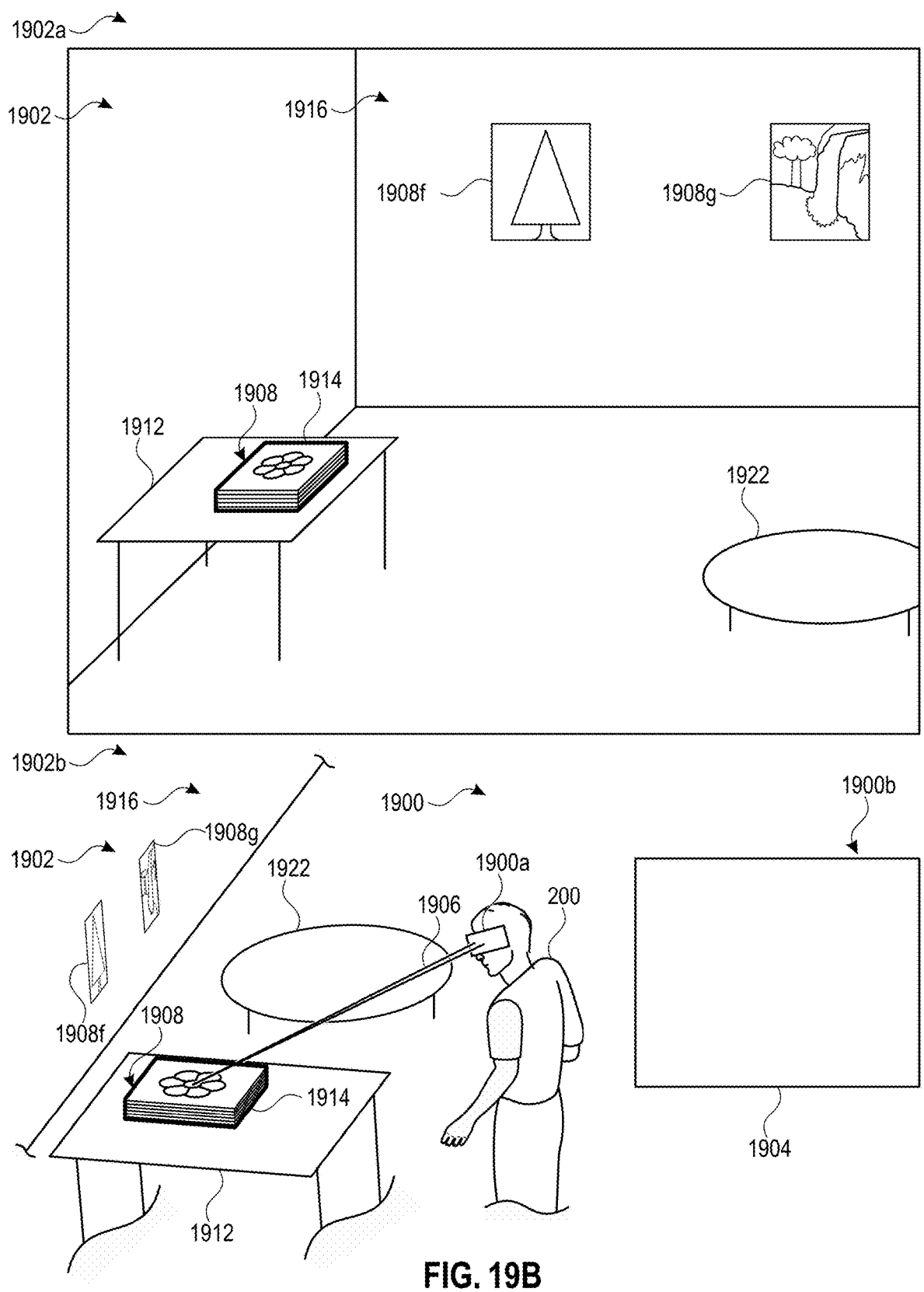
Figure 19C:
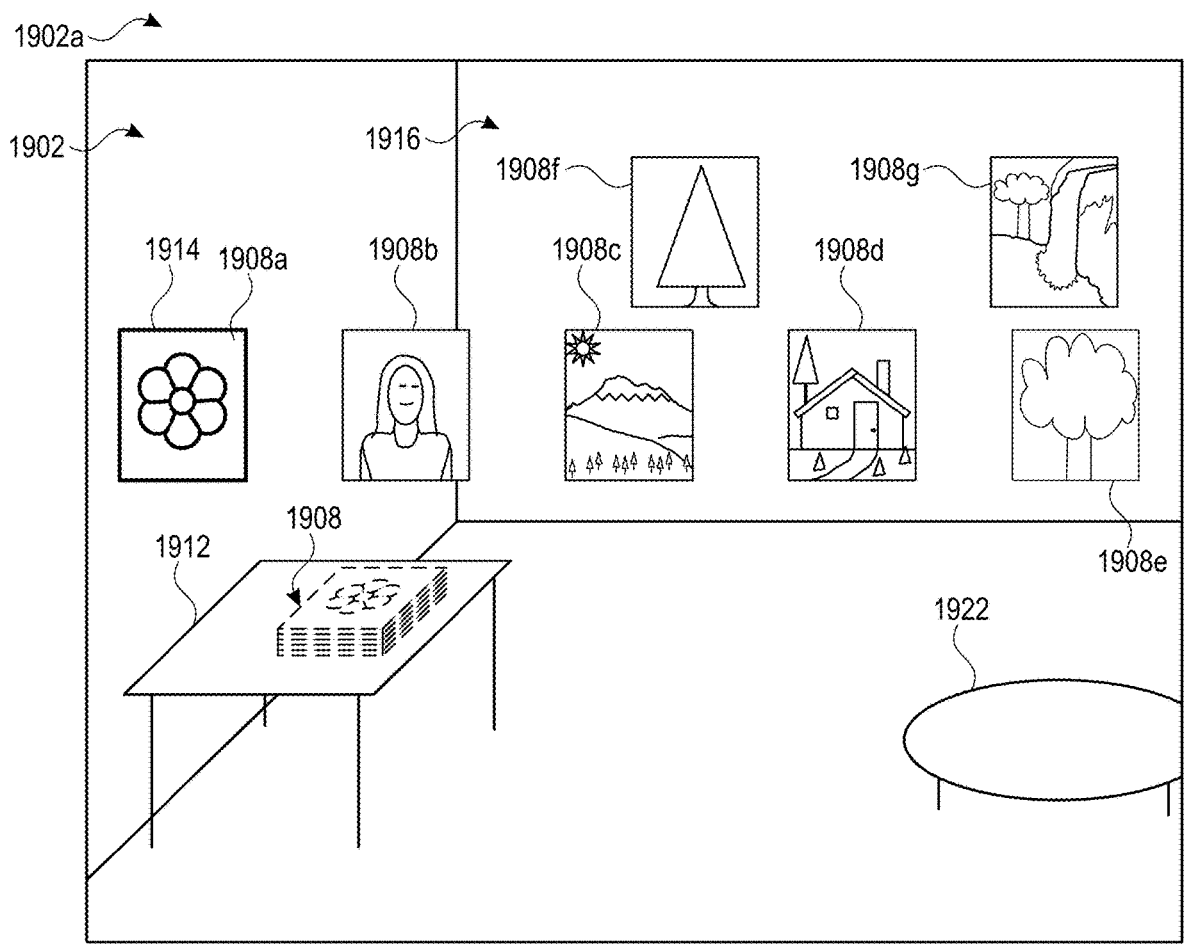
Figure 19C:
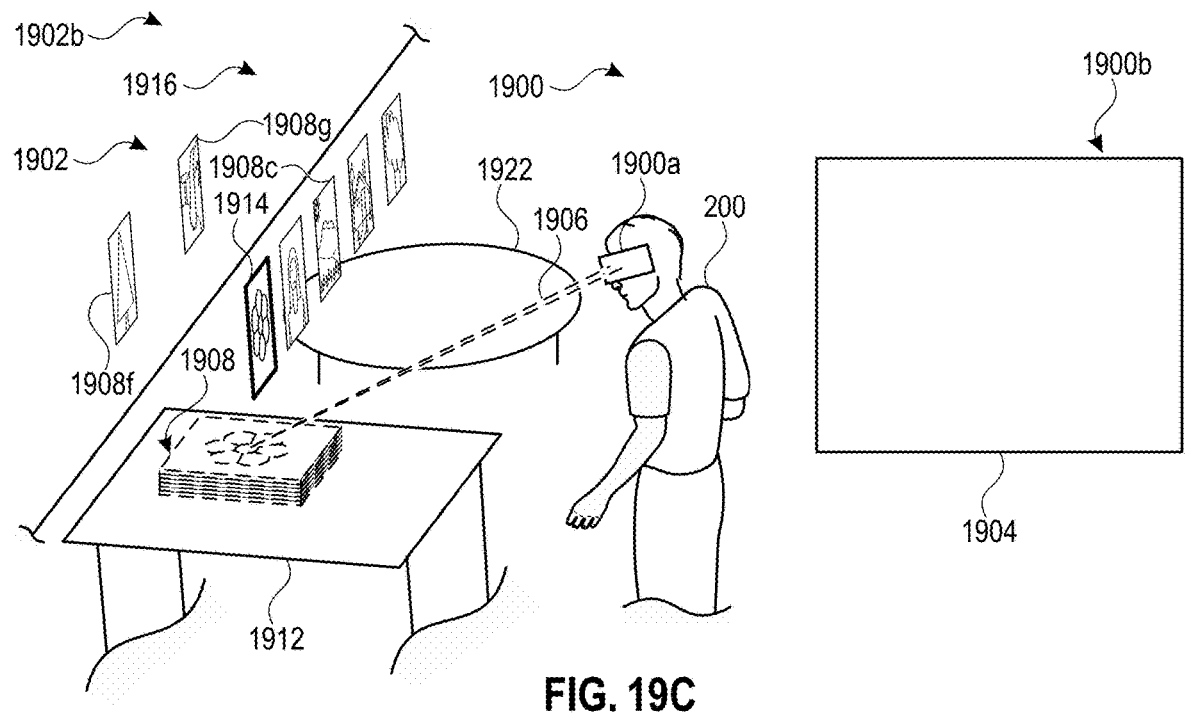
Figure 19D:
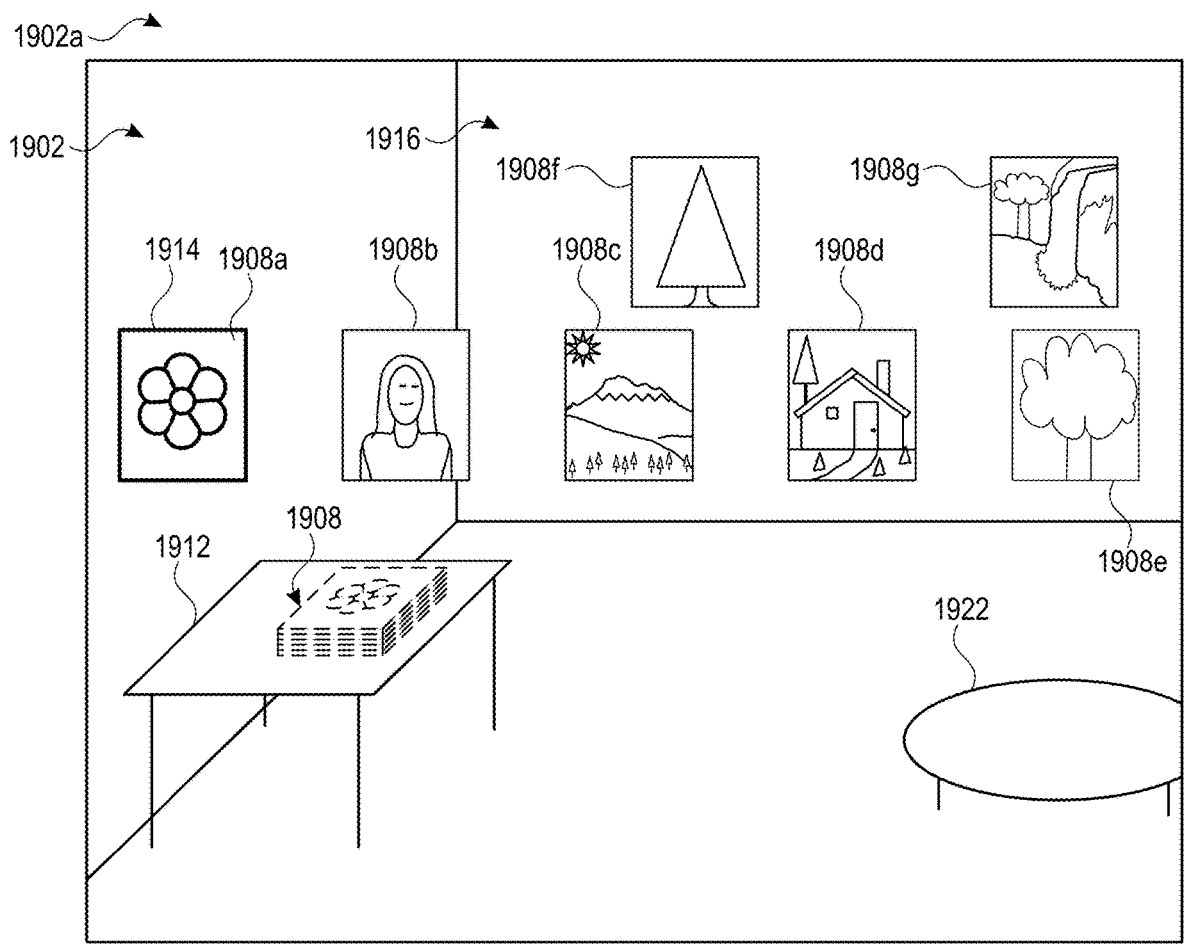
Figure 19D:
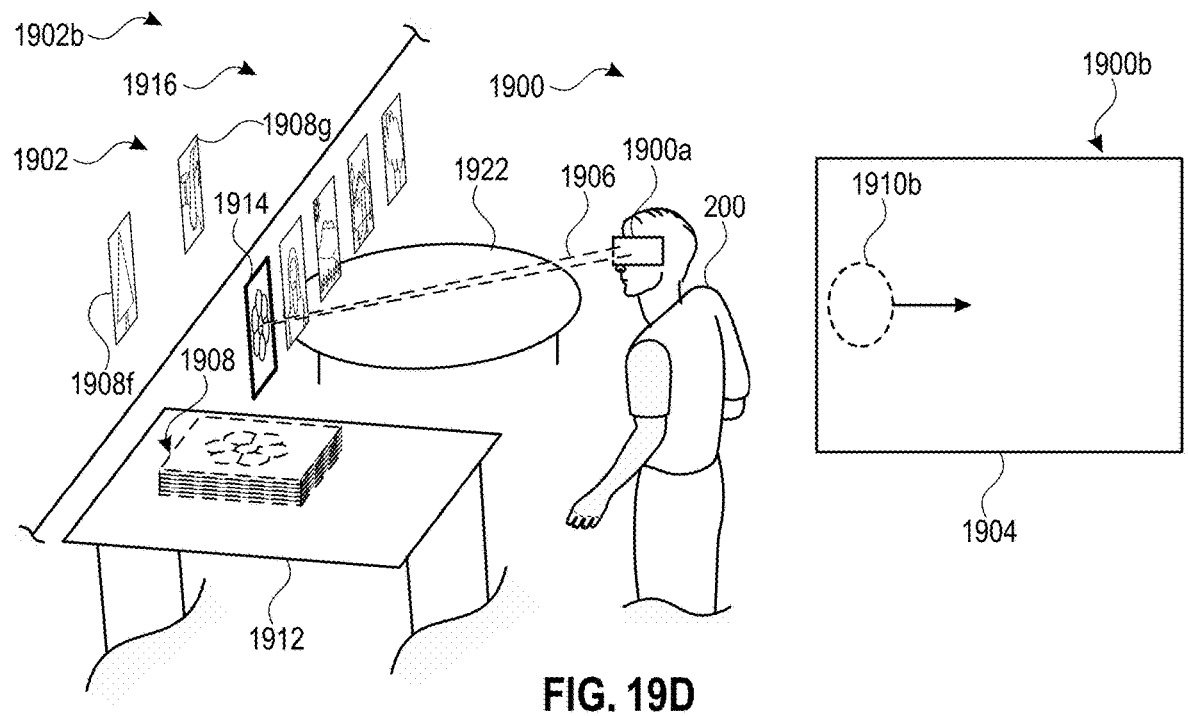
Figure 19E:
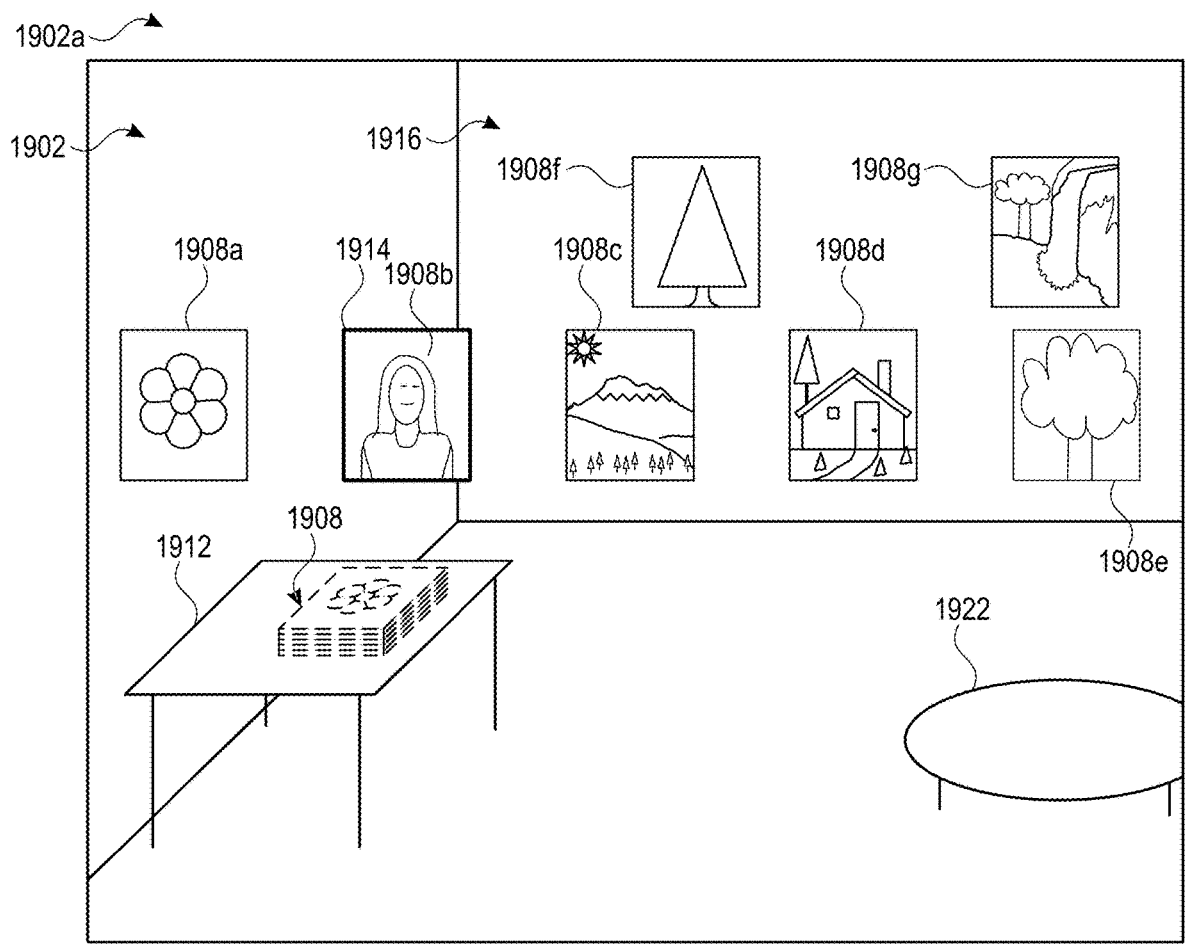
Figure 19E:
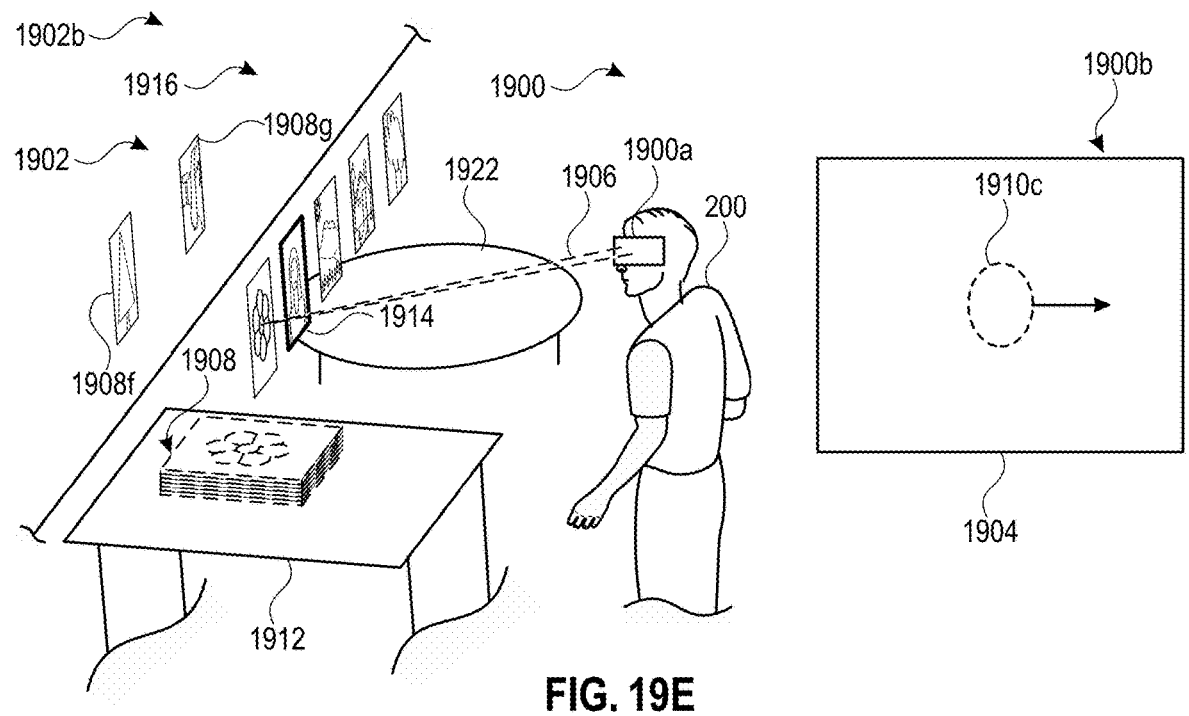
Figure 19F:
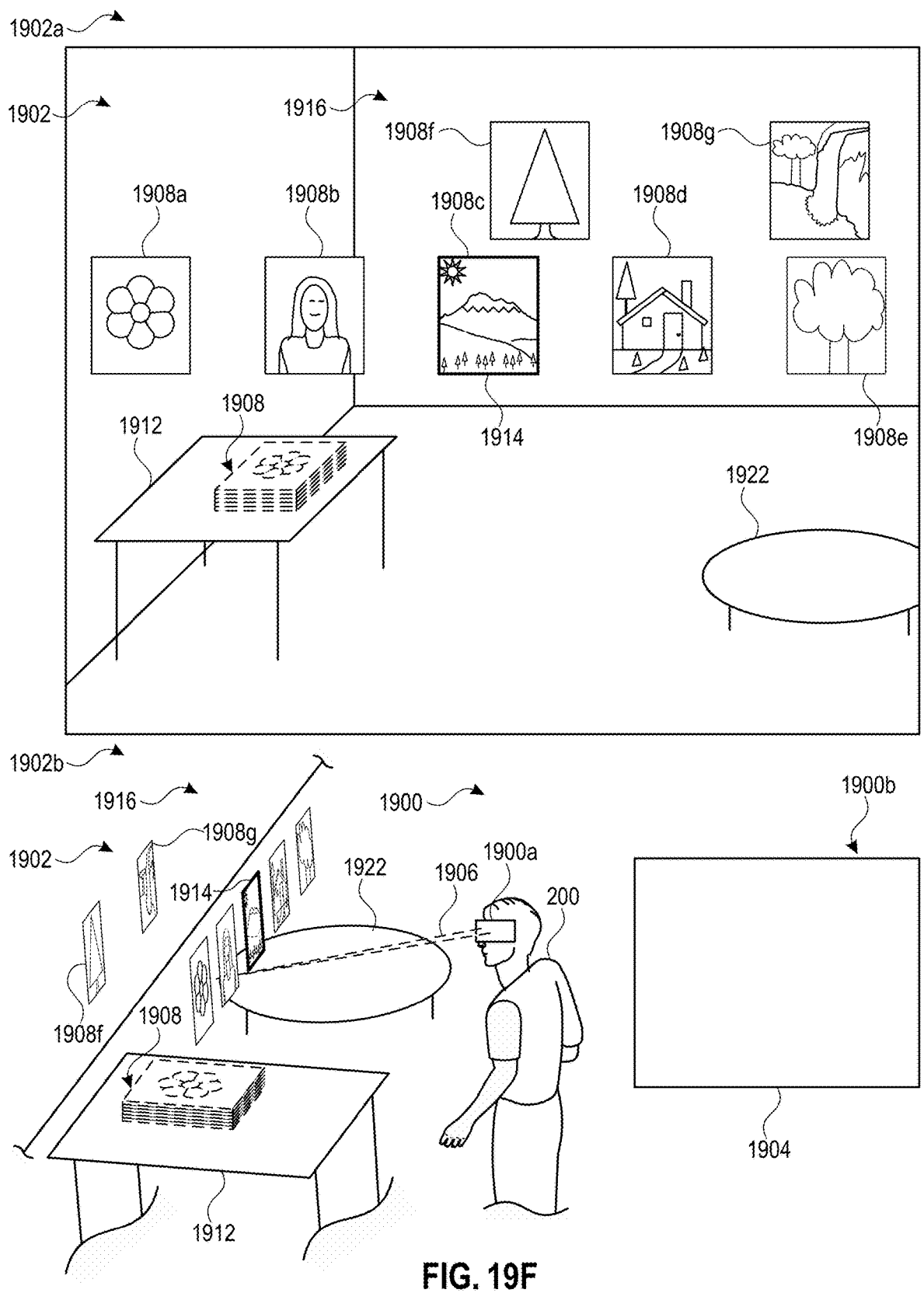
Figure 19G:
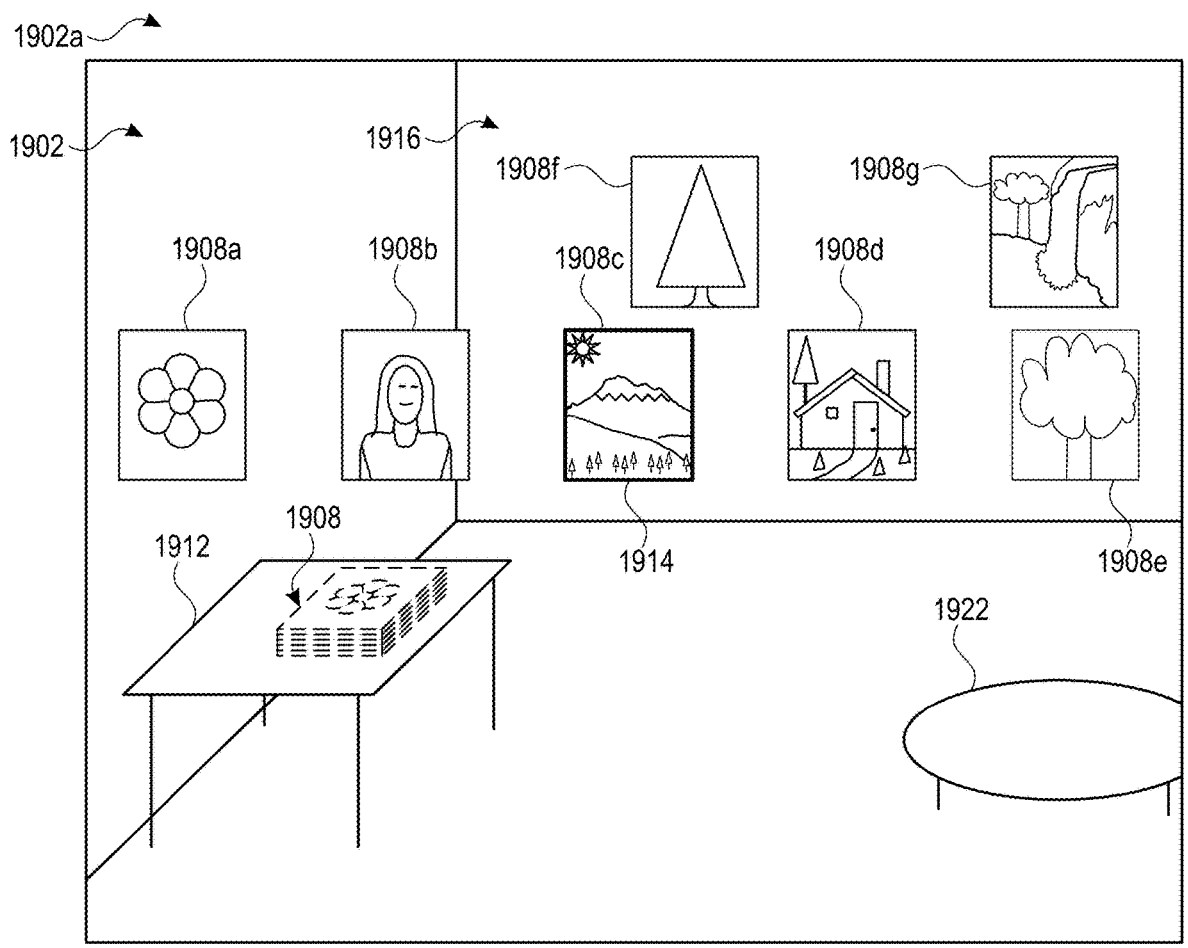
Figure 19G:
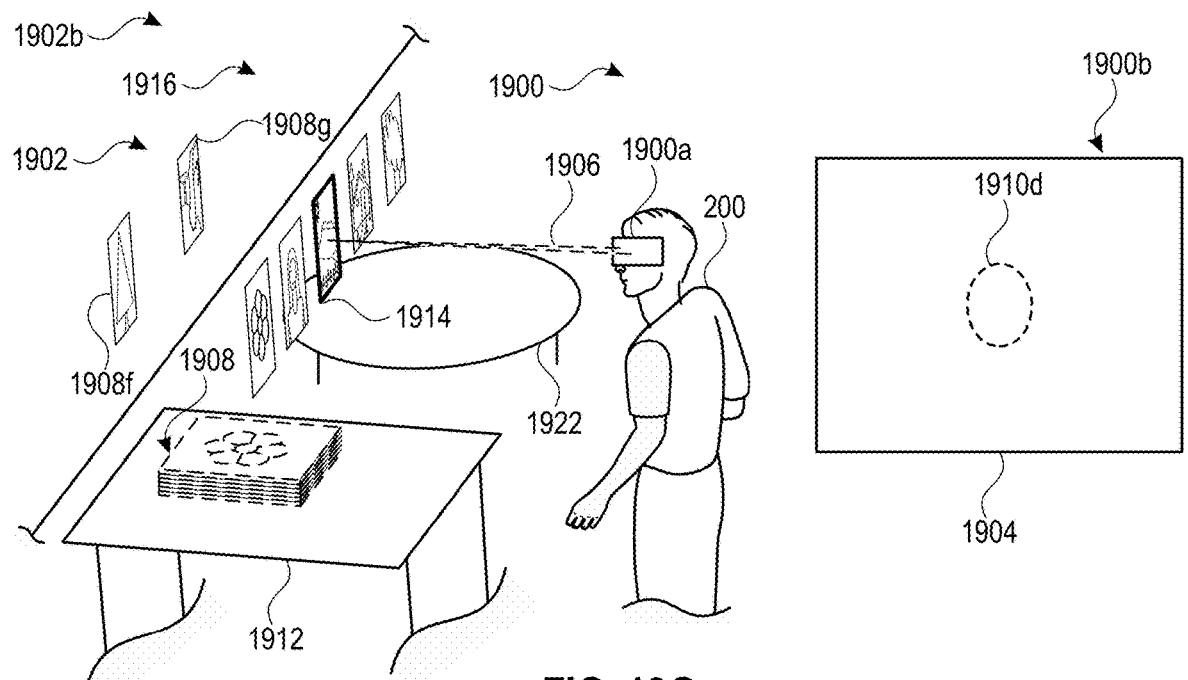
Figure 19H:
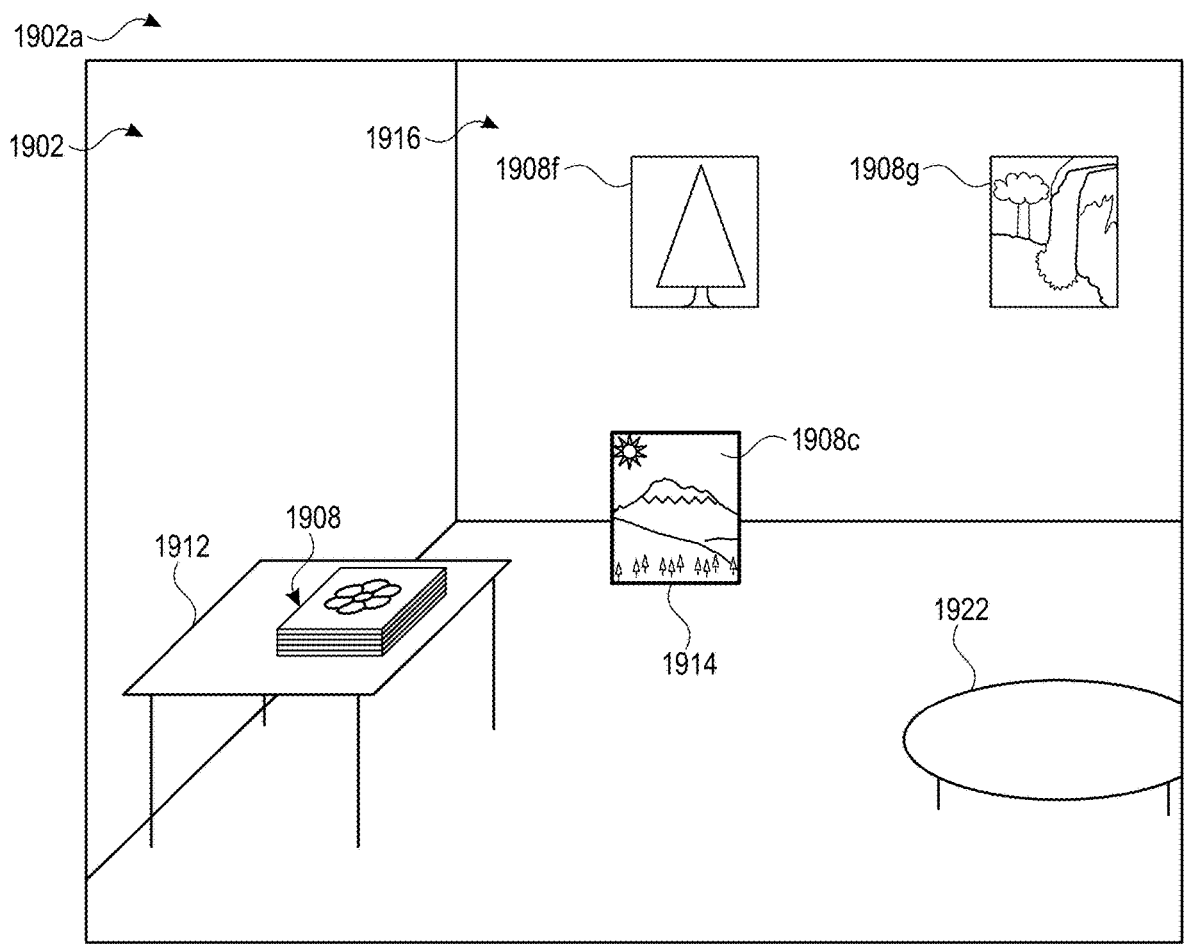
Figure 19H:
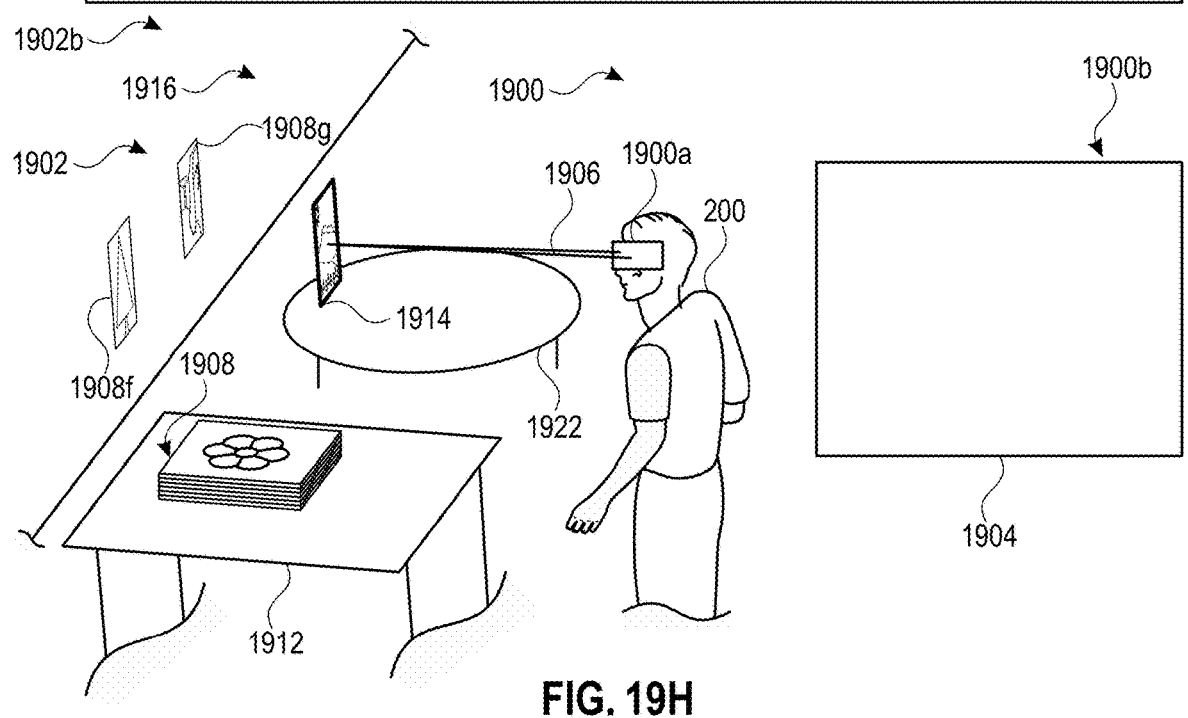
Figure 19I:
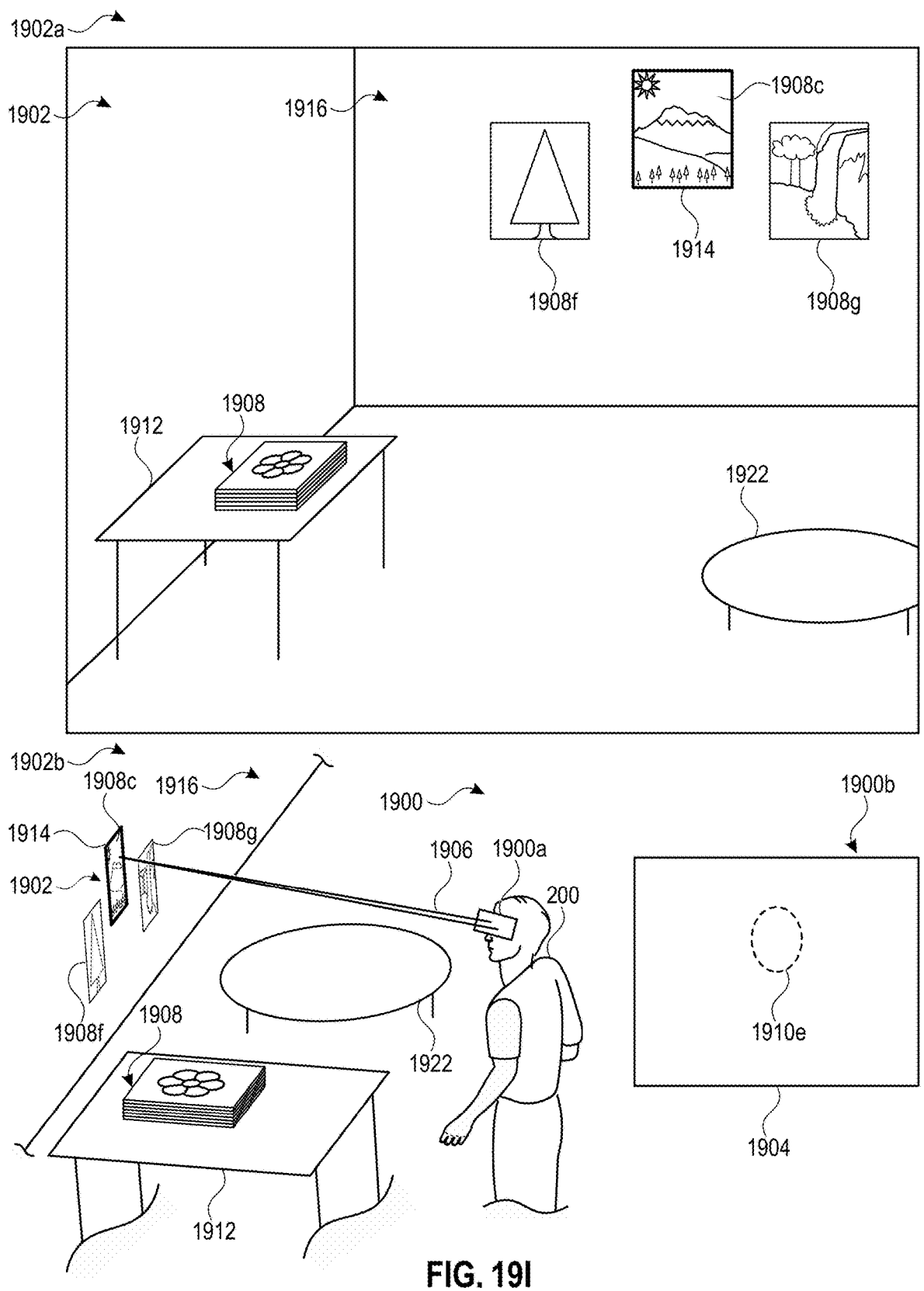
Figure 19J:
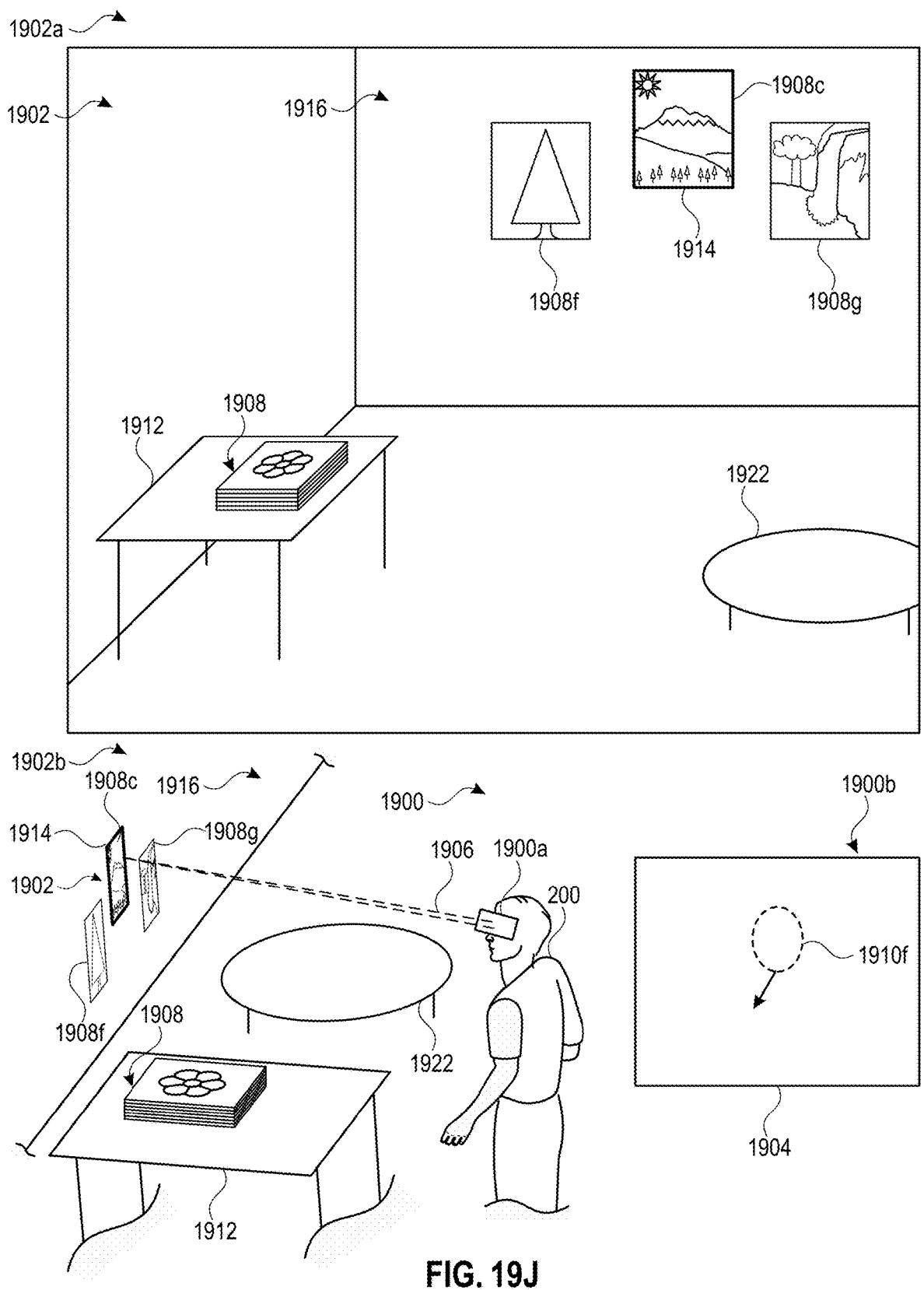
Figure 19K:
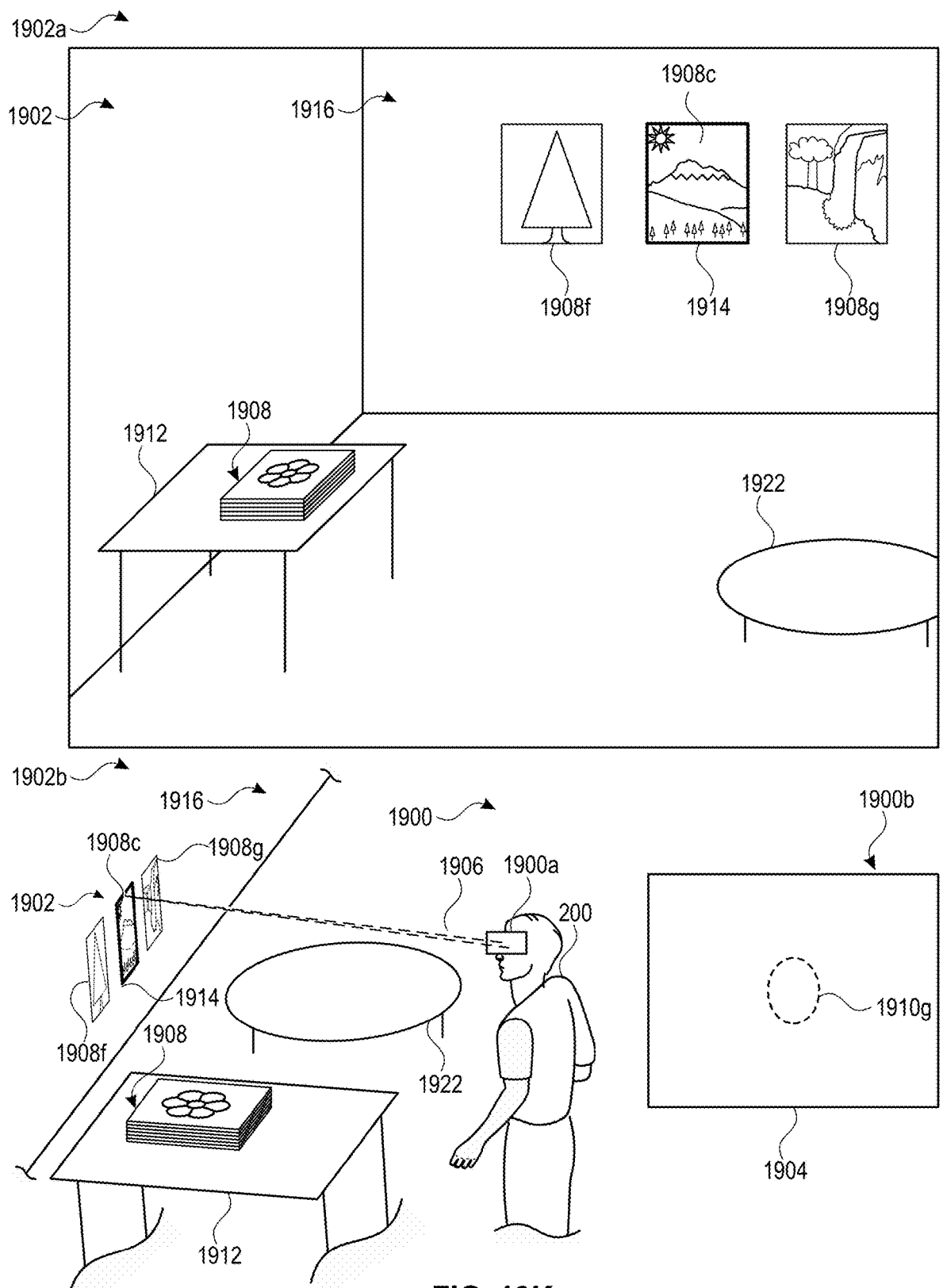
Figure 19L:
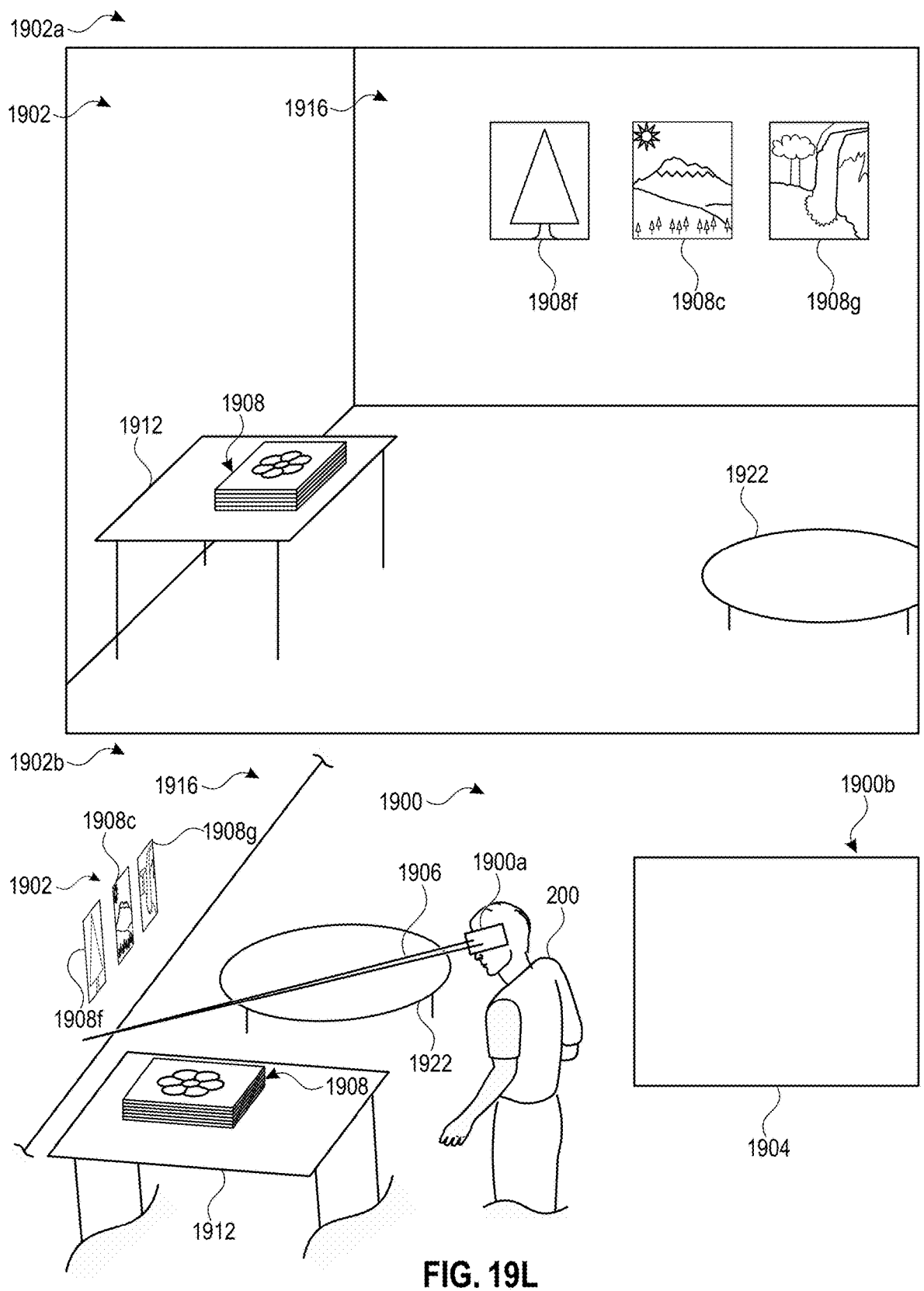
Figure 19M:
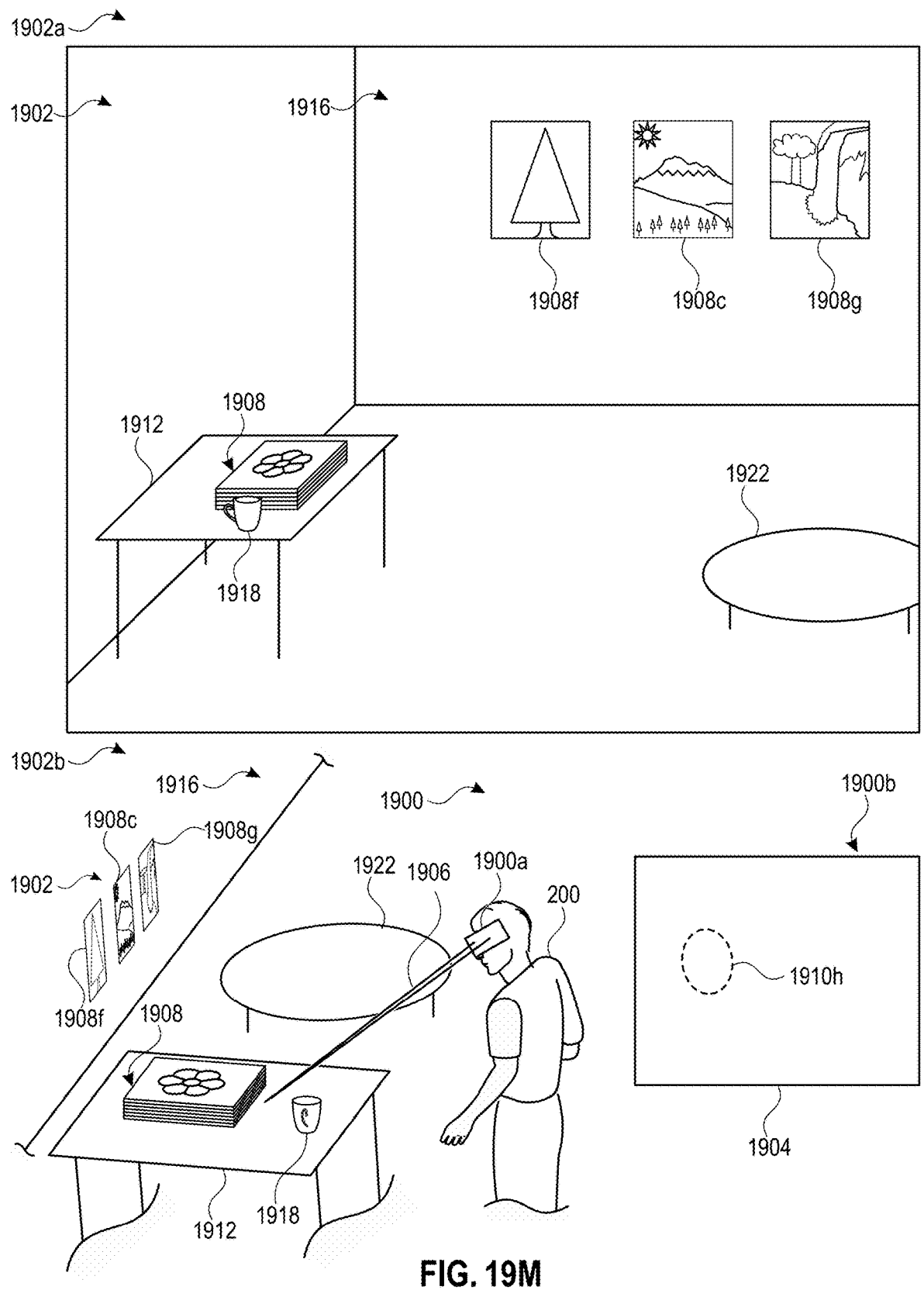
Figure 19N:
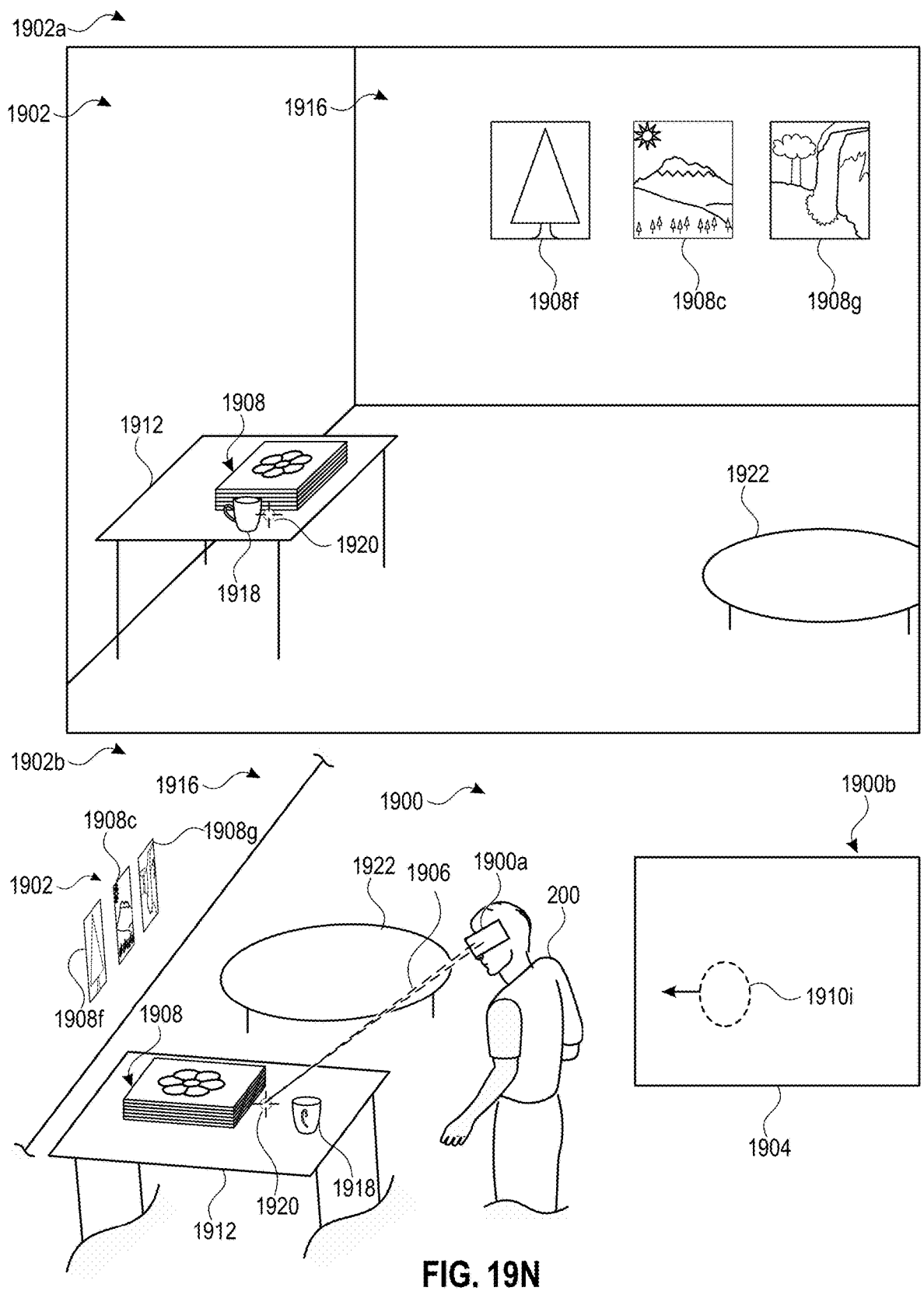
Figure 19O:
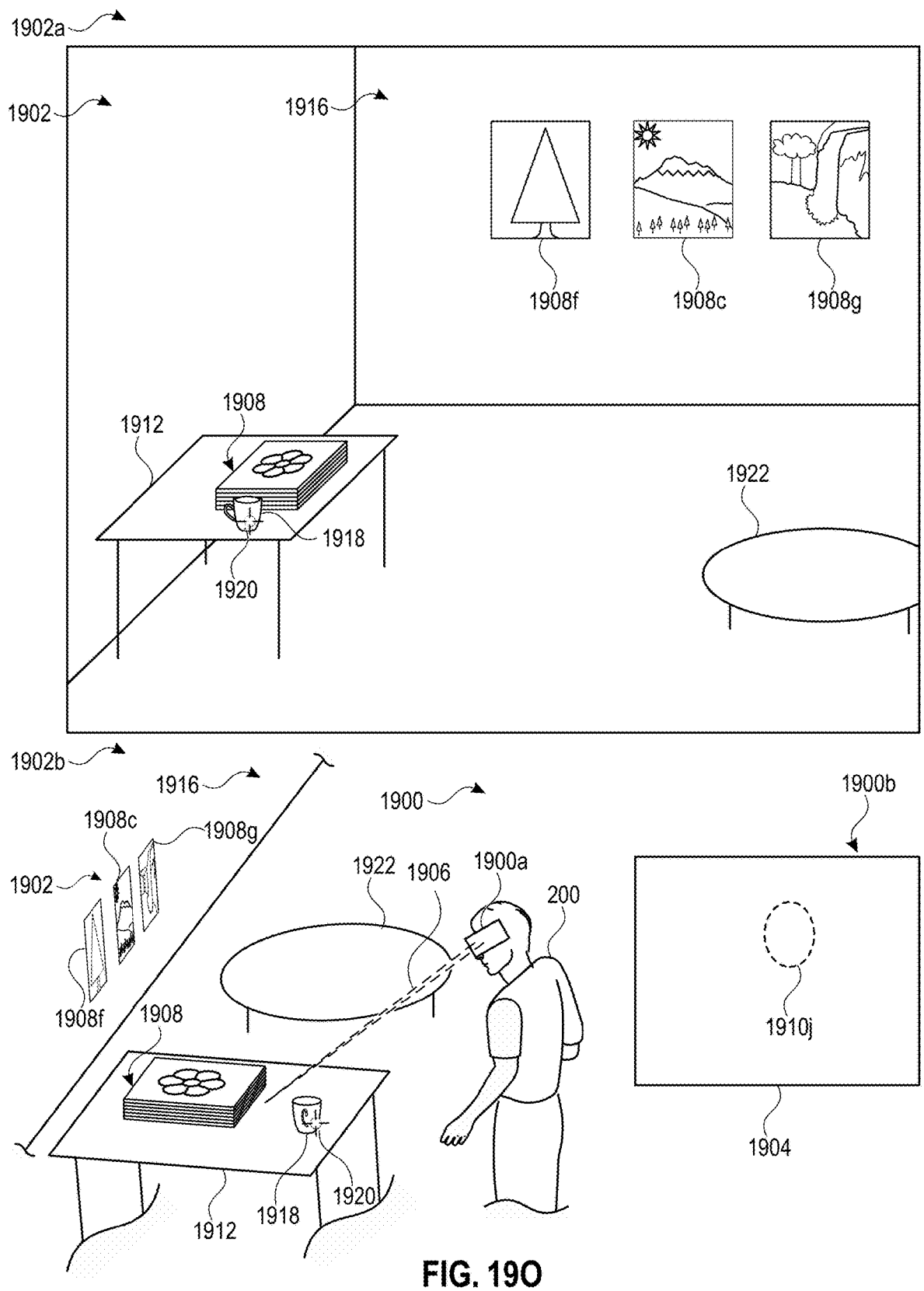
Figure 19P:
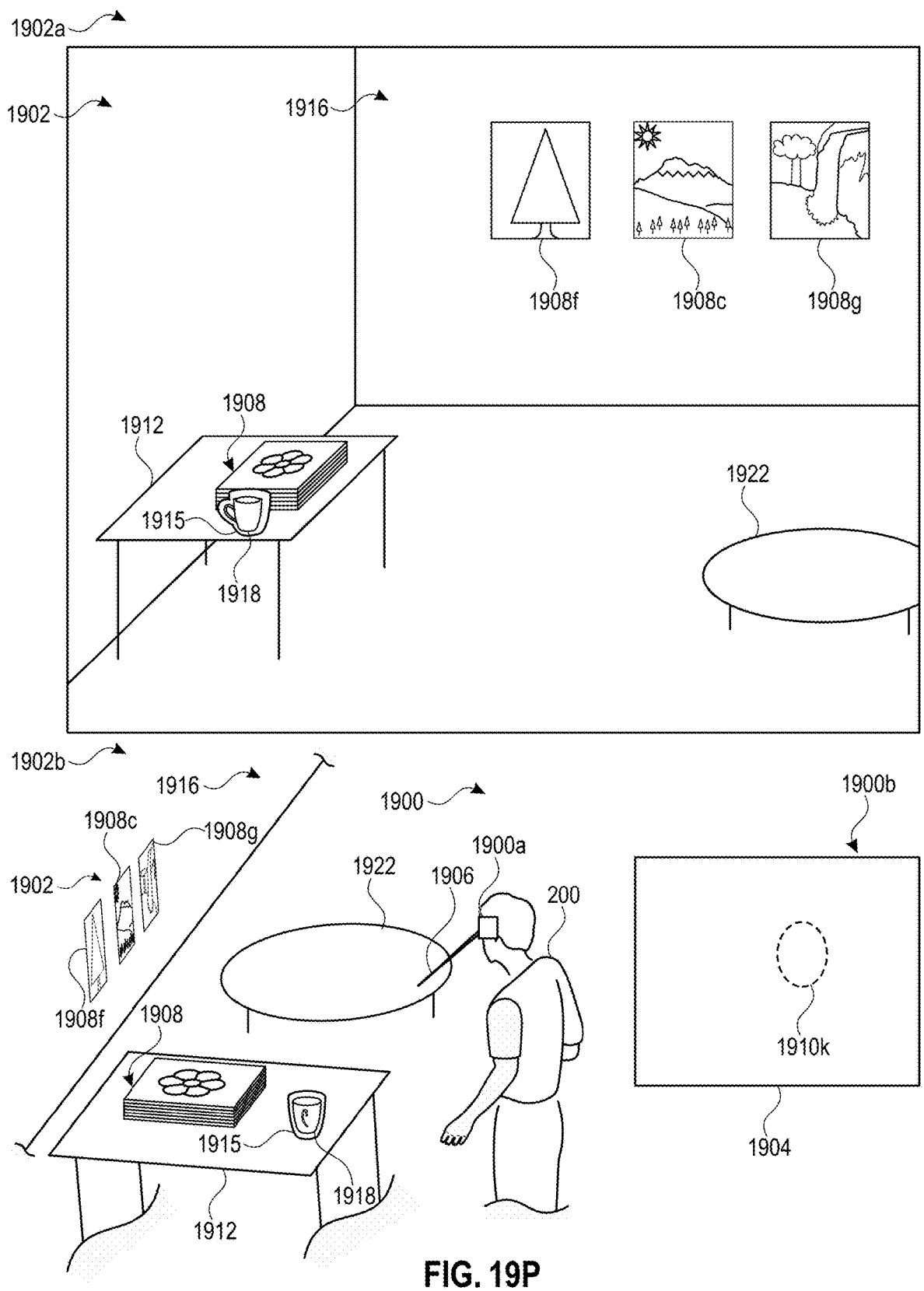
Figure 19Q:
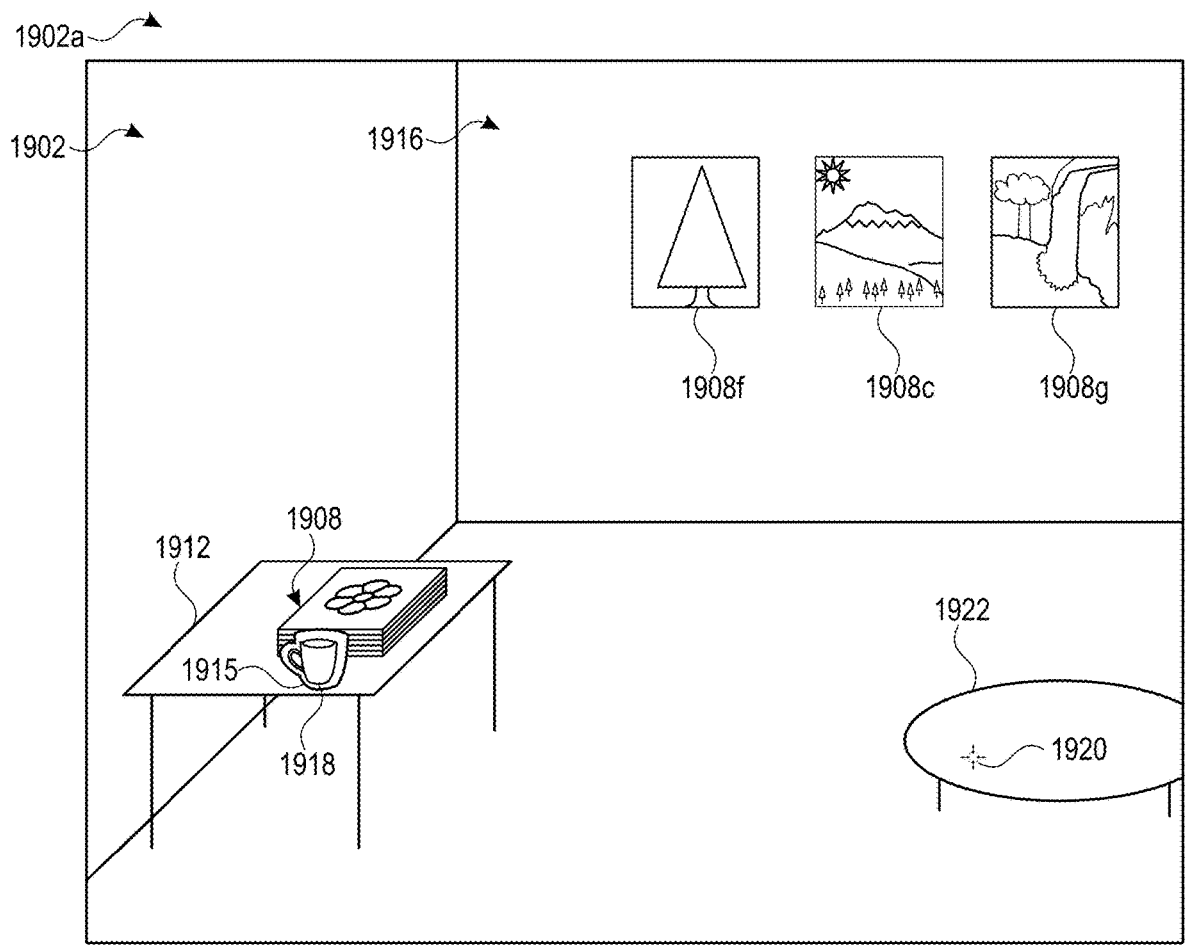
Figure 19Q:
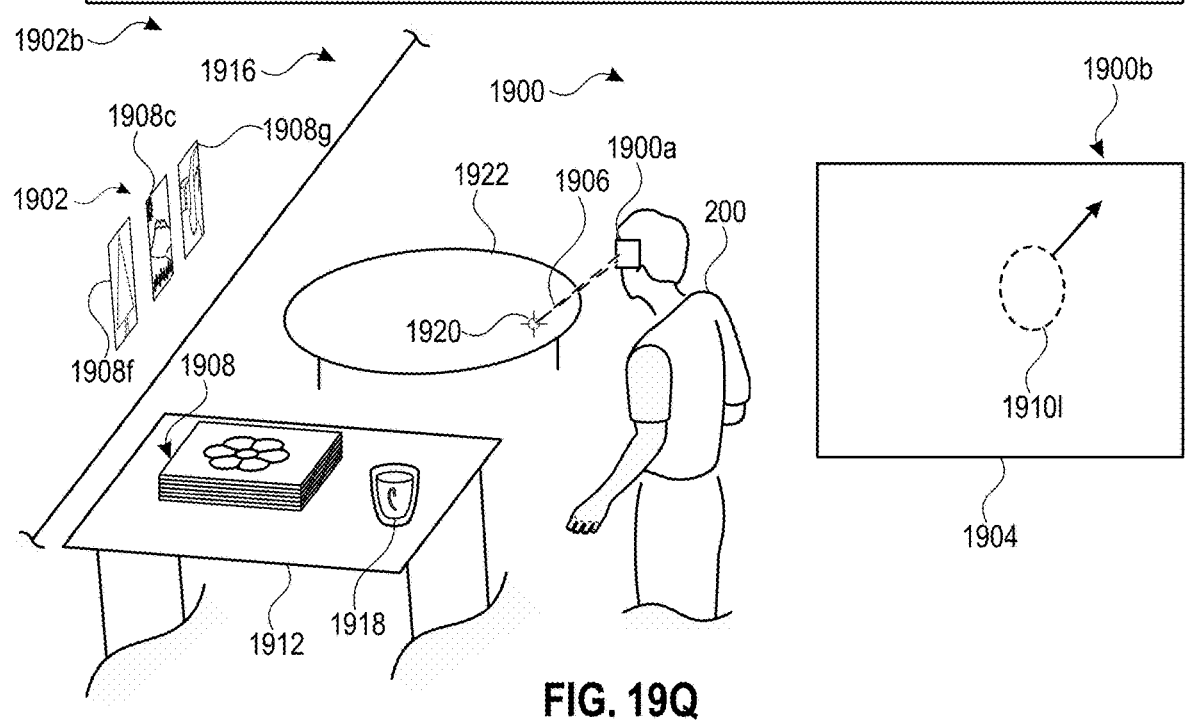
Figure 19R:
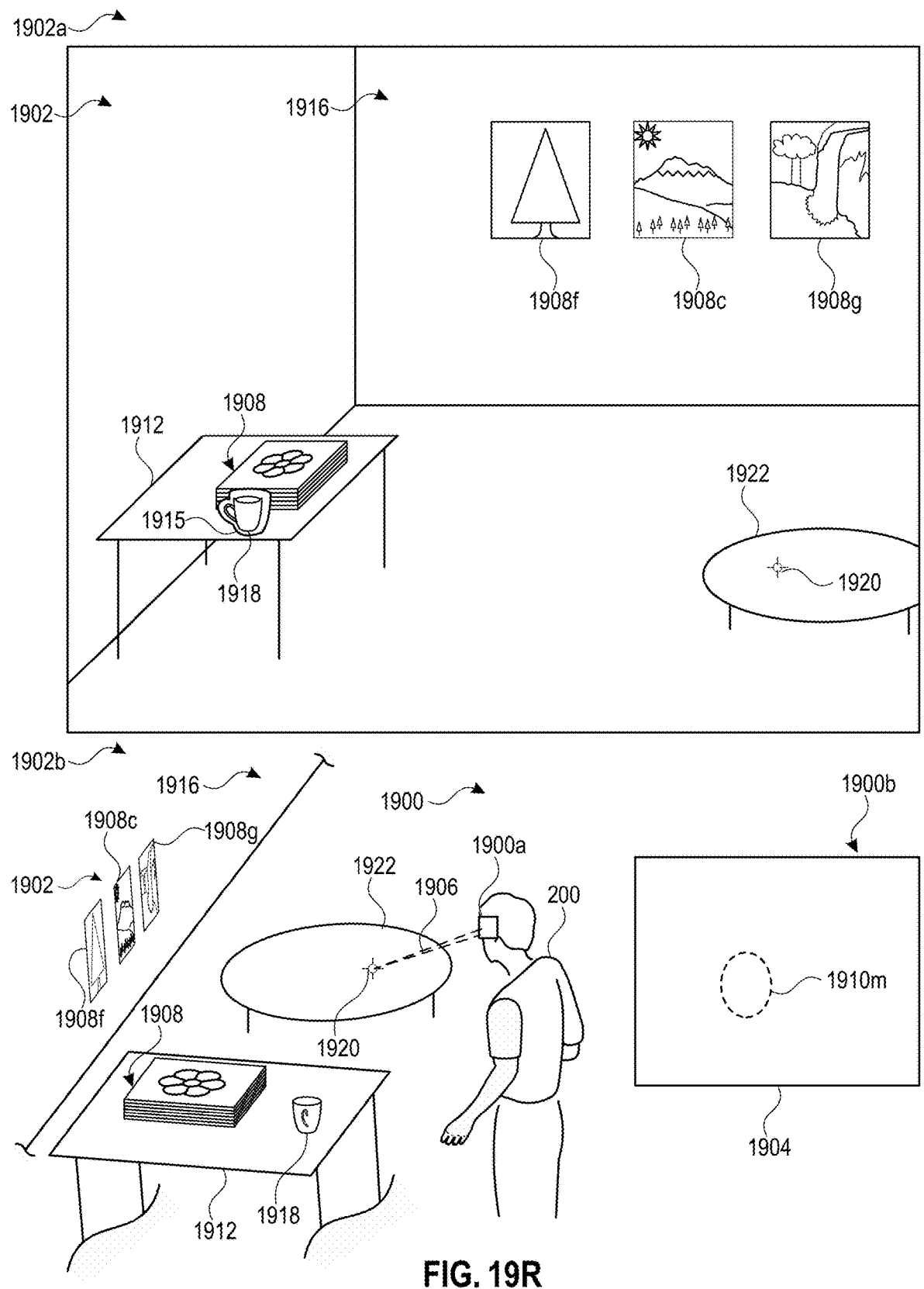
Figure 19S:
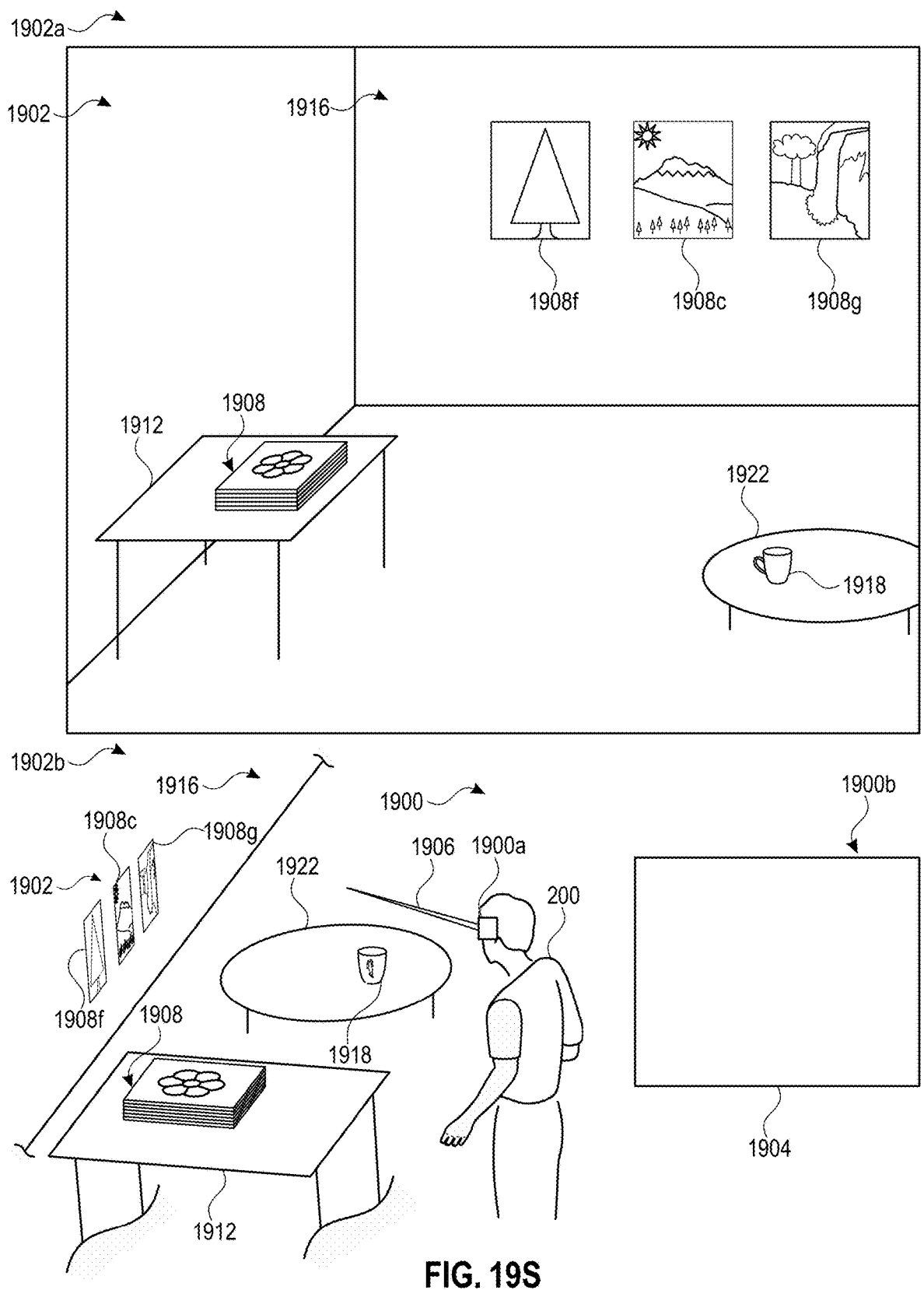
Figure 19T:
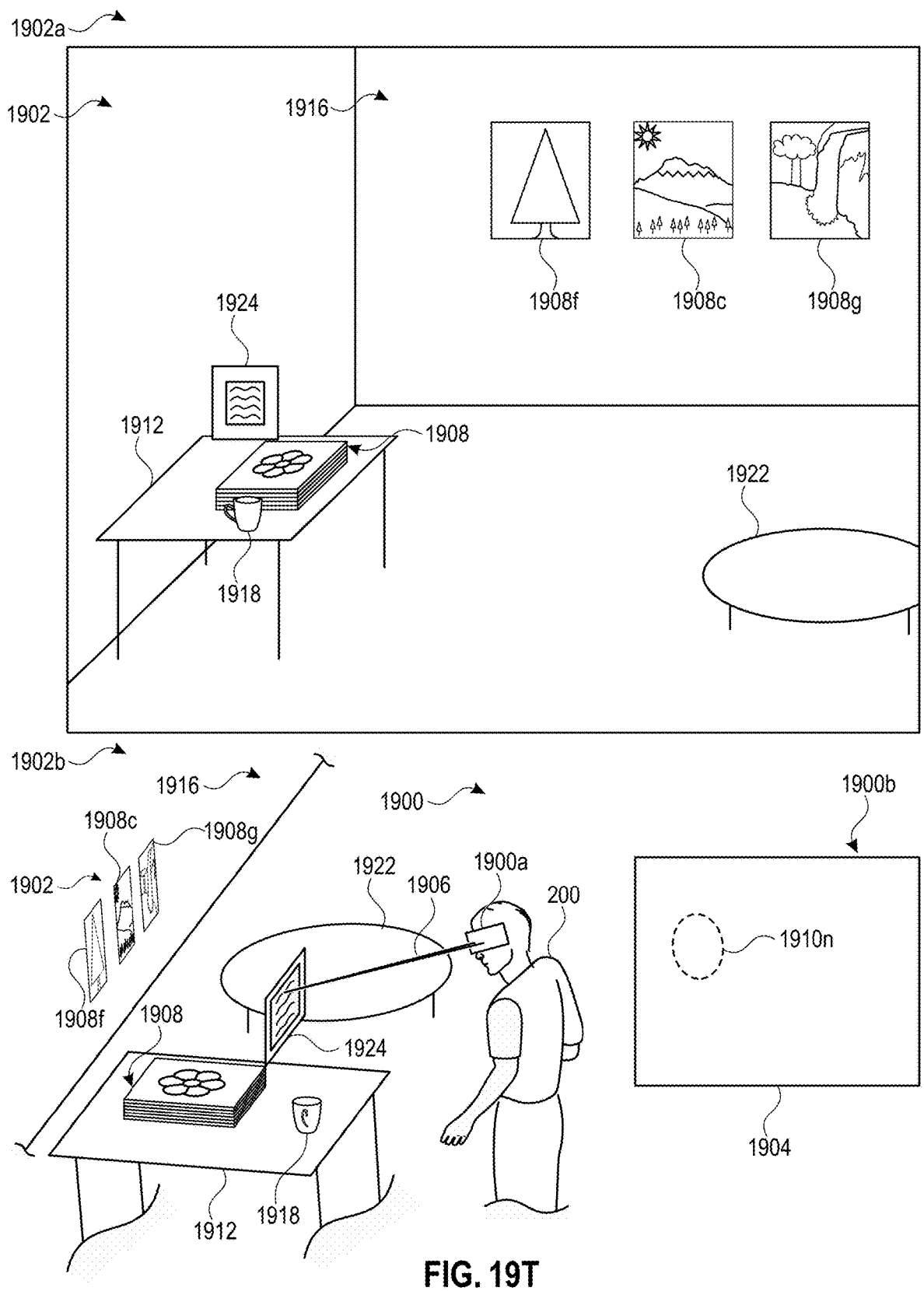
Figure 19U:
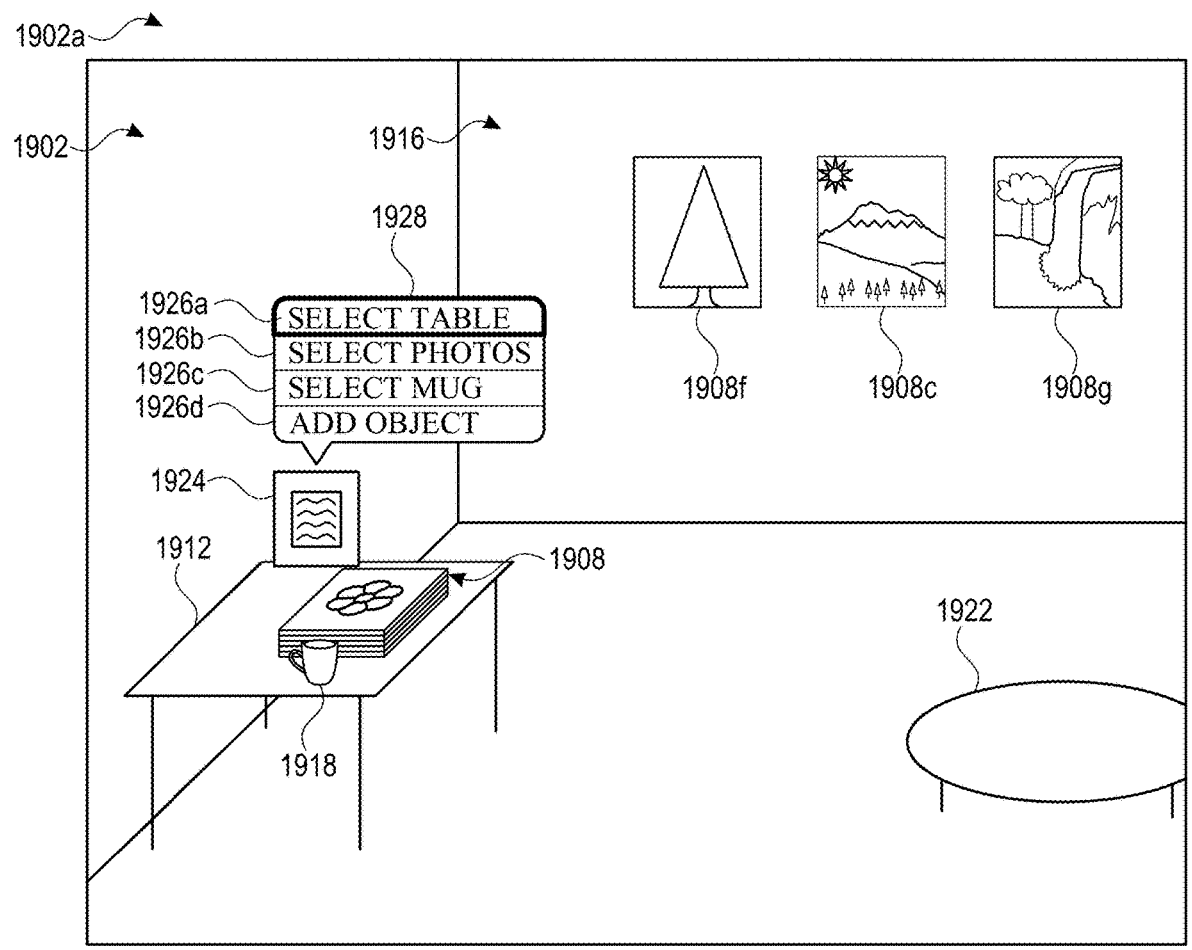
Figure 19U:
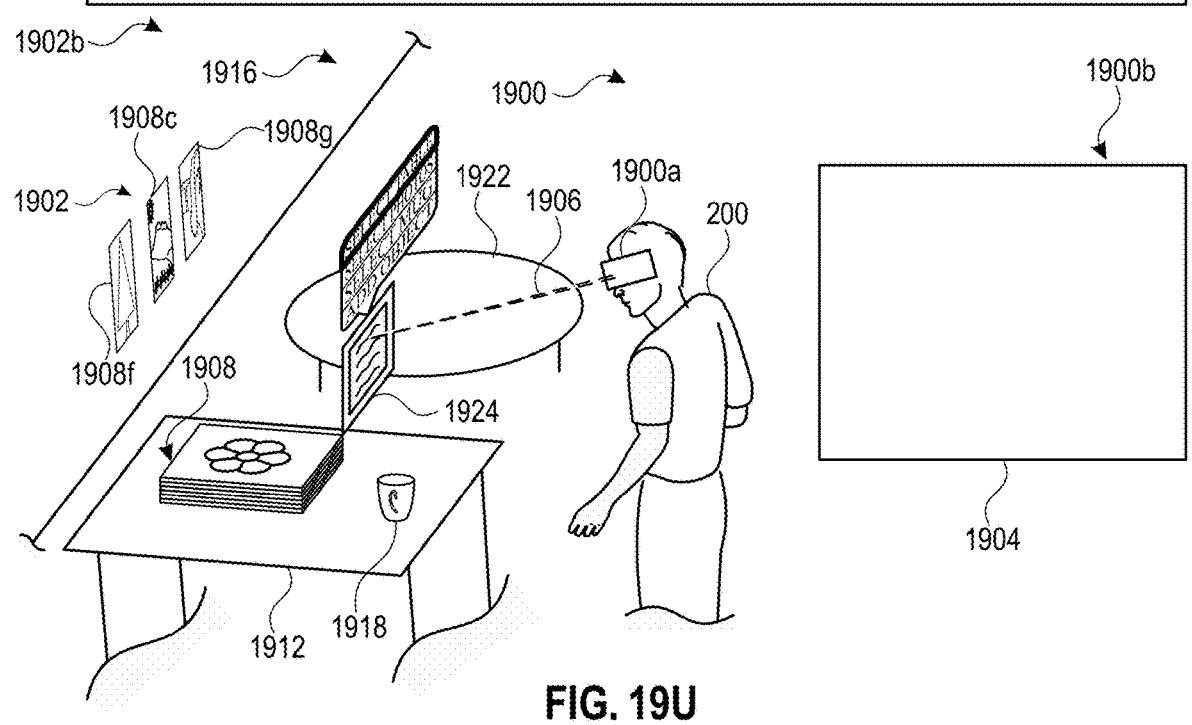
Figure 19V:
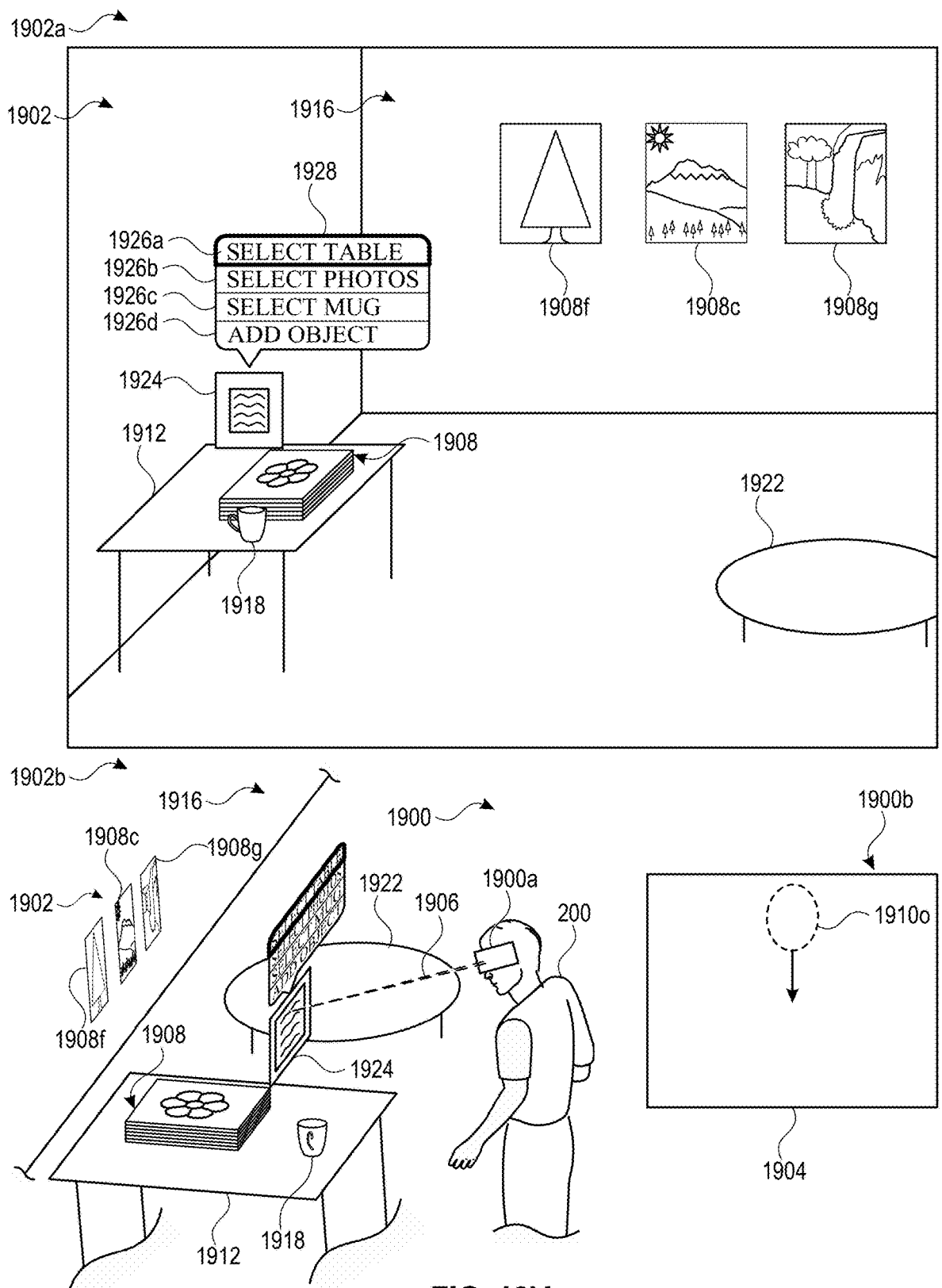
Figure 19W:
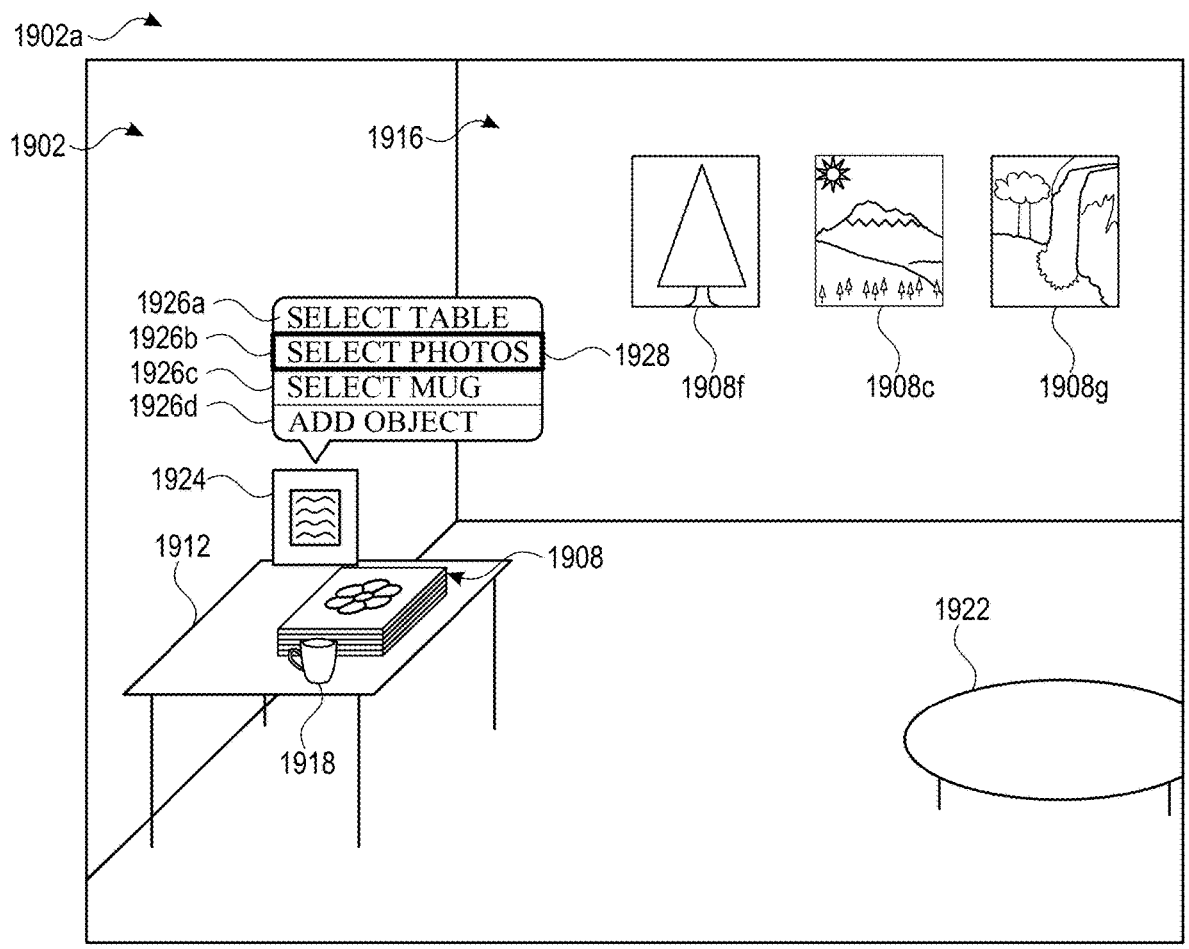
Figure 19W:
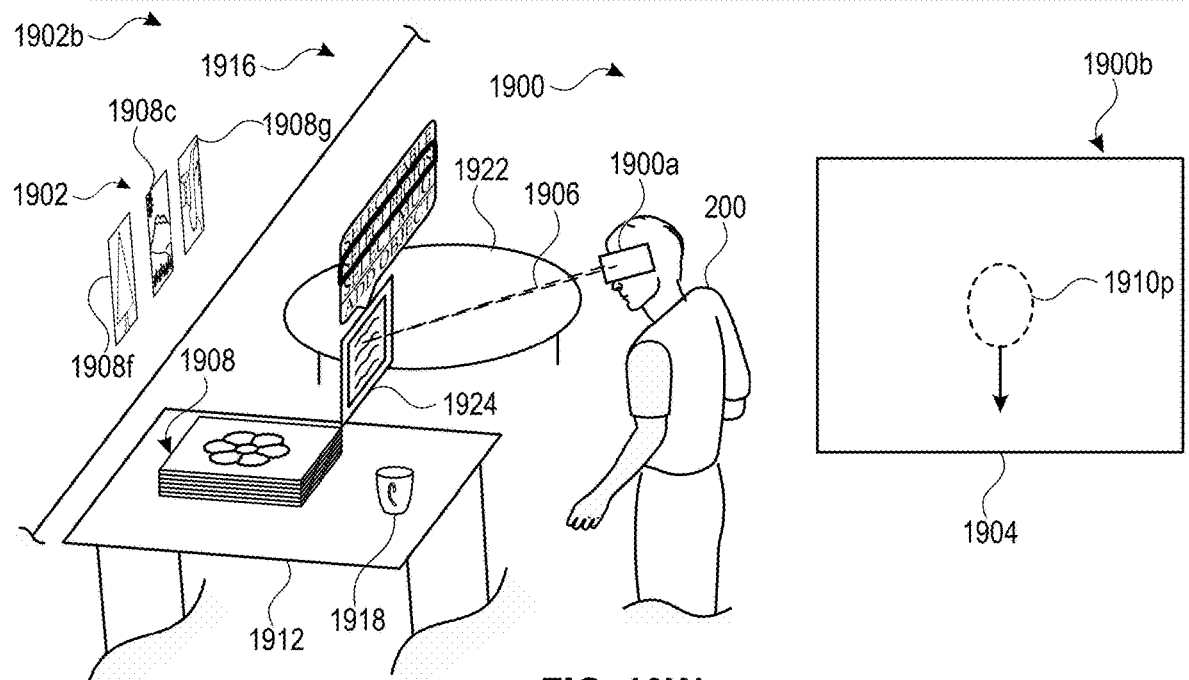
Figure 19X:
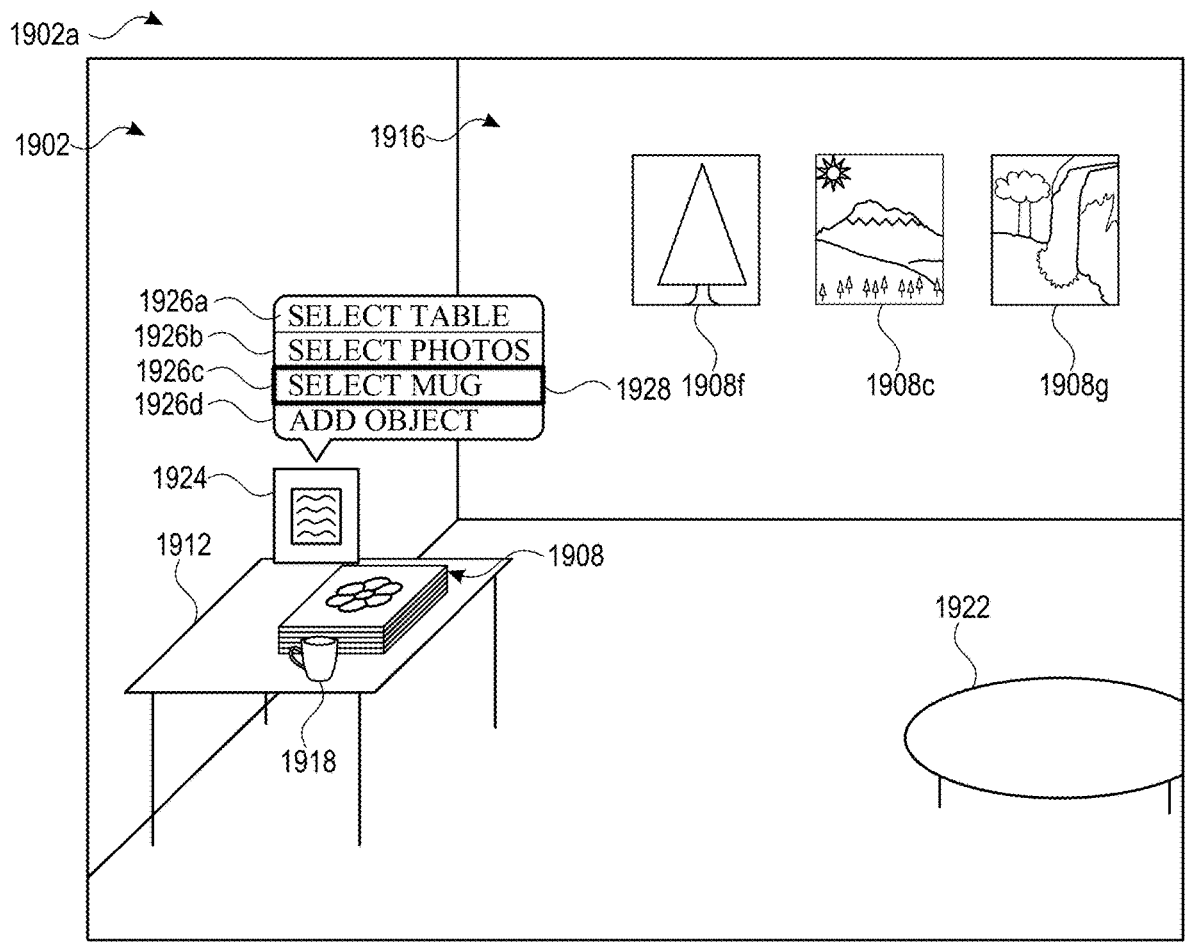
Figure 19X:
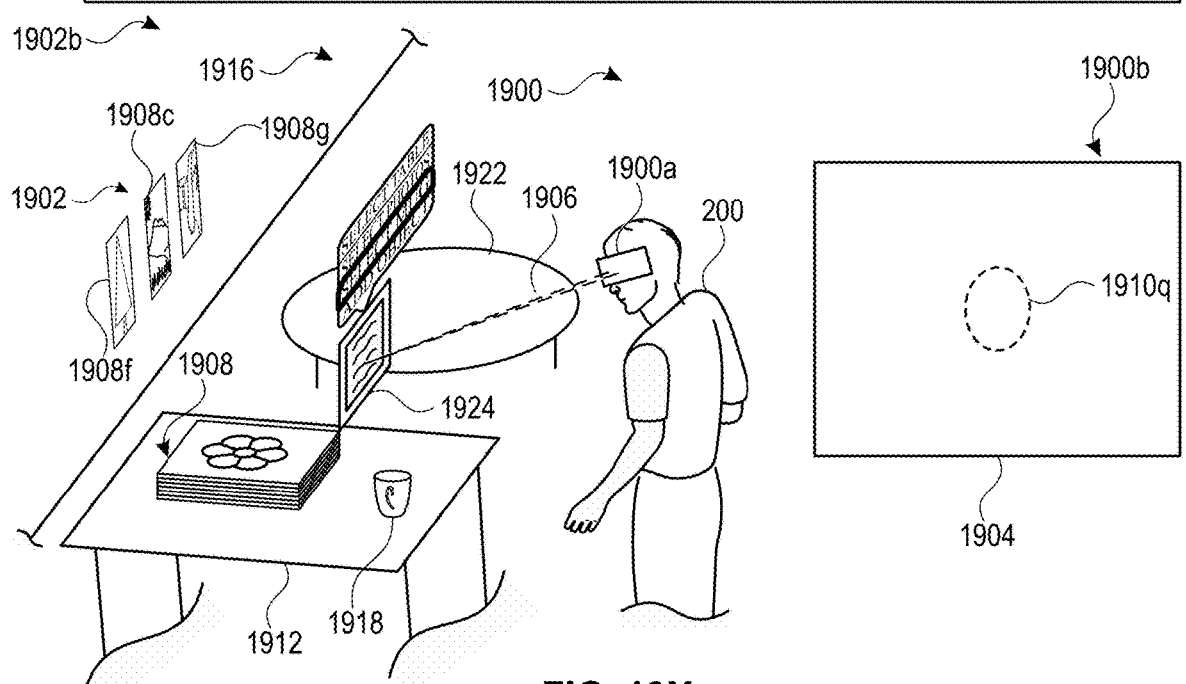
Figure 19Y:
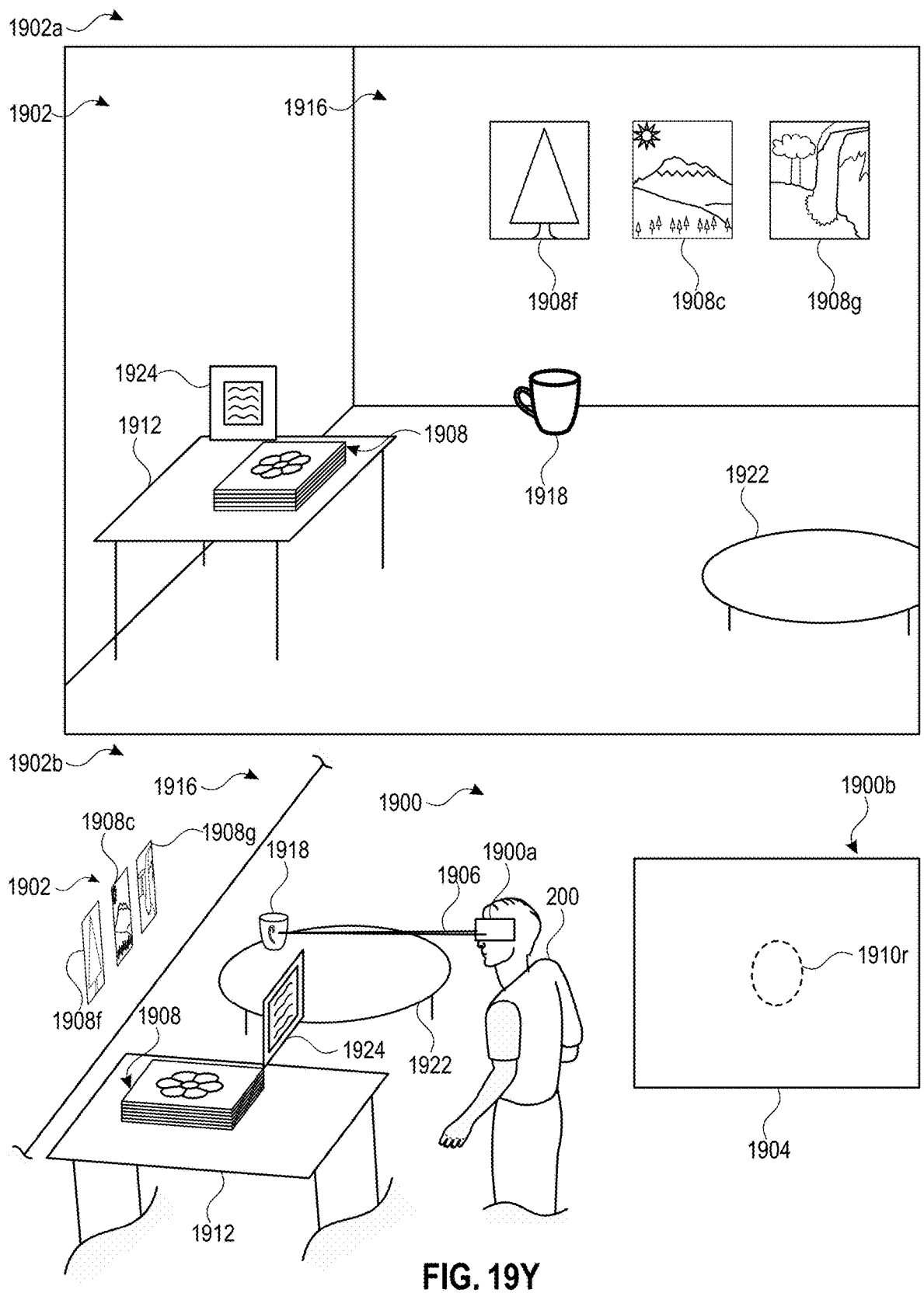

Turning to FIGS. 19A-19Y, techniques are described that provide a dual-modality for, e.g., selecting and/or placing objects (e.g., virtual objects, physical objects, and affordances corresponding to virtual and physical objects) in a CGR environment. In a first mode (e.g., "gaze-engaged" mode), a position or object is initially designated based on the position of a user's gaze. After the initial designation, a second mode (e.g., "gaze-disengaged" mode) is used to move the designated position or designate a different object without using gaze. Gaze position can be rapidly moved by a user, which makes it effective for quickly identifying a general area. As discussed above, however, there is uncertainty in the position of a user's gaze, which makes it difficult to designate a precise position using gaze. Displaying a persistent visual indicator at the estimated gaze position may be ineffective for designating a precise position, as the indicator can distract the user and cause the user's gaze to follow the indicator rather than focus on the desired designation point. The dual-modality technique allows a user to quickly make a rough initial designation, and then make fine adjustments independent of gaze (e.g., based solely on manual inputs) to designate a particular point or object.

FIG. 19A illustrates user 200, who uses device 1900 to interact with virtual environment 1902. In some embodiments, environment 1902 is a CGR environment (e.g., a VR or MR environment). Device 1900 includes virtual reality HMD 1900a and input device 1900b. In some embodiments, HMD 1900a is device 100a (e.g., in FIGS. 1F-1I) and input device 1900b is in communication with HMD 1900a (e.g., via communication bus(es) 150, shown in FIGS. 1A-1B). View 1902a illustrates a view of virtual environment 1902 displayed to user 200 on HMD 1900a, and view 1902b illustrates a perspective view of virtual environment 1902 including user 200. FIG. 19A also illustrates input device 1900b, which includes a touch-sensitive surface 1904 (e.g., touch-sensitive surface 122 in FIGS. 1A-1B) that allows user 200 to provide inputs to interact with virtual environment 1902. Device 1900 includes sensor(s) (e.g., image sensor(s) on HMD 1900A) to determine gaze 1906 (e.g., gaze direction and/or gaze depth) of user 200 (as described above). In some embodiments, device 1900 includes sensor(s) configured to detect various types of user inputs, including (but not limited to) eye gestures, body gestures, and voice inputs. In some embodiments, input device includes a controller configured to receive button inputs (e.g., up, down, left, right, enter, etc.).

Virtual environment 1902 includes stack of photos 1908, which includes individual photos 1908a-1908e, lying on table 1912. Gaze 1906 seen in view 1902b indicates that user 200 is looking at stack of photos 1908. In some embodiments, the lines representing gaze 1906 are not visible in virtual environment 1902, as shown for example in view 1902a.

As shown in FIG. 19A, device 1900 receives user input 1910a (e.g., a touch gesture on touch-sensitive surface 1904) while gaze 1906 is directed at stack of photos 1908. In some embodiments, user input 1910a includes an eye gesture, a body gesture, a voice input, a controller input, or a combination thereof, in addition to or instead of a touch gesture on touch-sensitive surface 1904.

In some embodiments, the response to user input 1910a depends on the characteristics of user input 1910a. For example, in accordance with a determination that user input 1910a is a first type of input (e.g., a tap on touch-sensitive surface 1904), the entire stack of photos 1908 is selected, as indicated by focus indicator 1914 (e.g., bold border) around stack of photos 1908 in FIG. 19B. In some embodiments, device 1900 de-selects stack of photos 1908 in response to receiving further input (e.g., selection of an exit button).

Alternatively, in accordance with a determination that user input 1910a is a different type of input (e.g., a touch and hold on touch-sensitive surface 1904), photos 1908a-1908e are presented, as illustrated in FIG. 19C, so that user 200 can more easily select a particular photo from stack 1908. In FIG. 19C, photos 1908a-1908e are moved from table 1912 and presented upright and spread out in the middle of the field of view of user 200. In response to receiving user input 1910a, photo 1908a in the far left position is designated (e.g., tentatively selected). Designation of photo 1908a is indicated by focus indicator 1914, which includes a bold border around photo 1908a. In some embodiments, focus indicator 1914 includes a pointer, cursor, dot, sphere, highlighting, outline, or ghost image that visually identifies the designated object. In some embodiments, device 1900 un-designates photo 1908a and returns photos 1908 to table 1912 in response to receiving further input (e.g., selection of an exit button or liftoff of a touch).

The responses illustrated in FIG. 19B and FIG. 19C are both based on gaze 1906, and more specifically, the gaze position of user 200 at the time of user input 1910a. Stack of photos 1908 is either selected (FIG. 19B) or designated and re-presented for further selection due to the gaze position of user 200 being positioned on stack of photos 1908. When the response to user input is based on gaze 1906, device 1900 is in a gaze-engaged mode and gaze 1906 of user 200 is engaged with user input. Gaze-engaged mode is indicated in FIG. 19A by gaze 1906 being illustrated by solid lines.

In some embodiments, the response to user input 1910a depends on whether gaze 1906 corresponds to more than one selectable object. In some embodiments, device 1900 does not confirm selection if there is ambiguity or uncertainty about the object to be selected. For example, device 1900 displays photos 1908a-1908e and designates photo 1908a (FIG. 19C) in accordance with a determination that the position of gaze 1906 corresponds to a plurality of unresolvable selectable objects (e.g., stack of photos 1908). In some such embodiments, in accordance with a determination that the position of gaze 1906 corresponds to only a single selectable object (e.g., mug 1918 illustrated in FIG. 19M described below), device 1900 selects the single selectable object (e.g., instead of designating an object or providing the capability to further refine the selection).

In the illustrated embodiment, in response to receiving user input 1910a, device 1900 also switches to a gaze-disengaged mode in which a response to a user input is not based on gaze 1906 of user 200 and gaze 1906 is disengaged from further user input. Gaze-disengaged mode is indicated in FIG. 19C by gaze 1906 being illustrated by broken lines.

Turning to FIG. 19D, while photo 1908a is designated, device 1900 receives user input 1910b. In FIG. 19D, user input 1910b includes a left-to-right swipe or drag gesture. In some embodiments, user input 1910b is a continuation of user input 1910a (e.g., user input 1910a includes a contact that is maintained on touch-sensitive surface 1904, and user input 1910b includes movement of the contact). In some embodiments, user input 1910b includes a press of a directional button or an oral command ("move right"). In response to receiving user input 1910b, focus indicator 1914 is moved from photo 1908a in accordance with (e.g., in the direction of) user input 1910b to designate photo 1908b, as shown in FIG. 19E.

Notably, since gaze 1906 is disengaged, photo 1908b is designated in response to receiving user input 1910b despite gaze 1906 being positioned on photo 1908a at the time of user input 1910b. Focus indicator 1914 is moved to a position (e.g., object) that does not correspond to the position of gaze 1906. More generally, moving focus indicator 1914 to designate photo 1908b is not based on gaze 1906. In some embodiments, focus indicator 1914 is moved based solely on characteristics of user input 1910b (e.g., position, direction, speed, duration, etc.).

As illustrated in FIG. 19E, gaze 1906 remains disengaged, and in response to receiving further user input 1910c while gaze 1906 is positioned on photo 1908a, focus indicator 1914 is moved from photo 1908b to designate photo 1908c, as shown in FIG. 19F.

Turning to FIG. 19G, while photo 1908c is designated, device 1900 receives user input 1910d (e.g., click, double tap, or finger liftoff). In response to receiving user input 1910d, the currently designated object, photo 1908c, is selected. In response to receiving user input 1910d, focus indicator 1914 remains on photo 1908c and the other photos 1908a, 1908b, 1908d, and 1908e are returned to table 1912, as shown in FIG. 19H. Also, gaze 1906 of user 200 is re-engaged in response to receiving user input 1910d.

The technique described with respect to FIGS. 19A-19H provides a dual-mode operation in which user 200 can efficiently select a particular object (e.g., one of photos 1908) that would be difficult to distinguish using gaze alone when photos 1908 are stacked on table 1912 (e.g., due to uncertainty in gaze position). User 200 can use gaze 1906 to quickly designate a group of objects, and then use inputs independent from gaze 1906 to navigate the group of objects and select a particular one.

Turning to FIG. 19I, while maintaining selection of photo 1908c, user 200 moves gaze 1906 to a position on wall 1916 in environment 1902 between photo 1908f and photo 1908g. In response to movement of gaze 1906, photo 1908c is moved to the position corresponding to the gaze position. In some embodiments, photo 1908c remains at the position shown in FIG. 19I or is moved and/or modified visually (e.g., so as not to obstruct the view of user 200 of virtual environment 1902) until a placement position for photo 1908c is designated or selected, as described below.

While photo 1908c is positioned as shown in FIG. 19I, device 1900 receives user input 1910e (e.g., a touch on touch-sensitive surface 1904). In response to receiving user input 1910e, a placement position for photo 1908c is designated based on the position of gaze 1906 at the time of user input 1910e. As shown in FIG. 19J, in response to receiving user input 1910e, selected photo 1908c is placed at the position of gaze 1906 and remains selected, and gaze 1906 is disengaged. In some embodiments, the placement position is indicated by a pointer, cursor, dot, sphere, highlighting, outline, or ghost image (e.g., of the object being placed).

In some embodiments, the response to user input 1910e depends on the characteristics of user input 1910e. In some embodiments, in accordance with user input 1910e including a first type of input (e.g., a touch on touch-sensitive surface 1904), device 1900 designates a tentative placement position for photo 1908c on wall 1916, photo 1908c remains selected, and gaze 1906 is disengaged, as discussed above; and in accordance with user input 1910e including a second type of input (e.g., a click on touch-sensitive surface 1904), photo 1908c is placed on wall 1916, photo 1908c is de-selected, and gaze 1906 is re-engaged. Accordingly, by using different inputs, user 200 can choose to either designate a tentative placement position and maintain selection of photo 1908c to adjust the position with further input (as discussed below) or accept the gaze position as the placement position and de-select photo 1908c.

Returning to FIG. 19J, while photo 1908c remains selected and positioned at the initially designated position, device 1900 receives user input 1910f, which includes a downward swipe or drag gesture. In response to receiving user input 1910f, photo 1908c is moved downward in accordance with user input 1910f and independent of the position of gaze 1906, as shown in FIG. 19K. According to this technique, user 200 can use gaze 1906 to quickly and roughly designate an initial placement position and then make fine adjustments to the position that do not depend on gaze. Once photo 1908c is in the desired position (e.g., aligned with photo 1908f and photo 1908g), user 200 provides input 1910g. In response to input 1910g, the position of photo 1908c in FIG. 19K is selected as the final placement position and gaze 1906 is re-engaged. As shown in FIG. 19L, in response to receiving user input 1910g, focus is removed from photo 1908c (photo 1908c is de-selected) and photo 1908c remains at the selected placement position as user 200 moves gaze 1906 to a different position.

Turning now to FIG. 19M, virtual environment 1902 is configured as shown in FIG. 19L, with the addition of mug 1918. In FIG. 19M, while gaze 1906 is positioned between mug 1918 and stack of photos 1908, device 1900 receives user input 1910h (e.g., a touch on touch-sensitive surface 1904, a press of a button, or a body gesture). In response to receiving user input 1910h, a selection point represented by focus indicator 1920 is designated at a position corresponding to the position of gaze 1906, as shown in FIG. 19N. In some embodiments, focus indicator 1920 includes a pointer, cursor, dot, or sphere. In some embodiments, gaze 1906 is determined (e.g., measured or estimated) prior to the user input (e.g., the most recent measured or estimated position) or subsequent (e.g., in response) to the user input.

In some embodiments, the response to user input 1910h is contextual. In some embodiments, the response is based on what is located at the gaze position. For example, device 1900 can respond differently depending on whether an object, a plurality of unresolvable objects, a menu affordance, or no object is at the gaze position at the time of user input 1910h. For example, if device 1900 determines with a predetermined amount of certainty that gaze 1906 corresponds to stack of photos 1908, focus indicator 1914 is displayed as described with reference to FIGS. 19A-19C instead of focus indicator 1920. In some embodiments, a plurality of objects include menu options associated with an object (e.g., menu affordance 1924 described below).

In some embodiments, the response is based on whether an object is currently selected. For example, if an object is not currently selected, device 1900 can operate in a selection mode and perform a selection action (e.g., select an object (FIG. 19B), designate a selection point (FIG. 19N), or display multiple objects to select (FIG. 19C)); if an object is currently selected, device 1900 can operate in a placement mode and perform a placement action (e.g., place the object at the gaze position or display a ghost image of the selected object at a designated placement position; see, e.g., the description of FIGS. 19H-19J above and FIGS. 19P-19Q below).

Returning to FIG. 19N, focus indicator 1920 is displayed in accordance with a determination that there are multiple selectable objects corresponding to the position of gaze 1906 at the time of user input 1910h. For example, if device 1900 is unable to determine with sufficient certainty whether gaze 1906 corresponds to stack of photos 1908 or mug 1918, focus indicator 1920 is displayed so that user 200 can clarify which object he desires to select. In the illustrated embodiment, user 200 desires to select mug 1918 and provides user input 1910i, which includes a right-to-left swipe or drag gesture on touch-sensitive surface 1904 to move focus indicator 1920 to mug 1918. In response to receiving user input 1910i, the selection point is moved to a position corresponding to mug 1918, as indicated by focus indicator 1920 in FIG. 19O. While the selection point is positioned on mug 1918, device 1900 receives user input 1910j (e.g., a click). In response to receiving user input 1910j, the selection point is confirmed and the object corresponding to the current position of the selection point is selected. As illustrated in FIG. 19P, mug 1918 is selected, as indicated by focus indicator 1915 (e.g., highlighting) around mug 1918, and gaze 1906 is re-engaged.

As shown in FIG. 19P, while mug 1918 remains selected, user 200 moves gaze 1906 to table 1922. In the illustrated embodiment, mug 1918 remains displayed at the same position (e.g., it does not move with gaze 1906 even though gaze 1906 is engaged).

While gaze 1906 is positioned as shown in FIG. 19P, device 1900 receives user input 1910k. In response to receiving user input 1910k, a placement point is designated by focus indicator 1920 at the position corresponding to gaze 1906, and gaze 1906 is disengaged, as shown in FIG. 19Q. In some embodiments, focus indicator 1920 includes a pointer, cursor, dot, sphere, highlighting, outline, or ghost image of the selected object (e.g., mug 1918).

In some embodiments, the response to user input 1910k, while mug 1918 is selected, depends on whether there is more than one placement position corresponding to the position of gaze 1906 at the time of user input 1910k. In FIG. 19P, the placement point is designated in accordance with a determination that the position of gaze 1906 corresponds to a plurality of possible selectable placement positions (e.g., device 1900 does not confirm the placement position for the selected object if there are various possible placement position at or near the gaze position). In some embodiments, in accordance with a determination that the position of gaze 1906 corresponds to only a single selectable placement position and in response to receiving user input 1910k, device 1900 places the selected object at the gaze position, de-selects the object, and re-engages gaze 1906.

Turning to FIG. 19Q, while the placement point is designated, device 1900 receives user input 1910l, which includes a diagonal swipe or drag gesture upward and to the right on touch-sensitive surface 1904. In response to receiving user input 1910l, the placement point is moved in accordance with user input 1910l, as indicated by focus indicator 1920 moving toward the center of table 1922, as shown in FIG. 19R. The placement point is confirmed in response to receiving user input 1910m, and the selected object (e.g., mug 1918) is placed at the confirmed placement point on table 1922, as shown in FIG. 19S. Gaze 1906 is also re-engaged in response to receiving user input 1910m.

Turning now to FIG. 19T, virtual environment 1902 is configured as shown in FIG. 19M, with the addition of menu affordance 1924, which is associated with objects in the vicinity of menu affordance 1924 (e.g., table 1912, photos 1908, and mug 1918). In FIG. 19T, while gaze 1906 is positioned on menu affordance 1924, device 1900 receives user input 1910n (e.g., a touch). In response to receiving user input 1910n, menu affordance 1924 is selected and gaze 1906 is disengaged from user input, as shown in FIG. 19U.

Selection of menu affordance 1924 causes display of menu options 1926a-1926d, which can be cycled through and selected with input independent of gaze 1906. As shown in FIG. 19U, menu option 1926a (SELECT TABLE) is initially designated with focus indicator 1928 (e.g., bold border) in response to selection of menu affordance 1924.

As shown in FIG. 19V, device 1900 receives user input 1910o, which includes a downward swipe or drag gesture. In response to receiving user input 1910o, focus indicator 1928 moves according to user input 1910o from menu option 1926a (SELECT TABLE) down to menu option 1926b (SELECT PHOTOS), regardless of the position of gaze 1906, as shown in FIG. 19W.

In FIG. 19W, device 1900 receives user input 1910p, which includes additional downward movement. In response to receiving user input 1910p, focus indicator 1928 moves according to user input 1910p from menu option 1926b (SELECT PHOTOS) down to menu option 1926c (SELECT MUG), again regardless of the position of gaze 1906, as shown in FIG. 19X.

In FIG. 19X, while menu option 1926C is designated, device 1900 receives user input 1910q. In response to receiving user input 1910q, the object corresponding to menu option 1926c is selected, as shown in FIG. 19Y. In FIG. 19Y, in response to receiving user input 1910r, mug 1918 is selected and moved to the center of the field of view of user 200.

Furthermore, although the embodiments described above with reference to FIGS. 19A-19Y refer to a virtual environment, similar techniques can be applied to other CGR environments, including mixed reality environments.

Figure 20:
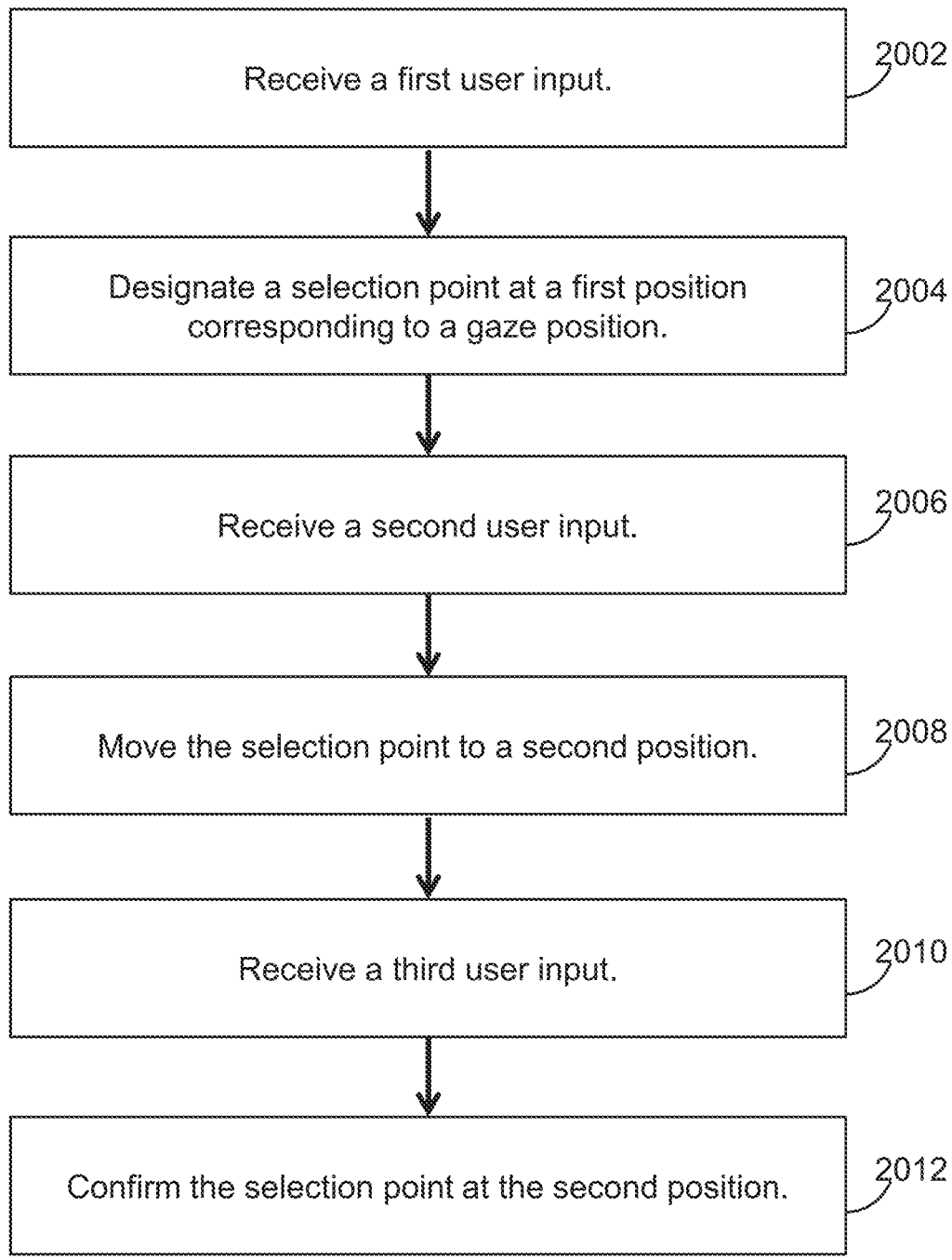
FIG. 20 depicts a flow chart of an exemplary process for interacting with an electronic device using an eye gaze, according to various embodiments.

Turning now to FIG. 20, a flow chart of exemplary process 2000 for interacting with an electronic device using an eye gaze is depicted. Process 2000 can be performed using a user device (e.g., 100a, 300, 900, or 1900). The user device is, for example, a handheld mobile device, a head-mounted device, or a head-up device. In some embodiments, process 2000 is performed using two or more electronic devices, such as a user device that is communicatively coupled to another device, such as a base device. In these embodiments, the operations of process 2000 are distributed in any manner between the user device and the other device. Further, the display of the user device can be transparent or opaque. Process 2000 can be applied to CGR environments, including virtual reality and mixed reality environments, and to virtual objects, physical objects, and representations (e.g., affordances) corresponding to virtual and physical objects. Although the blocks of process 2000 are depicted in a particular order in FIG. 20, these blocks can be performed in other orders. Further, one or more blocks of process 2000 can be partially performed, optionally performed, combined with another block(s), and/or additional blocks can be performed.

At block 2002, the device receives a first user input at a first time (e.g., a contact on a touch-sensitive surface, a press of a button, or a body gesture). At block 2004, in response to receiving the first user input, the device designates a selection point at a first position based on the gaze position at the first time, where the first position corresponds to the gaze position at the first time. In some embodiments, the gaze position at the first time is determined (e.g., measured or estimated) prior to the first user input (e.g., the most recent measured or estimated position) or subsequent (e.g., in response) to the first user input.

In some embodiments, a focus indicator is displayed at the gaze position. In some embodiments, the focus indicator includes a pointer, cursor, dot, sphere, highlighting, outline, or ghost image (e.g., of a designated or selected object(s)). In some embodiments, the focus indicator designates a selection point corresponding to an object at the gaze position. In some embodiments, the device disengages gaze from user input in response to the first user input.

In some embodiments, the response to the first input is contextual (e.g., the response is based on what is located at the gaze position (e.g., an object, a plurality of unresolvable objects, a menu affordance, or no object) or whether an object is currently selected. For example, if an object is not currently selected, the device operates in selection mode and performs a selection action (e.g., multiple objects are displayed for selection), whereas if an object is currently selected, the device operates in placement mode and performs a placement action (e.g., a ghost image of the selected object is displayed at a tentative placement position).

In some embodiments, the selection point is designated at the first position in accordance with a determination that the first position corresponds to a plurality of selectable objects. In some embodiments, a plurality of objects is a group of closely spaced objects that cannot be resolved based on the gaze of the user. In some embodiments, the plurality of objects are menu options associated with an object (e.g., a menu affordance) at the gaze position. For example, the device tentatively designates a selection point rather than confirming selection of an object if it is determined that there is ambiguity or uncertainty about the object to be selected. In some such embodiments, in response to receiving the first user input, in accordance with a determination that the first position corresponds to only a single selectable object, the device selects the single selectable object (e.g., instead of designating the selection point at the first position).

In some embodiments, the selection point is designated at the first position in accordance with a determination that the first user input is a first type of input (e.g., a touch on a touch-sensitive surface, a press of a button, or a body gesture). In some such embodiments, in response to receiving the first user input and in accordance with a determination that the first user input is a second type of input different than the first type of input (e.g., a click (in contrast to a touch) on the touch-sensitive surface, a press of a different button, or a different body gesture), the device confirms the selection point at the first position.

While maintaining designation of the selection point, the device performs the operations of blocks 2006, 2008, 2010, and 2012. At block 2006, the device receives a second user input (e.g., movement of a contact on a touch-sensitive surface or press of a directional button). At block 2008, in response to receiving the second user input, the device moves the selection point to a second position different than the first position, where moving the selection point to the second position is not based on the gaze position. For example, the device moves a focus indicator to a different object, selection point, or placement point. In some embodiments, the selection point is moved based solely on characteristics (e.g., position, direction, speed, duration, etc.) of the second input. In some embodiments, the movement of the selection point is independent from (not based on) a gaze position. In some embodiments, the second position is different than a gaze position associated with the second user input.

In some embodiments, the first user input is received while the device is in a first mode (e.g., a gaze-engaged mode in which a response to a user input is based on a gaze of a user), and the selection point is designated at the first position in accordance with the device being in the first mode. In some such embodiments, in response to receiving the first user input, the device switches from the first mode to a second mode (e.g., a gaze-disengaged mode in which a response to a user input is not based on a gaze of a user such that the gaze is disengaged from further input). In some such embodiments, the second input is received while the device is in the second mode, and the selection point is moved to the second position in accordance with the device being in the second mode.

At block 2010, while the selection point is at the second position, the device receives a third user input (e.g., click, double tap, or contact liftoff from a touch-sensitive surface). At block 2012, in response to receiving the third user input, the device confirms the selection point at the second position. In some embodiments, the device re-engages input with gaze upon confirmation (e.g., switches from gaze-disengaged mode to gaze-engaged mode). In some embodiments, the third input is received while the device is in the second mode (gaze-disengaged mode), and the selection point is confirmed at the second position in accordance with the device being in the second mode.

In some embodiments, confirming the selection point selects an object corresponding to the position of the selection point (e.g., the second position). For example, in response to receiving the third user input, the device selects an object corresponding to the second position.

In some embodiments, confirming the selection point places an object at the position of the selection point. For example, before receiving the first user input, the device selects an object at a third position different than the second position, and in response to receiving the third user input, places the object at the second position. In some embodiments, before receiving the first user input, the device selects an object at a third position different than the second position, where the selection point is designated at the first position in accordance with a determination that the first position corresponds to a plurality of selectable placement positions (e.g., the device does not confirm a placement position if there is ambiguity or uncertainty about the place to be selected). In some such embodiments, in response to receiving the first user input and in accordance with a determination that the first position corresponds to only a single selectable placement position, the device places the object at the single selectable placement position (e.g., the device bypasses tentatively designating a placement position if there is only one option).

In some embodiments, the first user input is the same type of input as the second user input or the third user input. In some embodiments, a single tap or press of a button is used to designate a point or object(s), and another single tap or press of the same button is used to confirm a designated point or object(s). In some embodiments, device decides which action to take based on the mode (e.g., selection mode or placement mode) in which the device is operating.

Figure 21:
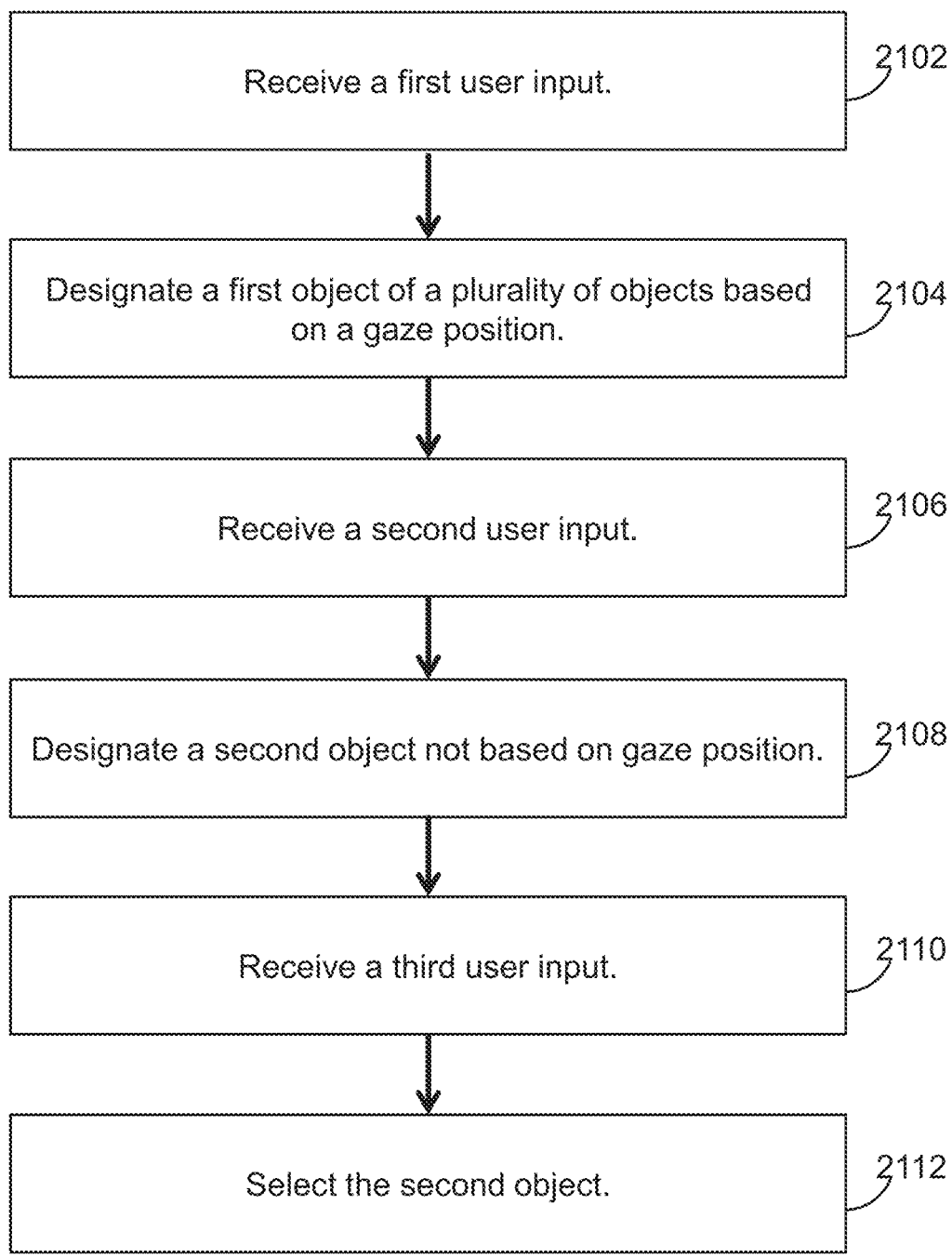
FIG. 21 depicts a flow chart of an exemplary process for interacting with an electronic device using an eye gaze, according to various embodiments.

Turning now to FIG. 21, a flow chart of exemplary process 2100 for interacting with an electronic device using an eye gaze is depicted. Process 2100 can be performed using a user device (e.g., 100*a*, 300, 900, or 1900). The user device is, for example, a handheld mobile device, a head-mounted device, or a head-up device. In some embodiments, process 2100 is performed using two or more electronic devices, such as a user device that is communicatively coupled to another device, such as a base device. In these embodiments, the operations of process 2100 are distributed in any manner between the user device and the other device. Further, the display of the user device can be transparent or opaque. Process 2100 can be applied to CGR environments, including virtual reality and mixed reality environments, and to virtual objects, physical objects, and representations (e.g., affordances) corresponding to virtual and physical objects. Although the blocks of process 2100 are depicted in a particular order in FIG. 21, these blocks can be performed in other orders. Further, one or more blocks of process 2100 can be partially performed, optionally performed, combined with another block(s), and/or additional blocks can be performed.

At block 2102, the device receives a first user input at a first time. At block 2104, in response to receiving the first user input, the device designates a first object of a plurality of objects based on a gaze position (e.g., the position of the plurality of objects corresponds to the gaze position at the first time). In some embodiments, a focus indicator designates the first object. In some embodiments, the plurality of objects are highlighted or enlarged or menu options corresponding to a menu affordance at the gaze position are displayed.

In some embodiments, the first object is designated in accordance with a determination that the gaze position at the first time corresponds to a gaze at more than one object (e.g., the plurality of objects). For example, the device does not confirm selection if there is ambiguity or uncertainty about the object to be selected. In some such embodiments, in response to receiving the first user input and in accordance with a determination that the gaze position at the first time corresponds to a gaze at only a single selectable object, the device selects the single selectable object.

In some embodiments, the first user input is received while the device is in a first mode (e.g., a gaze-engaged mode in which a response to a user input is based on a gaze of a user) and the first object is designated in accordance with the electronic device being in the first mode. In some such embodiments, in response to receiving the first user input, the device switches from the first mode to a second mode (e.g., switches to a gaze-disengaged mode in which a response to a user input is not based on a gaze of a user such that the gaze is disengaged from further input). In some such embodiments, the second input is received while the electronic device is in the second mode, and the second object is designated in accordance with the electronic device being in the second mode.

In some embodiments, the first object is designated in accordance with a determination that the first user input is a first type of input (e.g., a touch on a touch-sensitive surface, a press of a button, or a body gesture). In some such embodiments, in response to receiving the first user input and in accordance with a determination that the first user input is a second type of input different than the first type of input (e.g., a click (in contrast to a touch) on the touch-sensitive surface, a press of a different button, or a different body gesture), the device selects the plurality of objects.

While maintaining designation of the first object, the device performs the operations of blocks 2106 and 2108. At block 2106, the device receives a second user input. At block 2108, in response to receiving the second user input, the device ceases designation of the first object and designates a second object of the plurality of objects (e.g., moves a focus indicator to a different object), where designating the second object is not based on the gaze position. In some embodiments, the second object is selected based solely on characteristics of the second user input (e.g., position, direction, speed, duration, etc.). In some embodiments, the second user input is at a second time and a position of the second object at the second time is different than a gaze position at the second time.

While maintaining designation of the second object, the device performs the operations of blocks 2110 and 2112. At block 2110, the device receives a third user input. At block 2112, in response to receiving the third user input, the device selects the second object.

In some embodiments, after selecting the second object, the device receives a fourth user input at a second time. In response to receiving the fourth user input and in accordance with a determination that the fourth user input is a first type of input, the device places the second object at a gaze position at the second time. In response to receiving the fourth user input and in accordance with a determination that the fourth user input is a second type of input different than the first type of input, the device designates a placement point corresponding to the gaze position at the second time. In some such embodiments while maintaining designation of the placement position, the device receives a fifth user input and, in response to receiving the fifth user input, places the second object at a current position of the placement point.

In some embodiments, the first user input is the same type of input as the second user input or the third user input. In some embodiments, a single tap or press of a button is used to designate the first object, and another single tap or press of the same button is used to select the second object.

Figure 22:
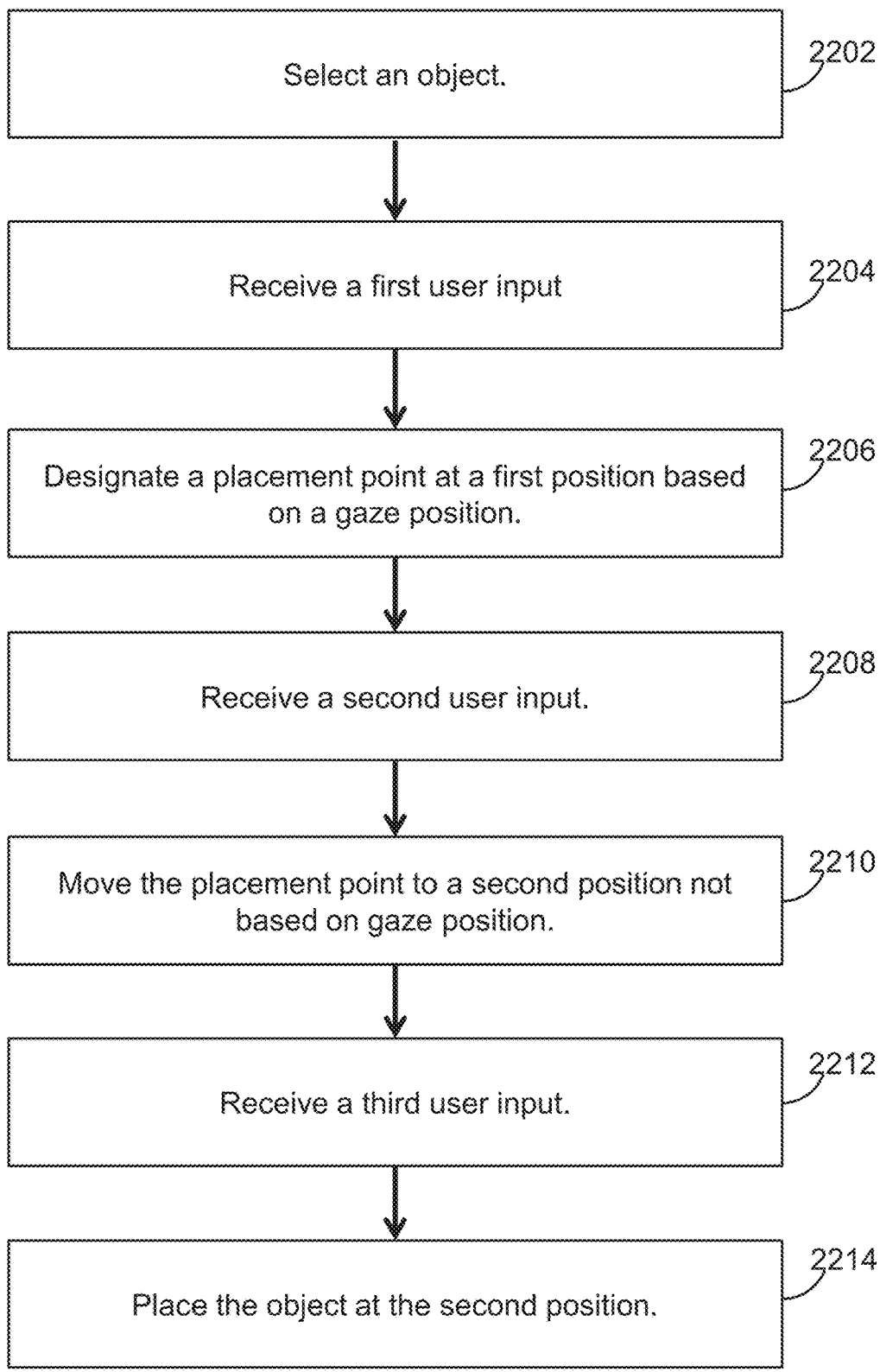
FIG. 22 depicts a flow chart of an exemplary process for interacting with an electronic device using an eye gaze, according to various embodiments.

Turning now to FIG. 22, a flow chart of exemplary process 2200 for interacting with an electronic device using an eye gaze is depicted. Process 2200 can be performed using a user device (e.g., 100a, 300, 900, or 1900). The user device is, for example, a handheld mobile device, a head-mounted device, or a head-up device. In some embodiments, process 2200 is performed using two or more electronic devices, such as a user device that is communicatively coupled to another device, such as a base device. In these embodiments, the operations of process 2200 are distributed in any manner between the user device and the other device. Further, the display of the user device can be transparent or opaque. Process 2200 can be applied to CGR environments, including virtual reality and mixed reality environments, and to virtual objects, physical objects, and representations (e.g., affordances) corresponding to virtual and physical objects. Although the blocks of process 2200 are depicted in a particular order in FIG. 22, these blocks can be performed in other orders. Further, one or more blocks of process 2200 can be partially performed, optionally performed, combined with another block(s), and/or additional blocks can be performed.

At block 2202, the device selects an object (e.g., as described in process 2100). While maintaining selection of the object, the device performs the operations of blocks 2204, 2206, 2208, 2210, 2212, and 2214. At block 2204, the device receives a first user input at a first time. At block 2206, in response to receiving the first user input, the device designates a placement point at a first position based on a gaze position at the first time, where the first position corresponds to the gaze position at the first time.

In some embodiments, the placement point is designated at the first position in accordance with a determination that the first user input is a first type of input (e.g., a touch on a touch-sensitive surface, a press of a button, or a body gesture). In some such embodiments, in response to receiving the first user input and in accordance with a determination that the first user input is a second type of input different than the first type of input (e.g., a click (in contrast to a touch) on the touch-sensitive surface, a press of a different button, or a different body gesture), the device places the selected object at the first position.

In some embodiments, the placement point is designated at the first position in accordance with a determination that the first position corresponds to a plurality of selectable placement positions (e.g., the device does not confirm the placement position when there is ambiguity or uncertainty about the position to be selected for placement). In some such embodiments, in response to receiving the first user input and in accordance with a determination that the first position corresponds to only a single selectable placement position, the device places the selected object at the single selectable placement position.

While maintaining designation of the placement point, the device performs the operations of blocks 2208, 2210, 2212, and 2214. At block 2208, the device receives a second user input. At block 2210, in response to receiving the second user input, the device moves the placement point to a second position different than the first position, where moving the placement point to the second position is not based on gaze position (e.g., a gaze position at the time of the second user input). In some embodiments, the second position is different than a gaze position associated with the second user input.

In some embodiments, the first user input is received while the electronic device is in a first mode (e.g., a gaze-engaged mode in which a response to a user input is based on a gaze position) and the placement point is designated at the first position in accordance with the electronic device being in the first mode. In some such embodiments, in response to receiving the first user input, the device switches from the first mode to a second mode (e.g., switch to a gaze-disengaged mode in which a response to a user input is not based on a gaze of a user such that the gaze is disengaged from further input in response to the first input). In some such embodiments, the second user input is received while the electronic device is in the second mode, and the placement point is moved to the second position in accordance with the electronic device being in the second mode.

At block 2212, the device receives a third user input. At block 2214, in response to receiving the third user input, the device places the selected object at the second position and, optionally, de-selects the object. In some embodiments, the first user input is the same type of input as the second user input or the third user input. In some embodiments, a single tap or press of a button is used to designate the placement point at the first position, and another single tap or press of the same button is used to place the selected object at the second position.

Executable instructions for performing the features of processes 2000, 2100, and/or 2200 described above are, optionally, included in a transitory or non-transitory computer-readable storage medium (e.g., memory(ies) 106) or other computer program product configured for execution by one or more processors (e.g., processor(s) 102). Some operations in process 2000 are, optionally, included in process 2100 and/or process 2200 (e.g., block 2004 and/or block 2008 are included in block 2104 and/or block 2108, respectively), some operations in process 2100 are, optionally, included in process 2000 and/or process 2200 (e.g., block 2202 includes block 2112), and some operations in process 2200 are, optionally, included in process 2000 and/or process 2100 (e.g., block 2112 includes block 2202). Further, some operations in processes 2000, 2100, and/or 2200 (e.g., blocks 2004, 2008, 2104, 2108, 2206, and/or 2210) are, optionally, included in processes 1600, 1700, and/or 1800, and some operations in processes 1600, 1700, and/or 1800 (e.g., blocks 1604, 1606, 1704, 1706, 1804, and/or 1806) are, optionally, included in processes 2000, 2100, and/or 2200.

As described above, one aspect of the present technology involves the use of data about a user's gaze. Gaze information, in the present technology, can be used to the benefit of users. For example, a user's gaze can be used to infer a user's focus on a particular part of a computer generated reality environment and to allow the user to interact with particular objects in that part of the field of view. It is possible, however, that some users may consider gaze information to be sensitive or to be of a personal nature.

Entities that collect, use, transfer, store, or otherwise affect gaze information detected by a CGR system should comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Gaze information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such information data and ensuring that others (if any) with access to the gaze information data adhere to their privacy policies and procedures. Further, such entities can subject themselves to evaluation by third parties to certify their adherence to widely accepted privacy policies and practices. In addition, policies and practices should be adapted for the particular types of gaze information data being collected and/or accessed and adapted to applicable laws and standards, including jurisdiction-specific considerations.

The present disclosure also contemplates embodiments in which users selectively block the use of, or access to, gaze information. Entities implementing the present technology can determine whether certain features can be provided while allowing users to select to "opt in" or "opt out" of participation in the use of gaze information during registration for services or anytime thereafter. In addition to providing "opt in" and "opt out" options, the present disclosure contemplates providing notifications relating to the access or use of gaze information. For instance, a user may be notified upon downloading an app that their personal gaze data will be accessed. Users may also be transparently educated as to why some gaze information is being used to provide certain features. For example, in virtual reality systems where gaze information is used to determine where a user is looking, user may be informed that the their gaze information is being used to determine what field of view of the virtual environment the system should render, thereby enabling the user to make an informed decision as to when to allow the use of gaze information.

Nonetheless, it is the intent of the present disclosure that gaze information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., user name, device name, etc.), controlling the amount or specificity of data stored (e.g., collect mathematical coordinates of where a user is looking in a coordinate system but avoid collecting information on what content is being viewed at the coordinates), controlling how data is stored (e.g., locally), and/or other methods.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device adapted to display a field of view of a three-dimensional computer generated reality environment, the field of view rendered from a viewing perspective, the electronic device comprising:
one or more processors; and
memory storing one or more programs configured to be executed by the one or more processors, the one or more programs including instructions for:
displaying a first object concurrently with a second object, wherein the first object at least partially obstructs the view of a portion of the second object from the viewing perspective;

determining a gaze position; and in accordance with a determination that the gaze position corresponds to a gaze at the second object, increasing the transparency of the first object while maintaining display of the second object so that the portion of the second object that was at least partially obstructed by the first object is visible from the viewing perspective.

2. The electronic device of claim 1, wherein determining the gaze position includes capturing data from a sensor directed toward a user and determining the gaze position based on the data captured from the sensor.

3. The electronic device of claim 1, the one or more programs further including instructions for:

further in accordance with a determination that the gaze position corresponds to a gaze at the second object, enhancing a display resolution of the second object.

4. The electronic device of claim 1, the one or more programs further including instructions for:

after increasing the transparency of the first object, determining a second gaze position;

in accordance with a determination that the second gaze position corresponds to a gaze at the first object, increasing the transparency of the second object; and displaying the first object according to its initial appearance.

5. The electronic device of claim 1, the one or more programs further including instructions for:

receiving an input; and increasing the transparency of the first object in response to determining that the gaze position corresponds to a gaze at the second object and receiving the input.

6. The electronic device of claim 5, wherein the input includes an eye gesture, a hand gesture, a voice input, or a controller input.

7. The electronic device of claim 1, wherein determining the gaze position includes determining a gaze direction, and wherein determining that the gaze position corresponds to a gaze at the first object or the second object includes determining that the gaze is directed at the first object or the second object.

8. The electronic device of claim 7, wherein determining that the gaze is directed to the first object or the second object is based at least in part on an angular resolution of the gaze direction.

9. The electronic device of claim 1, wherein determining the gaze position includes determining a gaze depth, and wherein determining that the gaze position corresponds to a gaze at the second object includes determining that the gaze depth corresponds to a depth of the second object as presented in the field of view.

10. The electronic device of claim 9, wherein determining that the gaze depth corresponds to the depth of the second object is based at least in part on a depth resolution of the gaze depth.

11. The electronic device of claim 1, wherein determining the gaze position includes determining the gaze position using ray casting.

12. The electronic device of claim 1, wherein determining the gaze position includes determining the gaze position using cone casting.

13. The electronic device of claim 12, wherein using cone casting includes using an angular extent of a cone, wherein the angular extent of the cone is based on an angular resolution of a gaze direction associated with the gaze position.

14. The electronic device of claim 1, the one or more programs further including instructions for:

in accordance with a determination that the gaze position corresponds to a gaze at the first object, increasing the transparency of the second object while maintaining display of the first object.

15. A non-transitory computer-readable storage medium storing one or more programs configured to be executed by one or more processors of an electronic device adapted to display a field of view of a three-dimensional computer generated reality environment, the field of view rendered from a viewing perspective, the one or more programs including instructions for:

displaying a first object concurrently with a second object, wherein the first object at least partially obstructs the view of a portion of the second object from the viewing perspective;

determining a gaze position; and in accordance with a determination that the gaze position corresponds to a gaze at the second object, increasing the transparency of the first object while maintaining display of the second object so that the portion of the second object that was at least partially obstructed by the first object is visible from the viewing perspective.

16. The non-transitory computer-readable storage medium of claim 15, wherein determining the gaze position includes capturing data from a sensor directed toward a user and determining the gaze position based on the data captured from the sensor.

17. The non-transitory computer-readable storage medium of claim 15, the one or more programs further including instructions for:

further in accordance with a determination that the gaze position corresponds to a gaze at the second object, enhancing a display resolution of the second object.

18. The non-transitory computer-readable storage medium of claim 15, the one or more programs further including instructions for:

after increasing the transparency of the first object, determining a second gaze position;

in accordance with a determination that the second gaze position corresponds to a gaze at the first object, increasing the transparency of the second object; and displaying the first object according to its initial appearance.

19. The non-transitory computer-readable storage medium of claim 15, the one or more programs further including instructions for:

receiving an input; and increasing the transparency of the first object in response to determining that the gaze position corresponds to a gaze at the second object and receiving the input.

20. The non-transitory computer-readable storage medium of claim 19, wherein the input includes an eye gesture, a hand gesture, a voice input, or a controller input.

21. The non-transitory computer-readable storage medium of claim 15, the one or more programs further including instructions for:

in accordance with a determination that the gaze position corresponds to a gaze at the first object, increasing the transparency of the second object while maintaining display of the first object.

22. A method comprising:
at an electronic device adapted to display a field of view of a three-dimensional computer generated reality environment, the field of view rendered from a viewing perspective:
displaying a first object concurrently with a second object, wherein the first object at least partially obstructs the view of a portion of the second object from the viewing perspective;
determining a gaze position; and
in accordance with a determination that the gaze position corresponds to a gaze at the second object, increasing the transparency of the first object while maintaining display of the second object so that the portion of the second object that was at least partially obstructed by the first object is visible from the viewing perspective.

23. The method of claim 22, further comprising:
in accordance with a determination that the gaze position corresponds to a gaze at the first object, increasing the transparency of the second object while maintaining display of the first object.

\* \* \* \* \*